United States Patent
Weber et al.

(10) Patent No.: US 6,210,760 B1
(45) Date of Patent: *Apr. 3, 2001

(54) SUPERTWIST LIQUID CRYSTAL DISPLAY

(75) Inventors: Georg Weber, Erzhausen; Herbert Plach, Darmstadt, both of (DE); Takamasa Oyama, Fukami-nishi (JP); Hiroki Yoshitake, Atsugi (JP); Bernhard Scheuble, Yokohama (JP); Reinhard Hittich, Modautal (DE); Hans Adolf Kurmeier, Seeheim-Jugenheim (DE); Eike Poetsch, Mühltal (DE); Klaus Peter Stahl, Darmstadt (DE)

(73) Assignee: Merck Patent Gesellschaft mit beschrankter Haftung (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/207,031

(22) Filed: Dec. 8, 1998

Related U.S. Application Data

(62) Division of application No. 08/350,847, filed on Dec. 7, 1994, now Pat. No. 5,876,626, which is a division of application No. 07/997,834, filed on Dec. 29, 1992, now Pat. No. 5,387,369, which is a continuation of application No. 07/865,716, filed on Apr. 8, 1992, now abandoned, which is a continuation of application No. 07/458,689, filed as application No. PCT/EP89/01187 on Oct. 9, 1989, now abandoned.

(30) Foreign Application Priority Data

Oct. 20, 1988 (DE) .................................. 38 35 804

(51) Int. Cl.⁷ .......................... C09K 19/34; C09K 19/30; C09K 19/20; G02F 1/1333

(52) U.S. Cl. ................ 428/1.1; 252/299.61; 252/299.63; 252/299.66; 252/299.67; 349/186

(58) Field of Search .................. 252/299.01, 299.61, 252/299.63, 299.64, 299.66, 299.67; 349/186; 428/1.1

(56) References Cited

U.S. PATENT DOCUMENTS

| | | | |
|---|---|---|---|
| 4,799,774 | 1/1989 | Baur et al. | 349/180 |
| 4,820,443 | 4/1989 | Goto et al. | 252/299.63 |
| 4,917,818 | 4/1990 | Sawada et al. | 252/299.61 |
| 4,923,632 | 5/1990 | Sawada et al. | 252/299.61 |
| 5,013,477 | 5/1991 | Buchecker et al. | 252/299.63 |
| 5,286,410 | 2/1994 | Weber et al. | 252/299.01 |
| 5,308,538 | 5/1994 | Weber et al. | 252/299.61 |
| 5,387,369 | 2/1995 | Weber et al. | 252/299.01 |
| 5,876,626 | * 3/1999 | Weber et al. | 252/299.01 |
| 5,976,404 | * 11/1999 | Hirschmann et al. | 252/299.01 |
| 6,054,193 | * 4/2000 | Hirschmann et al. | 428/1.1 |

FOREIGN PATENT DOCUMENTS

| | | |
|---|---|---|
| 260450 | 8/1987 | (EP) . |
| 261614 | 9/1987 | (EP) . |
| 315050 | 10/1988 | (EP) . |
| 332005 | 2/1989 | (EP) . |
| 366985 | 10/1989 | (EP) . |
| 89/08692 | 2/1989 | (WO) . |

OTHER PUBLICATIONS

Leenhouts et al., "Electro–Optics of Supertwist Displays, Dependence . . ." Japan Display '86, pp. 388–390, 1986.

Schadt et al., "Class Specific Physical Properties of Liquid Crystals and Correlation . . .", Z. Naturforsch. 37a. pp. 165–178, 1982.

* cited by examiner

*Primary Examiner*—Shean C. Wu
(74) *Attorney, Agent, or Firm*—Millen, White, Zelano, & Branigan, P.C.

(57) ABSTRACT

Supertwist liquid crystal displays having very short switching times are obtained if the nematic liquid crystal mixture contains at least one component chosen from group A consisting of compounds of the formulae AI to AVI:

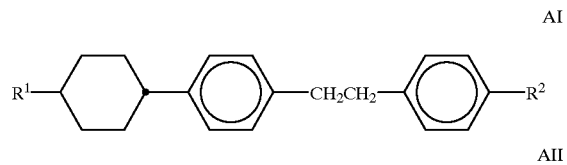

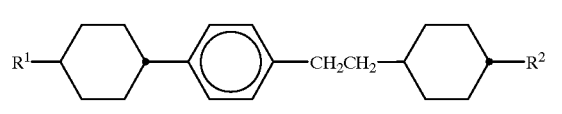

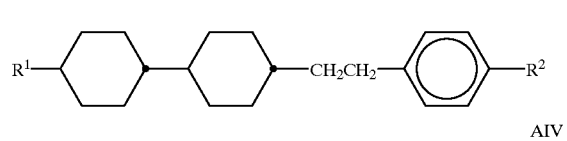

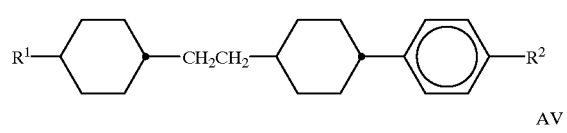

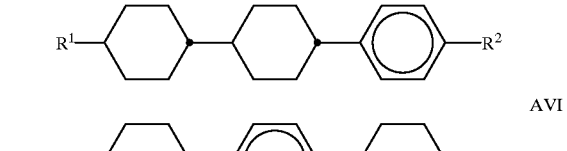

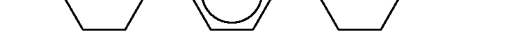

wherein $R^1$ and $R^2$ in each case independently of one another are each R and R is alkyl having 1–12 C atoms, wherein one or two non-adjacent $CH_2$ groups can also be replaced by —O—, —CH=CH—, —CO—, —O—CO— or —CO—O—, and up to four other components.

12 Claims, No Drawings

SUPERTWIST LIQUID CRYSTAL DISPLAY

This is a division of application Ser. No. 08/350,847 filed Dec. 7, 1994, now U.S. Pat. No. 5,876,626; which is a divisional application of Ser. No. 07/997,834, filed Dec. 29, 1992 now U.S. Pat. No. 5,387,369; which is a continuation of Ser. No. 07/865,716, filed Apr. 8, 1992, abandoned, which is a continuation of Ser. No. 07/458,689, filed Jan. 5, 1990, abandoned, and which is based on PCT Application No. EP 89/01187, filed Oct. 9, 1989.

The invention relates to supertwist liquid crystal displays (SLCD) having very short switching times and good gradients and angular dependencies and the new nematic liquid crystal mixtures used in these.

SLCD according to the precharacterizing clause are known, for example, from EP 0,131,216 B1; DE 34 23 993 A1; EP 0,098,070 A2; M. Schadt and F. Leenhouts, 17. Freiburger Arbeitstagung Flussigkristalle (17th Freiburg Conference on Liquid Crystals) (8.–10.04.87); K. Kawasaki et al., SID 87 Digest 391 (20.6); M. Schadt and F. Leenhouts, SID 87 Digest 372 (20.1); K. Katoh et al., Japanese Journal of Applied Physics, Vol. 26, No. 11, L 1784–L 1786 (1987); F. Leenhouts et al., Appl. Phys. Lett. 50 (21), 1468 (1967); H. A. van Sprang and H. G. Koopman, J. Appl. Phys. 62 (5), 1734 (1987); T. J. Scheffer and J. Nehring, Appl. Phys. Lett. 45 (10), 1021 (1984), M. Schadt and F. Leenhouts, Appl. Phys. Lett. 50 (5), 236 (1987) and E. P. Raynes, Mol. Cryst. Liq. Cryst. Letters Volume 4 (1), pages 1–8 (1986). The term SLCD here includes any highly twisted display element having a twisting angle, according to the content, of between 160° and 360°, such as, for example, the display elements according to Waters et al. (C. M. Waters et al., Proc. Soc. Inf. Disp. (New York) (1985) (3rd Intern. Display Conference, Kobe, Japan), and the STN-LCDs (DE OS 35 03 259), SBE-LCDs (T. J. Scheffer and J. Nehring, Appl. Phys. Lett. 45 (1984) 1021), OMI-LCDs (M. Schadt and F. Leenhouts, Appl. Phys. Lett. 50 (1987), 236), DST-LCDs (EP OS 0 246 842) or BW-STN-LCDs (K. Kawasaki et al., SID 87 Digest 391 (20.6)).

In contrast to standard TN displays, such SLCD are distinguished by considerably better gradients of the electrooptical characteristic line and associated better contrast values, as well as by a considerably lower angular dependency of contrast. SLCD having short switching times, especially also at lower temperatures, are of particular interest. To achieve short switching times, the viscosities of the liquid crystal mixtures in particular have hitherto been optimized using usually monotropic additives of relatively high vapor pressure. However, the switching times achieved were not adequate for every use.

There is thus still a great demand for SLCD having very short switching times with a simultaneously high working temperature range, high characteristic line gradient, good angular dependency of the contrast and low threshold voltage.

The invention is based on the object of providing SLCD which have the abovementioned disadvantages to only a minor degree, if at all, and at the same time have very short switching times.

It has now been found that this object can be achieved if nematic liquid crystal mixtures containing the following components:

a) at least one component chosen from group A, consisting of compounds of the formulae AI to AVI:

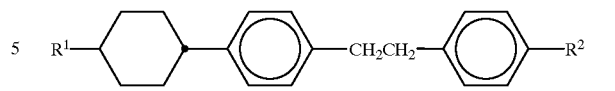
AI

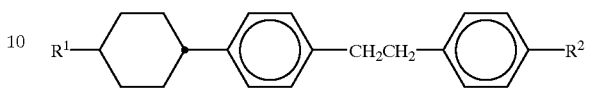
AII

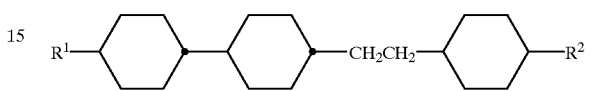
AIII

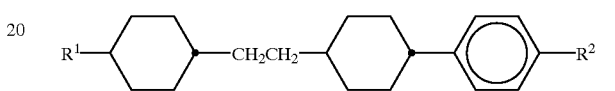
AIV

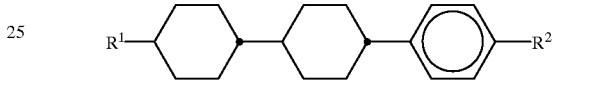
AV

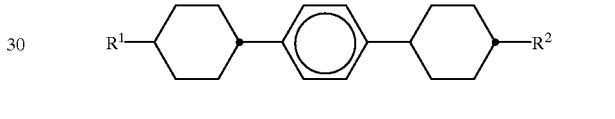
AVI wherein $R^1$ and $R^2$ each independently of one another are each R and R is alkyl having 1–12 C atoms, wherein one or two non-adjacent $CH_2$ groups can also be replaced by —O—, —CH=CH—, —CO—, —O—CO— or —CO—O—, b) at least one component chosen from group B1, consisting of the compounds of the formulae BI to BIV:

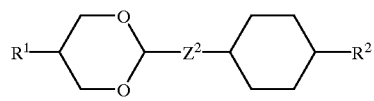
BI

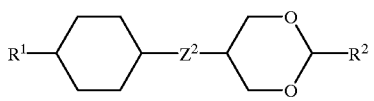
BII

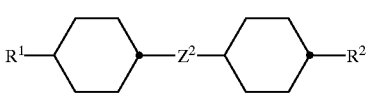
BIII

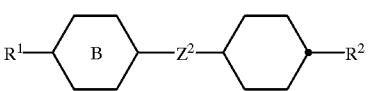
BIV wherein $R^1$ and $R^2$ each independently of one another have the meaning given for R, $Z^2$ is —$CH_2CH_2$, —CO—O—, —O—CO— or a single bond and

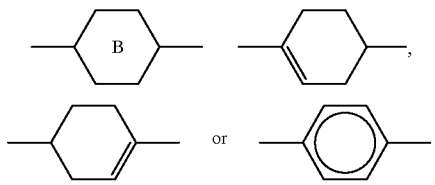

and/or at least one component chosen from group B2, consisting of the compounds of the formulae BV to BVII:

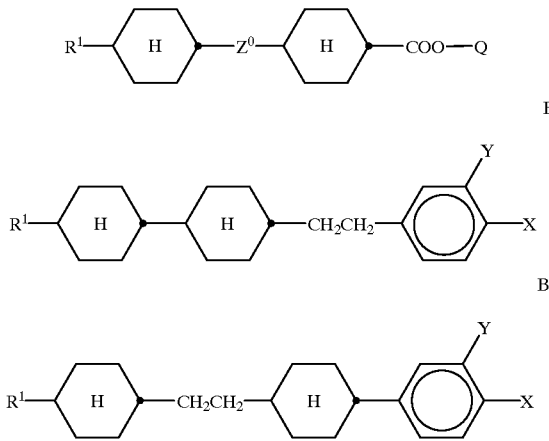

wherein $R^1$ has the meaning given for R, $Z^0$ is —CH$_2$CH$_2$— or a single bond and Q is

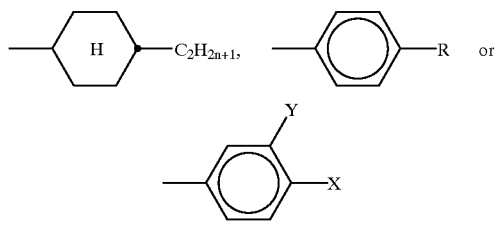

wherein n is 1 to 9, X is CN or F and Y is H or F, and/or at least one component chosen from group B3, consisting of the compounds of the formulae BVIII and BIX:

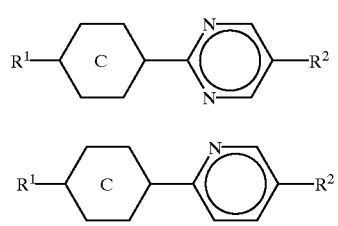

wherein $R^1$ and $R^2$ each independently of one another have the meaning given for R and

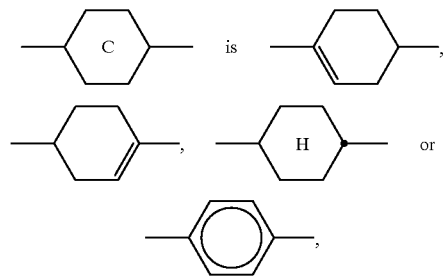

c) 10–80% by weight of a liquid crystal component C, consisting of one or more compounds having a dielectric anisotropy of more than +1.5, d) 0–20% by weight of a liquid crystal component D, consisting of one or more compounds having a dielectric anisotropy of less than −1.5 and e) an optically active component E, in an amount such that the ratio between the layer thickness (separation of the plane-parallel carrier plates) and the natural pitch of the nematic liquid crystal mixture is about 0.2 to 1.3, are used.

The invention thus relates to an SLCD having two plane-parallel carrier plates which, with an edging, form a cell, a nematic liquid crystal mixture of positive dielectric anisotropy in the cell, electrode layers with superimposed orientation layers on the insides of the carrier plates, an angle of incidence between the longitudinal axis of the molecules on the surface of the carrier plates and the carrier plates of about 1 degree to 30 degrees and a twisting angle of the liquid crystal mixture in the cell from orientation layer to orientation layer, according to the amount, of between 160 and 360°, characterized in that the nematic liquid crystal mixture contains a) at least one component chosen from group A, consisting of compounds of the formulae AI to AVI:

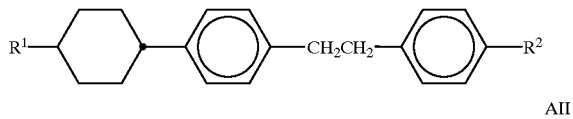

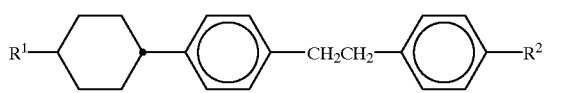

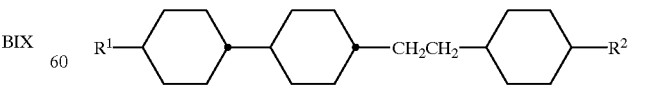

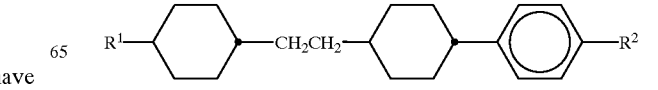

-continued

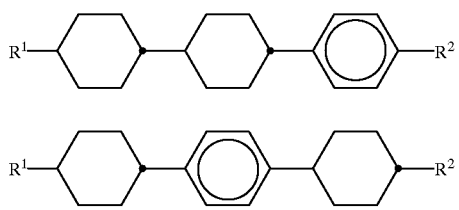
AV

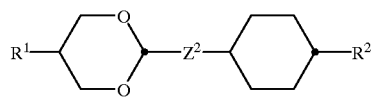

AVI wherein $R^1$ and $R^2$ each independently of one another are each R and

R is alkyl having 1–12 C atoms, wherein one or two non-adjacent $CH_2$ groups can also be replaced by —O—, —CH=CH—, —CO—, —O—CO— or —CO—O—, b) at least one component chosen from croup B1, consisting of the compounds of the formulae BI to BIV:

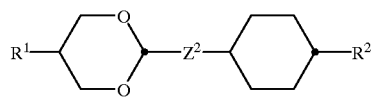
BI

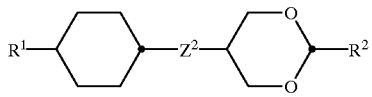
BII

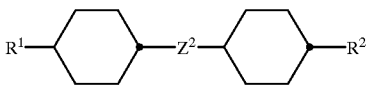
BIII

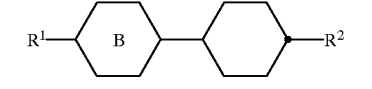
BIV wherein $R^1$ and $R^2$ each independently of one another have the meaning given for R, $Z^2$ is —$CH_2CH_2$—, —CO—O—, —O—CO— or a single bond and

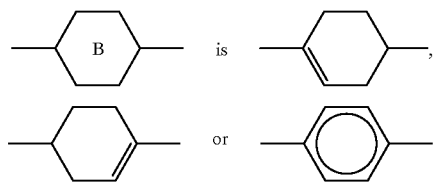

and/or at least one component chosen from group B2, consisting of the compounds of the formulae BV to BVII:

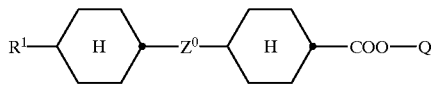
BV

-continued

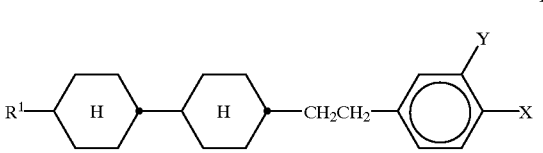
BVI

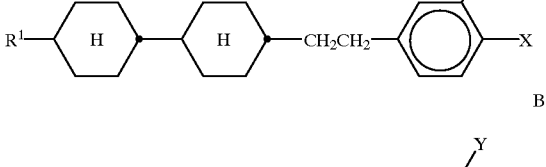
BVII wherein
$R^1$ has the meaning given for R,
$Z^0$ is —$CH_2CH_2$— or a single bond and Q is

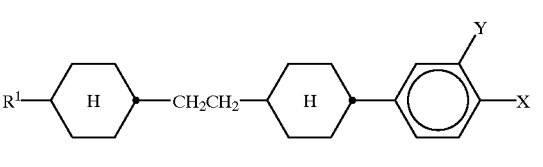

wherein n is 1 to 9, X is CN or F and Y is H or F, and/or at least one component chosen from group B3, consisting of the compounds of the formulae BVIII and BIX:

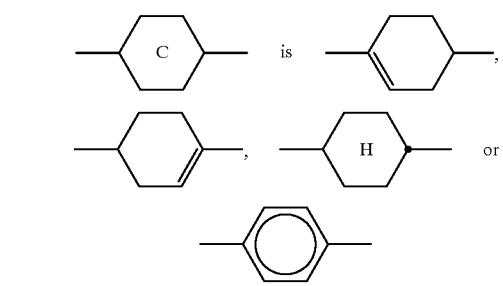

wherein $R^1$ and $R^2$ each independently of one another have the meaning given for R and

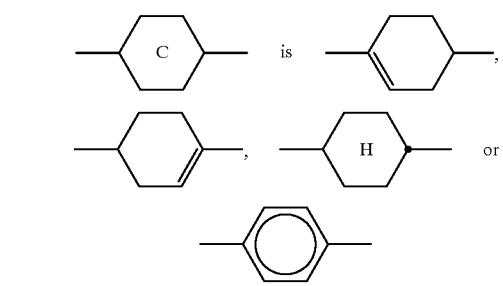

c) 10–80% by weight of a liquid crystal component C, consisting of one or more compounds having a dielectric anisotropy of more than +1.5, d) 0–20% by weight of a liquid crystal component D, consisting of one or more compounds having a dielectric anisotropy of less than −1.5 and e) an optically active component E, in an amount such that the ratio between the layer thickness (separation of the plane-parallel carrier plates) and the natural pitch of the nematic liquid crystal mixture is about 0.2 to 1.3, and in that the nematic liquid crystal mixture has a nematic phase range of at least 60° C., a viscosity of not more than 30 mpa.s and a dielectric anisotropy of at least +5, the dielectric anisotropies of the compounds and the parameters relating to the nematic liquid crystal mixture being based on a temperature of 20° C.

The invention also relates to corresponding liquid crystal mixtures for use in SLCD.

The individual compounds of the formulae AI to AVI, BI to BIV and CI to CIII or other compounds which can be used in the SLCD according to the invention are either known or can be prepared analogously to the known compounds.

Preferred liquid crystal mixtures which can be used according to the invention contain one or more compounds from group A in an amount of 4% to 40%, preferably 10% to 32%. Compounds of the formula AIII to AVI are preferred. In a particularly preferred embodiment, the mixtures simultaneously contain (a) compounds of the formula AV and/or AVI and (b) compounds of the formula AIII and/or AIV. $R^1$ and $R^2$ preferably in each case independently of one another are n-alkyl having 1 to 7 C an atoms or (trans)-n-alkenyl having 3 to 7 C atoms.

The content of component(s) from group B1 is preferably 5% to 45%, particularly preferably about 10% to 40%. Components of the formulae BIII and BIV are preferred. Particularly preferred compounds of the formula BIII are those of the following part formulae:

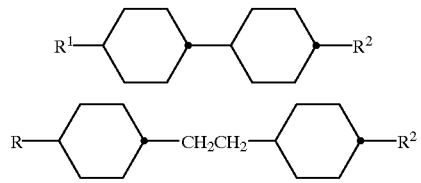

wherein $R^1$ is $CH_3$—$(CH_2)_n$—O—, $CH_3$—$(CH_2)_t$—, trans-H-$(CH_2)_r$—CH=CH—$(CH_2CH_2)_n$—$CH_2O$— or trans-H-$(CH_2)_r$)—CH=CH—$(CH_2CH_2)_s$—, $R^2$ is $CH_3$—$(CH_2)_t$, n is 1, 2, 3 or 4, r is 0, 1, 2 or 3, s is 0 or 1 and t is 1, 2, 3 or 4.

Those of the part formula

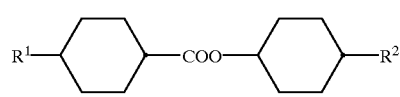

wherein $R^1$ and $R^2$ have the abovementioned meaning, are furthermore preferred.

The content of the compounds of the formula BIII of the abovementioned part formulae is preferably about 5% to 45%, particularly preferably about 10% to 35%. Particularly preferred compounds of the formula BIV are those of the following part formula:

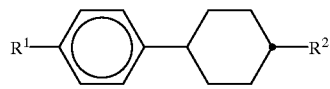

wherein $R^1$ is $CH_3$—$(CH_2)_n$—O— or trans-H-$(CH_2)_r$—CH=CH—$(CH_2CH_2)_s$'$CH_2O$— and $R^2$ is $CH_3$—$(CH_2)_t$—, wherein n is 1, 2, 3 or 4, r is 0, 1, 2 or 3, s is 0 or 1 and t is 1, 2, 3 or 4.

The content of these compounds or of the compounds of the formula BIV is preferably about 5% to 40%, particularly preferably about 10% to 35%.

The mixtures preferably contain compounds of the formula III, in particular those of the part formula

In a particularly preferred embodiment, the mixtures simultaneously contain compounds of the formulae BIII and BIV, the total content of components of group B1 being maintained.

If compounds of the formulae BI and/or BIII are present, $R^1$ and $R^2$ preferably in each case independently of one another are n-alkyl having 1 to 7 C atoms or (trans)-n-alkenyl having 3 to 7 C atoms. $Z^2$ is preferably a single bond. BI is particularly preferred.

Mixtures according to the invention which contain one or more compounds of the formula BIV, wherein

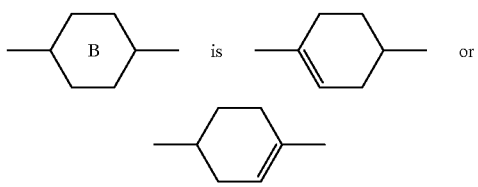

and $R^1$ and $R^2$ have one of the abovementioned preferred meanings and particularly preferably are n-alkyl having 1 to 7 C atoms, are furthermore preferred.

The total content of components of group B1 is observed in each case.

The content of compounds of group B2 is preferably about 5% to 45%, particularly preferably 5% to 20%. The content (preferred ranges) for BV to BVII is as follows:

BV about 5% to 30%, preferably about 5% to 15% Total BVI and BVII: about 5% to 25%, preferably about 10% to 20%.

Preferred compounds of group B2 are shown below:

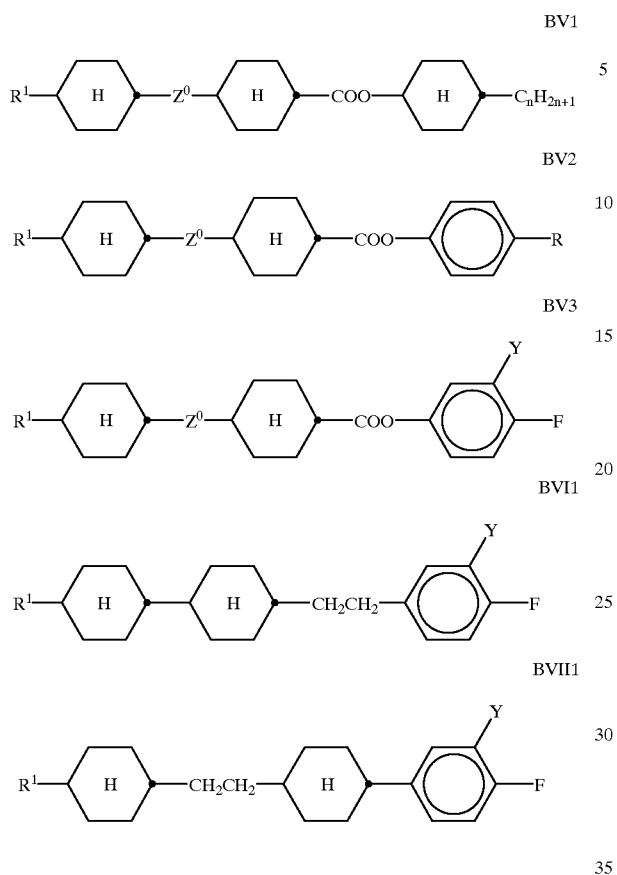

R[1] is preferably n-alkyl having 1 to 7 C atoms or (trans)-n-alkenyl having 3 to 7 C atoms. $Z^0$ is preferably a single bond. R preferably has the preferred meaning given above for R[1] or is fluorine. Y is preferably fluorine.

The mixtures according to the invention preferably contain one or more compounds chosen from the group consisting of BV3, BVI1 and BVII1 in a total content of about 5 to 35%.

In a particularly preferred embodiment, the mixtures according to the invention contain, in addition to BV3, BVI1, BVII1 and BV2 (R=F), further terminally fluorinated compounds, for example chosen from the group consisting of:

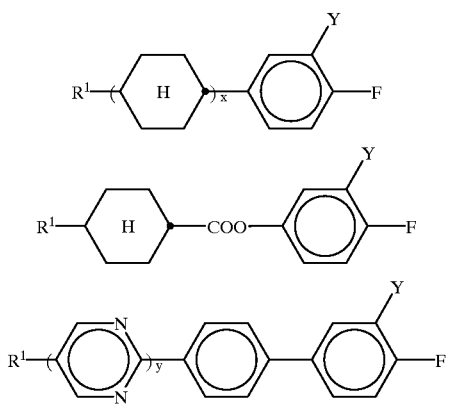

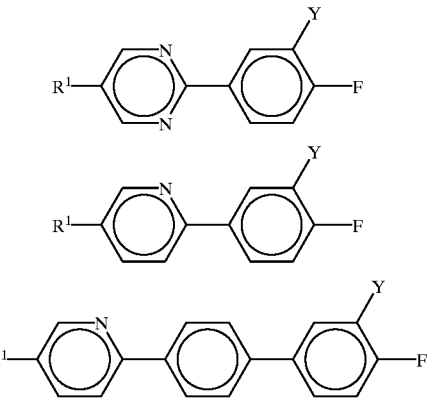

wherein R[1] is preferably n-alkyl having 1 to 7 C atoms or (trans)-n-alkenyl having 3 to 7 C atoms, x is 1 or 2, y is 0 or 1 and Y is H or F.

The total content of all the terminally fluorinated compounds is preferably about 5% to 65%, in particular about 15% to 40%.

The content of compounds from group B3 is preferably about 5% to 30%, particularly preferably about 10% to 20%. R[1] is preferably n-alkyl or n-alkoxy having in each case 1 to 9 C atoms. R[2] is preferably n-alkyl having 1 to 9 C atoms. However, analogous compounds with alkenyl or alkenyloxy groups can also be employed. Compounds of the formula BVIII are preferred.

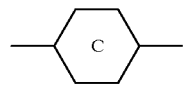

is preferably 1,4-phenylene.

The mixtures according to the invention contain compounds of at least one of the groups B1, B2 and B3. Preferably, they contain one or more compounds from group B1 and one or more compounds from groups B2 and/or B3.

The content of compounds of component C is preferably about 10% to 80%, in particular about 20% to 70%. The expert can easily adjust this content to establish the desired threshold voltage, it being possible on principle to use all the customary liquid crystal compounds of $\Delta\epsilon > +1.5$. If predominantly less highly positive terminally fluorinated compounds (see above) are used, the total content varies more in the above range (about 35% to 80%), whereas if terminally cyano-substituted compounds are used, the content can be lower (about 10% to 35%). Particularly preferred compounds are, in addition to the abovementioned terminally fluorinated compounds, the preferred cyano compounds mentioned below:

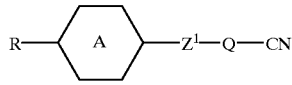

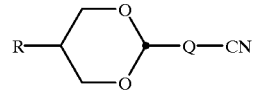

-continued

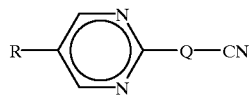

wherein

R has the meaning given in claim 1,

Q is

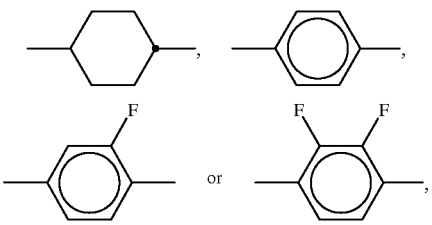

$Z^1$ is

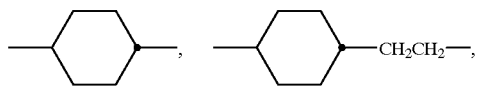

a single bond, —CH$_2$CH$_2$, —CO—O— or —O—CO— and

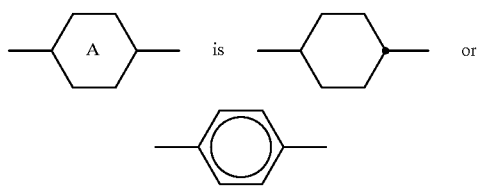

Some particularly preferred smaller groups are shown below:

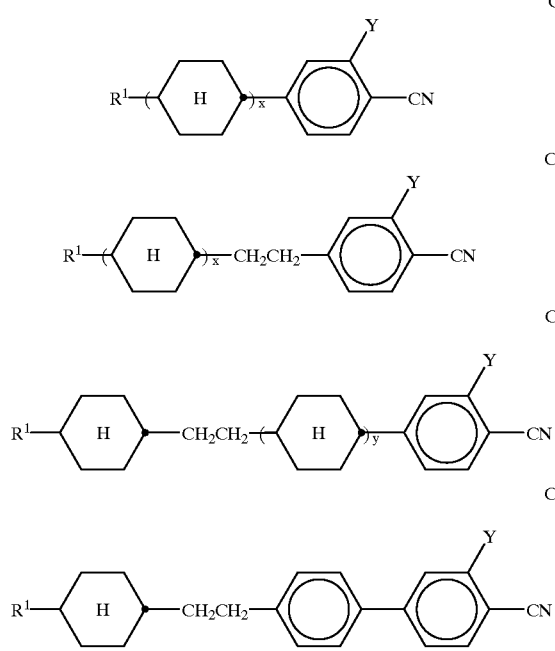

-continued

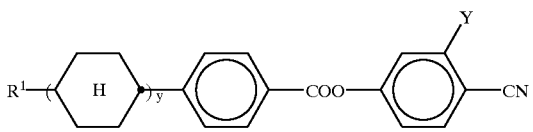

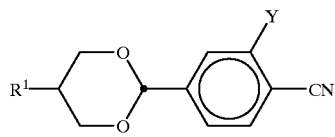

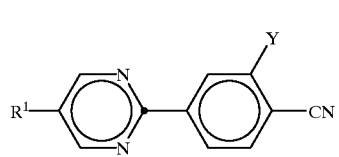

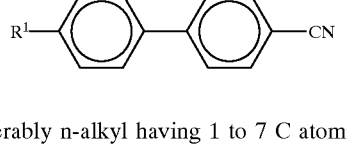

$R^1$ is preferably n-alkyl having 1 to 7 C atoms, n-oxaalkyl having 3 to 7 C atoms (for example n-alkoxymethyl) or n-alkenyl having 3–7 C atoms. Y is H or fluorine; x is 1 or 2; and y is 0 or 1.

Isothiocyanates, for example of the formula

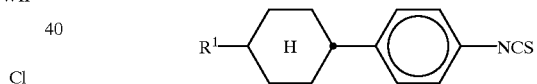

wherein $R^1$ is n-alkyl having 1 to 7 C atoms or n-alkenyl having 3 to 7 C atoms, are furthermore preferred.

In a particularly preferred embodiment, the mixtures according to the invention preferably contain about 5% to 20% of one or more compounds having a dielectric anisotropy of less than −1.5 (component D). Such compounds are known, for example derivatives of 2,3-dicyanohydroquinone or cyclohexane derivatives containing the structural element

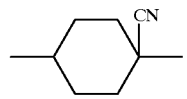

in accordance with DE-OS 32 31 707 and DE-OS 34 07 013.

Preferably, however, compounds having the structural element 2,3-difluoro-1,4-phenylene will be chosen, for example compounds according to DE-OS 38 07 801, 38 07 861, 38 07 863, 38 07 864 or 38 07 908. Tolanes having this structural element according to International Patent Application PCE/DE 88/00133 are particularly preferred, especially those of the formulae

[Structure: R¹-phenyl-C≡C-(3,4-difluorophenyl)-OR²]

[Structure: R¹-cyclohexyl-H-Z⁰-phenyl-C≡C-(3,4-difluorophenyl)-OR²]

wherein $R^1$ and $R^2$ each independently of one another are preferably n-alkyl having 1 to 7 C atoms or n-alkenyl having 3 to 7 C atoms and $Z^0$ is —CH₂—CH₂— or a single bond.

The component D has the effect, in particular, of improving the gradient of the characteristic line.

In a particularly preferred embodiment, the mixtures contain about 5% to 35%, particularly preferably about 10% to 20%, of liquid crystal tolane compounds. This means that lower layer thicknesses (about 5–6 μm) can be used, whereupon the switching times are shortened significantly. Particularly preferred tolanes are shown below:

[Structure: R¹-phenyl-C≡X-Q]

[Structure: R¹-cyclohexyl-H-Z⁰-phenyl-C≡C-Q]

$R^1$ is preferably n-alkyl having 1 to 7 C atoms,
$Z^0$ is —CH₂CH₂— or a single bond and Q is

[Structures: -phenyl-R², -phenyl-F, or -2-fluorophenyl-F]

wherein
  $R^2$ is n-alkyl or n-alkoxy having in each case 1 to 7 C atoms or n-alkenyl or n-alkenyloxy having in each case 3 to 7 C atoms.

In other particularly preferred embodiments, the mixtures contain
  30–60% by weight of component C, 20–70% by weight of compounds from groups A and B, 0–10% by weight of component D and an amount of component E which adds up to 100% by weight,
  a component D which contains one or more compounds with a 1-cyano-trans-1,4-cyclohexylene group or a 2,3-difluoro-1,4-phenylene group,
  at least two compounds of the formula AIII or AV,
  compounds of the formula AIII and AV,
  a component C which contains one or more compounds with a 4-fluorophenyl group or a 3,4-difluorophenyl group,
at least one compound from the following group:

[Structure: Alkyl-cyclohexyl-phenyl-CH₂CH₂-phenyl(X)-F]

[Structure: Alkyl-cyclohexyl-cyclohexyl-CH₂CH₂-phenyl(X)-F]

[Structure: Alkyl-cyclohexyl-CH₂CH-cyclohexyl-phenyl(X)-F]

[Structure: Alkyl-cyclohexyl-cyclohexyl-phenyl(X)-F]

[Structure: Alkyl-cyclohexyl-phenyl-phenyl(X)-F]

[Structure: Alkyl-cyclohexyl-cyclohexyl-COO-phenyl(X)-F]

wherein alkyl is a straight-chain alkyl group having 2–7 C atoms and X is H or F,
  one or more compounds wherein R is a trans-alkenyl or a trans-alkenyloxy group,
  one or more compounds chosen from the following group

[Structure: R¹-cyclohexyl-H-phenyl-phenyl-R²]

[Structure: R¹-cyclohexyl-H-CH₂CH₂-phenyl-phenyl-R²]

[Structure: R¹-cyclohexyl-H-phenyl-cyclohexyl-H-R²]

wherein $R^1$ and $R^2$ have the preferred meanings given in the case of component A and one of the two 1,4-phenylene groups can also be substituted by fluorine; the content of these compounds is 0% to 25%, preferably about 5% to 15%.

The expert has available a large number of chiral doping substances, some of which are commercially available, for component E. Their choice is not critical per se.

The build-up of the liquid crystal display elements according to the invention of polarizers, electrode baseplates and electrodes having a surface treatment such that the preferred orientation (director) of the liquid crystal molecules in each case adjacent thereto is usually twisted from the one electrode to the other by, according to the amount, 160° to 360° relative to one another, corresponds to the usual construction for such display elements. The term usual construction here is interpreted widely and also includes all the variations and modifications of the supertwist cell which are known from the literature, in particular also matrix display elements, as well as the display elements, containing additional magnets, according to DE-OS 2 748 738. The surface tilt angle of the two carrier plates can be identical or different. Identical tilt angles are preferred.

However, an essential difference between the display elements according to the invention and those which were hitherto customary and are based on the twisted nematic cell is in the choice of liquid crystal components in the liquid crystal layer.

The liquid crystal mixtures which can be used according to the invention are prepared in a manner which is customary per se. As a rule, the desired amount of the components used in the smaller amount is dissolved in the components which make up the main constituent, preferably at elevated temperature. It is also possible to mix solutions of the components in an organic solvent, for example in acetone, chloroform or methanol, and to remove the solvent again, for example by distillation, after thorough mixing.

The dielectrics can also contain other additives which are known to the expert and are described in the literature. For example 0–15% of pleochroic dyestuffs can be added.

The liquid crystal mixtures according to the invention can certainly additionally contain, apart from the components mentioned here, further customary components. One skilled in the art can determine by routine tests which other components can be employed and in which amounts without eliminating the advantages of the invention. Preferably, the mixtures predominantly comprise the components mentioned (more than 60% of them) and in particular almost exclusively these components (more than 80%, particularly preferably 100% of them).

The following examples are intended to illustrate the invention without limiting it.

The examples have the following meanings:

| | |
|---|---|
| S-N | smectic-nematic phase transition temperature, |
| cp. | clearing point, |
| visc. | viscosity (mPa · s), |
| $T_{on}$ | time from switching on to reaching 90% of the maximum contrast |
| $T_{off}$ | time from switching off to reaching 10% of the maximum contrast |

The SLCD is driven in multiplex operation (multiplex ratio 1:100, bias 1:11, operating voltage 18.5 volts).

All the temperatures above and below are given in ° C. The percentage figures are percentages by weight. The values for the switching times and viscosities are based on 20° C.

EXAMPLE 1

An SLCD of the OMI type having the following parameters:

| | |
|---|---|
| twisting angle | 180° |
| angle of incidence | 1° |
| d/p (layer thickness/pitch) | 0.35 |
| d · Δn | 0.5 | containing a liquid crystal mixture having the following parameters:

| | |
|---|---|
| clearing point | 90° |
| Δn | 0.1023 |
| viscosity | 19 mPa · s |
| Δε | +7.4 | and consisting of
  14.7% of p-trans-4-propylcyclohexyl-benzonitrile,
  5% of p-trans-4-ethylcyclohexyl-benzonitrile,
  10.8% of p-trans-4-butylcyclohexyl-benzonitrile,
  6% of p-trans-4-pentylcyclohexyl-benzonitrile,
  5% of trans-1-p-methoxyphenyl-4-propylcyclohexane,
  9.8% of trans,trans-4-methoxy-4'-propylcyclohexylcyclohexane,
  8% of 1-[trans-4-(trans-4-propylcyclohexyl)-cyclohexyl]-2-(p-methylphenyl)-ethane,
  8% of 1-[trans-4-(trans-4-propylcyclohexyl)-cyclohexyl]-2-(p-ethylphenyl)-ethane,
  8% of 1-[trans-4-(trans-4-propylcyclohexyl)-cyclohexyl]-2-(p-propylphenyl)-ethane,
  8% of 1-[trans-4-(trans-4-propylcyclohexyl)-cyclohexyl]-2-(p-pentylphenyl)-ethane,
  8% of 1-[trans-4-(trans-4-propylcyclohexyl)-cyclohexyl]-2-(p-fluorophenyl)-ethane,
  8% of 1-[trans-4-(trans-4-propylcyclohexyl)-cyclohexyl]-2-(p-cyanophenyl)-ethane and
  0.7% of optically active 2-octyl p-(p-n-hexylbenzoyloxy)-benzoate
has a switching time of $T_{on}$ 73 msec and $T_{off}$ 9.0 msec.

EXAMPLE 2

An SLCD of the STN type having the following parameters:

| | |
|---|---|
| twisting angle | 220° |
| angle of incidence | 1° |
| d/p | 0.5 |
| d · Δn | 0.85 | containing a liquid crystal mixture having the following parameters:

| | |
|---|---|
| clearing point | 80° C. |
| Δn | 0.1765 |
| viscosity | 19 mPa · s | and consisting of a base mixture containing
  21% of p-trans-4-propylcyclohexylbenzonitrile,
  5% of trans-1-p-methoxyphenyl-4-propylcyclohexane,
  6% of 2-p-ethylphenyl-5-propylpyrimidine,
  6% of 2-p-propylphenyl-5-propylpyrimidine,
  6% of 2-p-propylphenyl-5-pentylpyrimidine,
  4% of 2-p-ethylphenyl-5-heptylpyrimidine,
  4% of 1-[trans-4-(trans-4-propylcyclohexyl)-cyclohexyl]-2-(p-methylphenyl)-ethane
  4% of 1-[trans-4-(trans-4-propylcyclohexyl)-cyclohexyl]-2-(p-ethylphenyl)-ethane,
  4% of 1-[trans-4-(trans-4-propylcyclohexyl)-cyclohexyl]-2-(p-propylphenyl)-ethane, 5% of 1-[trans-4-(trans-4-propylcyclohexyl)-cyclohexyl]-2-(p-pentylphenyl)-ethane, 5% of 4-butyl-4'-propyl-tolane, 5% of 4-pentyl-4'-propyl-tolane, 5% of 4-methoxy-4'-ethyl-tolane, 7% of 4-(trans-4-propylcyclohexyl)-4,-methoxy-tolane, 6% of 4-(trans-4-propylcyclohexyl)-4'-ethoxy-tolane and 7% of 4-(trans-4-propylcyclohexyl)-4'-propoxy-tolane and a suitable chiral component (for example 0.7% of 2-octyl p-(p-n-hexylbenzoyloxy)-benzoate) exhibits short switching times.

EXAMPLE 3

An SLCD of the STN type having the following parameters:

| twisting angle | 220° |
|---|---|
| angle of incidence | 1° |
| d/p | 0.5 |
| d · Δn | 0.85 | containing a liquid crystal mixture having the following parameters:

| clearing point | 85° |
|---|---|
| Δn | 0.1494 |
| viscosity | 15 mPa · s | and consisting of a base mixture containing

13% of p-trans-4-propylcyclohexylbenzonitrile,

7% of trans-1-p-methoxyphenyl-4-propylcyclohexane,

15% of trans-1-p-isothiocyanato-4-propylcyclohexane,

7% of 1-[trans-4-(trans-4-propylcyclohexyl)-cyclohexyl]-2-(p-methylphenyl)-ethane, 7% of 1-[trans-4-(trans-4-propylcyclohexyl)-cyclohexyl]-2-(p-ethylphenyl)-ethane, 7% of 1-[trans-4-(trans-4-propylcyclohexyl)-cyclohexyl]-2-(p-propylphenyl)-ethane, 7% of 1-[trans-4-(trans-4-propylcyclohexyl)-cyclohexyl]-2-(p-pentylphenyl)-ethane, 8% of 1-[trans-4-(trans-4-propylcyclohexyl)-cyclohexyl]-2- (p-fluorophenyl)-ethane, 9% of 1-[trans-4-(trans-4-propylcyclohexyl)-cyclohexyl]-2-(p-cyanophenyl)-ethane, 5% of 4-butyl-4'-propyl-tolane, 5% of 4-pentyl-4'-propyl-tolane, 5% of 4-butyl-4'-pentyl-tolane, 5% of 4-methoxy-4'-ethyl-tolane, and a suitable chiral component (for example 0.7% of 2-octyl p-(p-n-hexylbenzoyloxy)-benzoate) exhibits short switching times.

EXAMPLE 4

An SLCD of the OMI type having the following parameters:

| twisting angle | 180° |
|---|---|
| angle of incidence | 1° |
| d/p (layer thickness/pitch) | 0.35 |
| d · Δn | 0.5 | containing a liquid crystal mixture having the following parameters:

| clearing point | 91° |
|---|---|
| Δn | 0.1020 |
| viscosity | 20.7 mPa · s |
| Δε | +6.8 | and consisting of

13% of p-trans-4-propylcyclohexyl-benzonitrile, 14.3% of 1-(trans-4-propylcyclohexyl)-2-(p-cyanophenyl)-ethane, 12% of 1-(trans-4-pentylcyclohexyl)-2-(p-cyanophenyl)-ethane, 7% of trans,trans-4-propoxy-4'-propylcyclohexylcyclohexane, 12% of trans,trans-4-ethoxy-4'-pentylcyclohexylcyclohexane, 6% of 1-[trans-4-(trans-4-propylcyclohexyl)-cyclohexyl]-2-(p-methylphenyl)-ethane, 6% of 1-[trans-4-(trans-4-propylcyclohexyl)-cyclohexyl]-2-(p-ethylphenyl)-ethane, 6% of 1-[trans-4-(trans-4-propylcyclohexyl)-cyclohexyl]-2-(p-propylphenyl)-ethane, 6% of 1-[trans-4-(trans-4-propylcyclohexyl)-cyclohexyl]-2-(p-pentylphenyl)-ethane, 5% of 1-[trans-4-(trans-4-propylcyclohexyl)-cyclohexyl]-2-(p-fluorophenyl)-ethane, 5% of 1-[trans-4-(trans-4-propylcyclohexyl)-cyclohexyl]-2-(p-cyanophenyl)-ethane, 4% of 4,4'-bis-(trans-4-propylcyclohexyl)-biphenyl, 3% of 4,4'-bis-(trans-4-pentylcyclohexyl)-biphenyl and 0.7% of optically active 2-octyl p-(p-n-hexylbenzoyloxy)-benzoate exhibits a switching time of $T_{on}$ 92 msec and $T_{off}$ 104 msec at an operating voltage of 21 volts.

EXAMPLE 5

An SLCD of the OMI type having the following parameters:

| twisting angle | 180° |
|---|---|
| angle of incidence | 1° |
| d/p (layer thickness/pitch) | 0.35 |
| d · Δn | 0.5 | containing a liquid crystal mixture having the following parameters:

| | |
|---|---|
| clearing point | 88° |
| Δn | 0.1003 |
| viscosity | 20 mPa · s |
| Δε | +6.8 | and consisting of

5% of p-trans-4-propylcyclohexyl-benzonitrile,

5% of p-trans-4-ethylcyclohexyl-benzonitrile, 14.3% of 1-(trans-4-propylcyclohexyl)-2-(p-cyanophenyl)-ethane, 12% of 1-(trans-4-pentylcyclohexyl)-2-(p-cyanophenyl)-ethane, 5% of trans-1-p-methoxyphenyl-4-propylcyclohexane, 10% of trans,trans-4-ethoxy-4'-pentylcyclohexylcyclohexane, 8% of 1-[trans-4-(trans-4-propylcyclohexyl)-cyclohexyl]-2-(p-methylphenyl)-ethane, 8% of 1-[trans-4-(trans-4-propylcyclohexyl)-cyclohexyl]-2-(p-ethylphenyl)-ethane, 8% of 1-[trans-4-(trans-4-propylcyclohexyl)-cyclohexyl]-2-(p-propylphenyl)-ethane, 8% of 1-[trans-4-(trans-4-propylcyclohexyl)-cyclohexyl]-2-(p-pentylphenyl)-ethane, 8% of 1-[trans-4-(trans-4-propylcyclohexyl)-cyclohexyl]-2-(p-fluorophenyl)-ethane, 8% of 1-[trans-4-(trans-4-propylcyclohexyl)-cyclohexyl]-2-(p-cyanophenyl)-ethane and 0.7% of optically active 2-octyl p-(p-n-hexylbenzoyloxy)-benzoate exhibits a switching time of $T_{on}$ 79 msec and $T_{off}$ 94 msec at an operating voltage of 20.5 volts.

Examples of liquid crystal mixtures according to the invention which exhibit short switching times in SLCD after doping with the usual chiral components are given below:

EXAMPLE 6

A liquid crystal mixture consisting of

15% of p-trans-4-propylcyclohexylbenzonitrile,

11% of p-trans-4-butylcyclohexylbenzonitrile,

14% of trans-1-p-methoxyphenyl-4-propylcyclohexane,

14% of trans,trans-4-methoxy-4'-pentylcyclohexylcyclohexane,

14% of trans,trans-4-ethoxy-4'-pentylcyclohexylcyclohexane,

6% of 1-[trans-4-(trans-4-propylcyclohexyl)-cyclohexyl]-2-(p-methylphenyl)-ethane, 6% of 1-[trans-4-(trans-4-propylcyclohexyl)-cyclohexyl]-2-(p-ethylphenyl)-ethane,.

6% of 1-[trans-4-(trans-4-propylcyclohexyl)-cyclohexyl]-2-(p-propylphenyl)-ethane, 6% of 1-[trans-4-(trans-4-propylcyclohexyl)-cyclohexyl]-2-(p-pentylphenyl)-ethane, 6% of 1-[trans-4-(trans-4-propylcyclohexyl)-cyclohexyl]-2-(p-cyanophenyl)-ethane, 6% of 1-[trans-4-(trans-4-propylcyclohexyl)-cyclohexyl]-2-(p-fluorophenyl)-ethane, 3% of 4,4'-bis-(trans-4-propylcyclohexyl)-biphenyl and 3% of 4-(trans-4-pentylcyclohexyl)-4'-(trans-4-propylcyclohexyl)-biphenyl exhibits the following parameters:

| | |
|---|---|
| clearing point | 90° |
| Δn | 0.0929 |
| viscosity | 18 mPa · s |
| Δε | +5.4 |

EXAMPLE 7

A liquid crystal mixture consisting of

12% of p-trans-4-propylcyclohexylbenzonitrile,

10% of p-trans-4-pentylcyclohexylbenzonitrile,

7% of 2-p-cyanophenyl-5-propyl-1,3-dioxane,

18% of trans,trans-4-propoxy-4'-propylcyclohexylcyclohexane,

7% of p-fluorophenyl trans,trans-4-propylcyclohexylcyclohexane-4'-carboxylate,

7% of p-fluorophenyl trans,trans-4-pentylcyclohexylcyclohexane-4'-carboxylate,

5% of p-propylphenyl trans,trans-4-propylcyclohexylcyclohexane-4'-carboxylate,

5% of p-pentylphenyl trans,trans-4-propylcyclohexylcyclohexane-4'-carboxylate,

9% of 1-[trans-4-(trans-4-propylcyclohexyl)-cyclohexyl]-2-(p-methylphenyl)-ethane, 10% of 1-[trans-4-(trans-4-propylcyclohexyl)-cyclohexyl]-2-(p-fluorophenyl)-ethane and 10% of 1-[trans-4-(trans-4-pentylcyclohexyl)-cyclohexyl]-2-(p-fluorophenyl)-ethane exhibits the following parameters:

| | |
|---|---|
| clearing point | 101° |
| Δn | 0.0899 |
| viscosity | 20 mPa · s |
| Δε | +6.5 |

EXAMPLE 8

A liquid crystal mixture consisting of

16% of p-trans-4-propylcyclohexylbenzonitrile,

11% of p-trans-4-butylcyclohexylbenzonitrile,

6% of 2-p-cyanophenyl-5-ethyl-1,3-dioxane,

9% of 2-p-cyanophenyl-5-propyl-1,3-dioxane,

2% of 4-cyano-3-fluorophenyl p-ethylbenzoate,

3% of 4-cyano-3-fluorophenyl p-propylbenzoate,

8% of trans,trans-4-propoxy-4'-propylcyclohexylcyclohexane,

7% of p-fluorophenyl trans,trans-4-propylcyclohexylcyclohexane-4'-carboxylate,

7% of p-fluorophenyl trans,trans-4-pentylcyclohexylcyclohexane-4'-carboxylate,

6% of 1-[trans-4-(trans-4-propylcyclohexyl)-cyclohexyl]-2-(p-methylphenyl)-ethane, 6% of 1-[trans-4-(trans-4-propylcyclohexyl)-cyclohexyl]-2-(p-ethylphenyl)[sic]-ethane, 6% of 1-[trans-4-(trans-4-propylcyclohexyl)-cyclohexyl]-2-(p-propylphenyl)-ethane, 6% of 1-[trans-4-(trans-4-propylcyclohexyl)-cyclohexyl]-2-(p-cyanophenyl)-ethane and 7% of 1-[trans-4-(trans-4-propylcyclohexyl)-cyclohexyl]-2-(p-fluorophenyl)-ethane exhibits the following parameters:

| | |
|---|---|
| clearing point | 86° |
| Δn | 0.1073 |
| viscosity | 24 mPa · s |

EXAMPLE 9

A liquid crystal mixture consisting of

13% of p-trans-4-propylcyclohexylbenzonitrile,
11% of p-trans-4-butylcyclohexylbenzonitrile,
12% of p-trans-4-ethylcyclohexylbenzonitrile,
19% of trans,trans-4-methoxy-4'-propylcyclohexylcyclohexane,
4% of 4-(trans-4-propylcyclohexyl)-4'-methoxy-tolane,
3% of 4-(trans-4-propylcyclohexyl)-4'-ethoxy-tolane,
7% of 1-[trans-4-(trans-4-propylcyclohexyl)-cyclohexyl]-2-(p-methylphenyl)-ethane,
7% of 1-[trans-4-(trans-4-propylcyclohexyl)-cyclohexyl]-2-(p-ethylphenyl)-ethane,
7% of 1-[trans-4-(trans-4-propylcyclohexyl)-cyclohexyl]-2-(p-propylphenyl)-ethane,
7% of 1-[trans-4-(trans-4-propylcyclohexyl)-cyclohexyl]-2-(p-pentylphenyl)-ethane and
10% of 1-[trans-4-(trans-4-propylcyclohexyl)-cyclohexyl]-2-(p-cyanophenyl)-ethane exhibits the following parameters:

| | |
|---|---|
| clearing point | 90° |
| Δn | 0.1108 |
| viscosity | 22 mPa · s |

EXAMPLE 10

A liquid crystal mixture consisting of

2% of 4-cyano-3-fluorophenyl p-ethylbenzoate,
3% of 4-cyano-3-fluorophenyl p-propylbenzoate,
8% of 4-cyano-3-fluorophenyl p-pentylbenzoate,
7% of 4-cyano-3-fluorophenyl p-(trans-4-propylcyclohexyl)-benzoate,
7% of 4-cyano-3-fluorophenyl p-(trans-4-butylcyclohexyl)-benzoate,
6% of 4-cyano-3-fluorophenyl p-(trans-4-pentylcyclohexyl)-benzoate,
16% of trans,trans-4-methoxy-4'-propylcyclohexylcyclohexane,
20% of trans,trans-4-methoxy-4'-pentylcyclohexylcyclohexane,
8% of 1-[trans-4-(trans-4-propylcyclohexyl)-cyclohexyl]-2-(p-methylphenyl)-ethane,
8% of 1-[trans-4-(trans-4-propylcyclohexyl)-cyclohexyl]-2-(p-ethylphenyl)-ethane,
8% of 1-[trans-4-(trans-4-propylcyclohexyl)-cyclohexyl]-2-(p-propylphenyl)-ethane and
8% of 1-[trans-4-(trans-4-propylcyclohexyl)-cyclohexyl]-2-(p-pentylphenyl)-ethane exhibits the following parameters:

| | |
|---|---|
| clearing point | 91° |
| Δn | 0.1003 |
| viscosity | 28 mPa · s |

EXAMPLE 11

A liquid crystal mixture consisting of

20% of p-trans-4-propylcyclohexylbenzonitrile,
10% of p-trans-4-pentylcyclohexylbenzonitrile,
10% of p-trans-4-ethylcyclohexylbenzonitrile,
3% of 4-cyano-3-fluorophenyl p-ethylbenzoate,
4% of 4-cyano-3-fluorophenyl p-propylbenzoate,
7% of trans-1-p-methoxyphenyl-4-propylcyclohexane,
8% of 1-[trans-4-(trans-4-propylcyclohexyl)-cyclohexyl]-2-(p-methylphenyl)-ethane,
8% of 1-[trans-4-(trans-4-propylcyclohexyl)-cyclohexyl]-2-(p-ethylphenyl)-ethane,
8% of 1-[trans-4-(trans-4-propylcyclohexyl)-cyclohexyl]-2-(p-propylphenyl)-ethane,
8% of 1-[trans-4-(trans-4-propylcyclohexyl)-cyclohexyl]-2-(p-pentylphenyl)-ethane,
8% of 1-[trans-4-(trans-4-propylcyclohexyl)-cyclohexyl]-2-(p-fluorophenyl)-ethane and
6% of 1-[trans-4-(trans-4-propylcyclohexyl)-cyclohexyl]-2-(p-fluorophenyl)-ethane exhibits the following parameters:

| | |
|---|---|
| clearing point | 80° |
| Δn | 0.1092 |
| viscosity | 19 mPa · s |

EXAMPLE 12

A liquid crystal mixture consisting of

20% of p-trans-4-propylcyclohexylbenzonitrile,
13% of p-trans-4-pentylcyclohexylbenzonitrile,
12% of p-trans-4-ethylcyclohexylbenzonitrile,
5% of 4-cyano-3-fluorophenyl p-(trans-4-propylcyclohexyl)-benzoate,
8% of trans-1-p-methoxyphenyl-4-propylcyclohexane,
7% of 1-[trans-4-(trans-4-propylcyclohexyl)-cyclohexyl]-2-(p-methylphenyl)-ethane,
8% of 1-[trans-4-(trans-4-propylcyclohexyl)-cyclohexyl]-2-(p-ethylphenyl)-ethane,
8% of 1-[trans-4-(trans-4-propylcyclohexyl)-cyclohexyl]-2-(p-propylphenyl)-ethane,
5% of 1-[trans-4-(trans-4-propylcyclohexyl)-cyclohexyl]-2-(p-pentylphenyl)-ethane,
8% of 1-[trans-4-(trans-4-propylcyclohexyl)-cyclohexyl]-2-(p-fluorophenyl)-ethane and
6% of 1-[trans-4-(trans-4-pentylcyclohexyl)-cyclohexyl]-2-(p-fluorophenyl)-ethane exhibits the following parameters:

| | |
|---|---|
| clearing point | 83° |
| Δn | 0.1097 |
| viscosity | 20 mPa · s |

EXAMPLE 13

A liquid crystal mixture consisting of

20% of p-trans-4-propylcyclohexylbenzonitrile,

7% of p-trans-4-pentylcyclohexylbenzonitrile,

10% of p-trans-4-ethylcyclohexylbenzonitrile,

17% of 1-(trans-4-propylcyclohexyl)-2-(p-cyanophenyl)-ethane,

5% of p-fluorophenyl trans,trans-4-propylcyclohexylcyclohexane-4'-carboxylate,

5% of p-fluorophenyl trans,trans-4-pentylcyclohexylcyclohexane-4'-carboxylate,

7% of 1-[trans-4-(trans-4-propylcyclohexyl)-cyclohexyl]-2-(p-methylphenyl)-ethane, 16% of 1-[trans-4-(trans-4-propylcyclohexyl)-cyclohexyl]-2-(p-ethylphenyl)-ethane, 6% of 1-[trans-4-(trans-4-propylcyclohexyl)-cyclohexyl]-2-(p-propylphenyl)-ethane, 9% of 1-[trans-4-(trans-4-propylcyclohexyl)-cyclohexyl]-2-(p-fluorophenyl)-ethane and 8% of 1-[trans-4-(trans-4-pentylcyclohexyl)-cyclohexyl]-2-(p-fluorophenyl)-ethane exhibits the following parameters:

| | |
|---|---|
| clearing point | 84° |
| Δn | 0.1082 |
| viscosity | 21 mPa · s |

EXAMPLE 14

A liquid crystal mixture consisting of

20% of p-trans-4-propylcyclohexylbenzonitrile,

10% of p-trans-4-pentylcyclohexylbenzonitrile,

10% of p-trans-4-ethylcyclohexylbenzonitrile,

3% of 4-cyano-3-fluorophenyl p-ethylbenzoate,

4% of 4-cyano-3-fluorophenyl[sic] p-propylbenzoate,

11% of trans-1-p-methoxyphenyl-4-propylcyclohexane,

4% of trans-4-propylcyclohexyl trans,trans-4-propylcyclohexyl-cyclohexane-4'-carboxylate, 4% of trans-4-pentylcyclohexyl trans,trans-4-propylcyclohexyl-cyclohexane-4'-carboxylate, 4% of trans-4-propylcyclohexyl trans,trans-4-butylcyclohexyl-cyclohexane-4'-carboxylate, 8% of 1-[trans-4-(trans-4-propylcyclohexyl)-cyclohexyl]-2-(p-methylphenyl)-ethane, 8% of 1-[trans-4-(trans-4-propylcyclohexyl)-cyclohexyl]-2-(p-ethylphenyl)-ethane and 6% of 1-[trans-4-(trans-4-propylcyclohexyl)-cyclohexyl]-2-(p-propylphenyl)-ethane exhibits the following parameters:

| | |
|---|---|
| clearing point | 77° |
| Δn | 0.1048 |
| viscosity | 20 mPa · s |

EXAMPLE 15

A liquid crystal mixture consisting of

20% of p-trans-4-propylcyclohexylbenzonitrile,

10% of p-trans-4-pentylcyclohexylbenzonitrile,

10% of p-trans-4-butylcyclohexylbenzonitrile,

3% of 4-cyano-3-fluorophenyl p-ethylbenzoate,

4% of 4-cyano-3-fluorophenyl p-propylbenzoate,

11% of trans-1-p-methoxyphenyl-4-propylcyclohexane,

6% of 1-[trans-4-(trans-4-propylcyclohexyl)-cyclohexyl]-2-(p-methylphenyl)-ethane, 6% of 1-[trans-4-(trans-4-propylcyclohexyl)-cyclohexyl]-2-(p-ethylphenyl)-ethane, 8% of 1-[trans-4-(trans-4-propylcyclohexyl)-cyclohexyl]-2-(p-propylphenyl)-ethane, 8% of 1-[trans-4-(trans-4-propylcyclohexyl)-cyclohexyl]-2-(p-pentylphenyl)-ethane, 9% of 1-[trans-4-(trans-4-propylcyclohexyl)-cyclohexyl]-2-(p-fluorophenyl)-ethane and 5% of 1-[trans-4-(trans-4-propylcyclohexyl)-cyclohexyl]-2-(p-cyanophenyl)-ethane exhibits the following parameters:

| | |
|---|---|
| clearing point | 81° |
| Δn | 0.1112 |
| viscosity | 20 mPa · s |

EXAMPLE 16

A liquid crystal mixture consisting of

20% of p-trans-4-propylcyclohexylbenzonitrile,

10% of p-trans-4-pentylcyclohexylbenzonitrile,

10% of p-trans-4-butylcyclohexylbenzonitrile,

3% of 4-cyano-3-fluorophenyl p-ethylbenzoate,

4% of 4-cyano-3-fluorophenyl p-propylbenzoate,

10% of trans-1-p-methoxyphenyl-4-propylcyclohexane,

6% of p-fluorophenyl trans,trans-4-propylcyclohexylcyclohexane-4'-carboxylate,

6% of 1-[trans-4-(trans-4-propylcyclohexyl)-cyclohexyl]-2-(p-methylphenyl)-ethane, 6% of 1-[trans-4-(trans-4-propylcyclohexyl)-cyclohexyl]-2-(p-ethylphenyl)-ethane, 8% of 1-[trans-4-(trans-4-propylcyclohexyl)-cyclohexyl]-2-(p-propylphenyl)-ethane, 8% of 1-[trans-4-(trans-4-propylcyclohexyl)-cyclohexyl]-2-(p-pentylphenyl)-ethane and 9% of 1-[trans-4-(trans-4-propylcyclohexyl)-cyclohexyl]-2-(p-fluorophenyl)-ethane exhibits the following parameters:

| | |
|---|---|
| clearing point | 80° |
| Δn | 0.1087 |
| viscosity | 19 mPa · s |

EXAMPLE 17

A liquid crystal mixture consisting of

20% of p-trans-4-propylcyclohexylbenzonitrile,
10% of p-trans-4-pentylcyclohexylbenzonitrile,
10% of p-trans-4-butylcyclohexylbenzonitrile,
3% of 4-cyano-3-fluorophenyl p-ethylbenzoate,
4% of 4-cyano-3-fluorophenyl p-propylbenzoate,
10% of trans-1-p-methoxyphenyl-4-propylcyclohexane,
6% of p-fluorophenyl trans,trans-4-propylcyclohexylcyclohexane-4'-carboxylate,
6% of p-fluorophenyl trans,trans-4-pentylcyclohexylcyclohexane-4'-carboxylate,
5% of 1-[trans-4-(trans-4-propylcyclohexyl)-cyclohexyl]-1-2-(p-methylphenyl)-ethane,
5% of 1-[trans-4-(trans-4-propylcyclohexyl)-cyclohexyl]-2-(p-ethylphenyl)-ethane,
6% of 1-[trans-4-(trans-4-propylcyclohexyl)-cyclohexyl]-2-(p-propylphenyl)-ethane,
6% of 1-[trans-4-(trans-4-propylcyclohexyl)-cyclohexyl]-2-(p-pentylphenyl)-ethane and
9% of 1-[trans-4-(trans-4-propylcyclohexyl)-cyclohexyl]-2-(p-fluorophenyl)-ethane
exhibits the following parameters:

| | |
|---|---|
| clearing point | 81° |
| Δn | 0.1085 |
| viscosity | 20 mPa · s |

EXAMPLE 18

A liquid crystal mixture consisting of

20% of p-trans-4-propylcyclohexylbenzonitrile,
10% of p-trans-4-pentylcyclohexylbenzonitrile,
10% of p-trans-4-butylcyclohexylbenzonitrile,
3% of 4-cyano-3-fluorophenyl p-ethylbenzoate,
4% of 4-cyano-3-fluorophenyl p-propylbenzoate,
12% of trans-1-p-methoxyphenyl-4-propylcyclohexane,
5% of p-propylphenyl trans,trans-4-propylcyclohexylcyclohexane-4'-carboxylate,
5% of p-pentylphenyl trans,trans-4-propylcyclohexylcyclohexane-4'-carboxylate,
4% of 1-[trans-4-(trans-4-propylcyclohexyl)-cyclohexyl]-2-(p-methylphenyl)-ethane,
5% of 1-[trans-4-(trans-4-propylcyclohexyl)-cyclohexyl]-2-(p-ethylphenyl)-ethane,
5% of 1-[trans-4-(trans-4-propylcyclohexyl)-cyclohexyl]-2-(p-propylphenyl)-ethane,
5% of 1-[trans-4-(trans-4-propylcyclohexyl)-cyclohexyl]-2-(p-pentylphenyl)-ethane,
8% of 1-[trans-4-(trans-4-propylcyclohexyl)-cyclohexyl]-2-(p-fluorophenyl)-ethane and
4% of 1-[trans-4-(trans-4-pentylcyclohexyl)-cyclohexyl]-2-(p-fluorophenyl)-ethane
exhibits the following parameters:

| | |
|---|---|
| clearing point | 79° |
| Δn | 0.1087 |
| viscosity | 19 mPa · s |

EXAMPLE 19

A liquid crystal mixture consisting of

3% of 4-cyano-3-fluorophenyl p-ethylbenzoate,
4% of 4-cyano-3-fluorophenyl p-propylbenzoate,
9% of 4-cyano-3-fluorophenyl p-pentylbenzoate,
4% of 4-cyano-3-fluorophenyl p-heptylbenzoate,
6% of 4-cyano-3-fluorophenyl p-(trans-4-propylcyclohexyl)-benzoate,
6% of 4-cyano-3-fluorophenyl p-(trans-4-butylcyclohexyl)-benzoate,
19% of trans-1-p-methoxyphenyl-4-propylcyclohexane,
17% of trans,trans-4-propoxy-4'-propylcyclohexylcyclohexane,
6% of p-fluorophenyl trans,trans-4-propylcyclohexylcyclohexane-4'-carboxylate,
6% of 1-[trans-4-(trans-4-propylcyclohexyl)-cyclohexyl]-2-(p-methylphenyl)-ethane,
6% of 1-[trans-4-(trans-4-propylcyclohexyl)-cyclohexyl]-3-2-(p-ethylphenyl)-ethane,
7% of 1-[trans-4-(trans-4-propylcyclohexyl)-cyclohexyl]-2-(p-propylphenyl)-ethane and
7% of 1-[trans-4-(trans-4-propylcyclohexyl)-cyclohexyl]-2-(p-pentylphenyl)-ethane,
exhibits the following parameters:

| | |
|---|---|
| clearing point | 79° |
| Δn | 0.1054 |
| viscosity | 22 mPa · s |

EXAMPLE 20

A liquid crystal mixture consisting of

10% of p-trans-4-propylcyclohexylbenzonitrile,
3% of 4-cyano-3-fluorophenyl p-ethylbenzoate,
4% of 4-cyano-3-fluorophenyl p-propylbenzoate,
10% of 4-cyano-3-fluorophenyl p-pentylbenzoate,
6% of 4-cyano-3-fluorophenyl p-(trans-4-propylcyclohexyl)-benzoate,
4% of 4-cyano-3-fluorophenyl p-(trans-4-butylcyclohexyl)-benzoate,
18% of trans-1-p-methoxyphenyl-4-propylcyclohexane,
10% of trans,trans-4-propoxy-4,-propylcyclohexylcyclohexane,
6% of 1-[trans-4-(trans-4-propylcyclohexyl)-cyclohexyl]-2-(p-methylphenyl)-ethane,
17% of 1-[trans-4-(trans-4-propylcyclohexyl)-cyclohexyl]-2-(p-ethylphenyl)-ethane, 7% of 1-[trans-4-(trans-4-propylcyclohexyl)-cyclohexyl]-2-(p-propylphenyl)-ethane 7% of 1-[trans-4-(trans-4-propylcyclohexyl)-cyclohexyl]-2-(p-pentylphenyl)-ethane and 8% of 1-[trans-4-(trans-4-propylcyclohexyl)-cyclohexyl]-2-(p-fluorophenyl)-ethane exhibits the following parameters:

| clearing point | 78° |
|---|---|
| Δn | 0.1085 |
| viscosity | 21 mPa · s |

EXAMPLE 21

A liquid crystal mixture consisting of

20% of p-trans-4-propylcyclohexylbenzonitrile,

6% of p-trans-4-pentylcyclohexylbenzonitrile,

3% of 4-cyano-3-fluorophenyl p-ethylbenzoate,

4% of 4-cyano-3-fluorophenyl p-propylbenzoate,

9% of 4-cyano-3-fluorophenyl p-pentylbenzoate,

10% of trans-1-p-methoxyphenyl-4-propylcyclohexane,

7% of trans-1-p-ethoxyphenyl-4-propylcyclohexane,

6% of p-fluorophenyl trans,trans-4-propylcyclohexylcyclohexane-4'-carboxylate,

6% of 1-[trans-4-(trans-4-propylcyclohexyl)-cyclohexyl)-2-(p-methylphenyl)-ethane, 6% of 1-(trans-4-(trans-4-propylcyclohexyl)-cyclohexyl]-2-(p-ethylphenyl)-ethane, 7% of 1-[trans-4-(trans-4-propylcyclohexyl)-cyclohexyl]-2-(p-propylphenyl)-ethane, 7% of 1-[trans-4-(trans-4-propylcyclohexyl)-cyclohexyl]-2-(p-pentylphenyl)-ethane and 9% of 1-[trans-4-(trans-4-propylcyclohexyl)-cyclohexyl]-2-(p-fluorophenyl)-ethane exhibits the following parameters:

| clearing point | 74° |
|---|---|
| Δn | 0.1101 |
| viscosity | 19 mPa · s |

The mixtures of Examples 9 to 21 are particularly suitable for OMI uses.

The following Tables 1 to 16 show the composition of the mixtures of Examples 22 to 132, the individual compounds being coded as follows:

AIII1: 1-[trans-4-(trans-4-propylcyclohexyl)-cyclohexyl]-(2-p-methylphenyl)-ethane AIII2: 1-[trans-4-(trans-4-propylcyclohexyl)-cyclohexyl]-(2-p-ethylphenyl)-ethane AIII3: 1-[trans-4-(trans-4-propylcyclohexyl)-cyclohexyl]-(2-p-propylphenyl)-ethane AIII4: 1-[trans-4-(trans-4-propylcyclohexyl)-cyclohexyl]-(2-p-butylphenyl)-ethane AIII5: 1-[trans-4-(trans-4-propylcyclohexyl)-cyclohexyl]-(2-p-pentylphenyl)-ethane BIII1: trans,trans-4-propyl-4'-methoxy-cyclohexylcyclohexane BIII2: trans,trans-4-propyl-4'-ethoxy-cyclohexylcyclohexane BIII3: trans,trans-4-propyl-4'-propoxy-cyclohexylcyclohexane BIII4: trans,trans-4-pentyl-4'-methoxy-cyclohexylcyclohexane BIII5: trans,trans-4-pentyl-4'-ethoxy-cyclohexylcyclohexane BIII6: trans,trans-4-propyl-4'-butyryloxy-cyclohexylcyclohexane BIII7: trans-trans-4-propyl-4'-hexanoyloxy-cyclohexylcyclohexane BIII8: trans-4-propylcyclohexyl trans-4-propylcyclohexylcarboxylate BIII9: trans-4-propylcyclohexyl trans-4-pentylcyclohexylcarboxylate BIV1: trans-1-p-methoxyphenyl-4-propylcyclohexane BIV2: trans-1-p-ethoxyphenyl-4-propylcyclohexane BIV3: trans-1-p-butoxyphenyl-4-propylcyclohexane BIV4: trans-1-p-methoxyphenyl-4-pentylcyclohexane BIV5: trans-1-p-propylphenyl-4-pentylcyclohexane BIV6: trans-1-p-ethylphenyl-4-pentylcyclohexane BV1: p-fluorophenyl trans,trans-4-propylcyclohexylcyclohexane-4'-carboxylate BV2: -p-fluorophenyl trans,trans-4-pentylcyclohexylcyclohexane- 4'-carboxylate BV3: trans-4-propylcyclohexyl trans,trans-4-propylcyclohexylcyclohexane-4'-carboxylate BV4: trans-4-pentylcyclohexyl trans,trans-4-propylcyclohexylcyclohexane-4'-carboxylate BV5: trans-4-propylcyclohexyl trans,trans-4-butylcyclohexylcyclohexane-4'-carboxylate BV6: trans-4-pentylcyclohexyl trans,trans-4-butylcyclohexylcyclohexane-4'-carboxylate BV7: p-propylphenyl trans,trans-4-propylcyclohexylcyclohexane-4'-carboxylate BV8: p-pentylphenyl trans,trans-4-propylcyclohexylcyclohexane-4'-carboxylate BV9: p-propylphenyl trans-trans-4-butylcyclohexylcyclohexane-4'-carboxylate BV10: p-pentylphenyl trans,trans-4-butylcyclohexylcyclohexane-4'-carboxylate BVI1: 1-[trans-4-(trans-4-propylcyclohexyl)-cyclohexyl]-2-(p-fluorophenyl)-ethane BVI2: 1-[trans-4-(trans-4-pentylcyclohexyl)-cyclohexyl]-2-(p-fluorophenyl)-ethane BVIII1: 2-p-ethylphenyl-5-propyl-pyrimidine BVIII2: 2-p-propylphenyl-5-propyl-pyrimidine BVIII3: 2-p-propylphenyl-5-pentyl-pyrimidine BVIII4: 2-p-ethylphenyl-5-heptyl-pyrimidine BVIII5: 2-p-pentyloxyphenyl-5-hexyl-pyrimidine BVIII6: 2-p-heptyloxyphenyl-5-hexyl-pyrimidine BVIII7: 2-p-nonyloxyphenyl-5-hexyl-pyrimidine BVIII8: 2-p-heptyloxyphenyl-5-heptyl-pyrimidine BVIII9: 2-p-nonyloxyphenyl-5-heptyl-pyrimidine BVIII10: 2-p-hexyloxyphenyl-5-nonyl-pyrimidine BVIII11: 2-p-nonyloxyphenyl-5-nonyl-pyrimidine C1: p-trans-4-ethylcyclohexylbenzonitrile C2: p-trans-4-propylcyclohexylbenzonitrile C3: p-trans-4-butylcyclohexylbenzonitrile C4: -p-trans-4-pentylcyclohexylbenzonitrile C5: 1-(trans-4-propylcyclohexyl)-2-(p-cyanophenyl)ethane C6: 1-(trans-4-pentylcyclohexyl)-2-(p-cyanophenyl)ethane
C7: 4-ethyl-4'-cyanobiphenyl
C8: 4-propyl-4'-cyanobiphenyl
C9: 4-pentyl-4'-cyanobiphenyl
C10: 2-p-cyanophenyl-5-propyl-1,3-dioxane
C11: 2-p-cyanophenyl-5-butyl-1,3-dioxane
C12: 2-p-cyanophenyl-5-pentyl-1,3-dioxane
C13: trans-1-p-isothiocyanatophenyl-4-propylcyclohexane
C14: 1-[trans-4-(trans-4-propylcyclohexyl)-cyclohexyl]-2-(p-cyanophenyl)-ethane
C15: 4-cyano-3-fluorophenyl p-ethylbenzoate
C16: 4-cyano-3-fluorophenyl p-propylbenzoate
C17: 4-cyano-3-fluorophenyl p-pentylbenzoate
C18: 4-cyano-3-fluorophenyl p-heptylbenzoate
C19: 4-cyano-3-fluorophenyl p-(trans-4-propylcyclohexyl)-benzoate
C20: 4-cyano-3-fluorophenyl p-(trans-4-butylcyclohexyl)-benzoate
C21: 4-cyano-3-fluorophenyl p-(trans-4-pentylcyclohexyl)-benzoate
C22: 2-(3-fluoro-4-cyanophenyl)-5-pentyl-pyrimidine
C23: 2-(3-fluoro-4-cyanophenyl)-5-hexyl-pyrimidine
C24: 2-(3-fluoro-4-cyanophenyl)-5-heptyl-pyrimidine
F1: trans-1-p-fluorophenyl-4-pentylcyclohexane
F2: trans-1-p-fluorophenyl-4-hexylcyclohexane
F3: trans-1-p-fluorophenyl-4-heptylcyclohexane
H1: 4-butyl-4'-propyl-tolan
H2: 4-pentyl-4'-propyl-tolan
H3: 4-butyl-4'-pentyl-tolan
H4: 4-ethyl-4'-methoxy-tolan
H5: 4-methyl-4'-ethoxy-tolan
H6: 4-(trans-4-propylcyclohexyl)-4'-methoxy-tolan
H7: 4-(trans-4-propylcyclohexyl)-4'-ethoxy-tolan
H8: 4-(trans-4-propylcyclohexyl)-4'-propoxy-tolan
K1: 4-ethyl-4'-(trans-4-propylcyclohexyl)-biphenyl
K2: 4-ethyl-4'-(trans-4-pentylcyclohexyl)-biphenyl
K3: 4-nonyl-4'-(trans-4-pentylcyclohexyl)-biphenyl
K4: 4-ethyl-4'-(trans-4-pentylcyclohexyl)-2'-fluorobiphenyl
K5: 1-(trans-4-pentylcyclohexyl)-2-(4'-ethyl-2'-fluorobiphenyl-4-yl)-ethane
L1: 4,4'-bis-(trans-4-propylcyclohexyl)-biphenyl
L2: 4-(trans-4-pentylcyclohexyl)-4,-(trans-4-propylcyclohexyl)-biphenyl
L3: 4,4'-bis-(trans-4-pentylcyclohexyl)-biphenyl
L4: 4,4-bis-(trans-4-propylcyclohexyl)-2-fluorobiphenyl
L5: 4-(trans-4-pentylcyclohexyl)-4'-(trans-4-propylcyclohexyl)-2-fluorobiphenyl
L6: 4,4'-bis-(trans-4-pentylcyclohexyl)-2-fluorobiphenyl.

The data for Examples 22 to 132 are to be found in Table 17.

TABLE 1

Percentage composition of the liquid crystal mixtures corresponding to the Examples 22 to 50 in respect of components of groups A to B V

| Compound | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 |
|---|---|---|---|---|---|---|---|---|---|---|---|---|---|---|---|---|---|---|---|---|---|---|---|---|---|---|---|---|---|
| A III 1 | 8 | 7 | 8 | 8 | 7 | 8 | 8 | 8 | 7 | 7 | 8 | 6 | 7 | 7 | 8 | 6 | 7 | 7 | 5 | 8 | 7 | 6 | 6 | 6 | 4 | 5 | 7 | 7 | 7 |
| A III 2 | 8 | 7 | 8 | 8 | 7 | 8 | 8 | 8 | 6 | 6 | 8 | 4 | 6 | 7 | 8 | 6 | 7 | 6 | 5 | 8 | 8 | | 6 | 5 | 4 | 6 | 7 | 7 | 7 |
| A III 3 | 8 | 8 | 8 | 8 | 8 | 8 | 8 | 8 | 6 | 6 | 6 | 4 | 6 | 7 | 8 | 6 | 7 | 6 | 5 | 8 | 8 | 6 | 6 | 5 | 4 | 6 | 7 | 7 | 7 |
| A III 4 | | | | | | | | | | | | | | | | | | | | | | | | | | | | | |
| A III 5 | 8 | 8 | 8 | 8 | 8 | 8 | 8 | 8 | 6 | | | 5 | 7 | 7 | 6 | 7 | 5 | 5 | 8 | 5 | 6 | 6 | 5 | 4 | 7 | 7 | 7 | 7 | |
| B III 1 | | | | | | | | | | | | | | | 16 | | | | | | | 10 | | | | | | | |
| B III 2 | | | | | | | | | | | | | | | | | | | | | | | 5 | | | | | | |
| B III 3 | | | | | | | | | | | | | | | | | 18 | | | | | | | | 16 | | | | |
| B III 4 | | | | | | | | | | | | | | 19 | 20 | | 9 | | | | | | | | | | | | |
| B III 5 | | | | | | | | | | | | | | | | | | | | | | | | | 14 | | | | |
| B III 6 | | | | | | | | | | | | | | | | | | | | | | | | | | | | | |
| B III 7 | | | | | | | | | | | | | | | | | | | | | | | | | | | | | |
| B III 8 | | | | | | | | | | | | | | | | | | | | | | | | | | | | | |
| B III 9 | | | | | | | | | | | | | | | | | | | | | | | | | | | | | |
| B IV 1 | 12 | 19 | 15 | 17 | 10 | 17 | 14 | 15 | | | 11 | 2 | | | | | | | 20 | 7 | 8 | 12 | 13 | 10 | 18 | 18 | 18 | | 12 |
| B IV 2 | | | | | | | | | | | | | | | | | | | | | | | | | | | | | |
| B IV 3 | | | | | | | | | | | | | | | | | | | | | | | | | | | | | |
| B IV 4 | | | | | | | | | | | | | | | | | | | | | 16 | | | | | | | | |
| B IV 5 | | 5 | 7 | | 5 | 5 | | 7 | | | | | | | | | | | | | | | | | | | | 7 | |
| B IV 6 | | | | | | | | | | | | | | | | | | | | | | | | | | | | | |
| B V 1 | | | | | | | | | 6 | 5 | | | | | | | | | | | | | | | | | | | |
| B V 2 | | | | | | | | | 4 | 5 | | | | | | | | | | | | | | | | | | | |
| B V 3 | | | | | | | | | | | 4 | 4 | | | | | | | | | | | | | | | | | |
| B V 4 | | | | | | | | | | | 4 | 4 | | | | | | | | | | | | | | | | | |
| B V 5 | | | | | | | | | | | 4 | | | | | | | | | | | | | | | | | | |
| B V 6 | | | | | | | | | | | | | | | | | | | | | | | | | | | | | |
| B V 7 | | | | | | | | | | | | | | | | | | | | | | | | | | | | | |
| B V 8 | | | | | | | | | | | | | | | | | | | | | | | | | | | | | |
| B V 9 | | | | | | | | | | | | | | | | | | | | | | | | | | | | | |
| B V 10 | | | | | | | | | | | | | | | | | | | | | | | | | | | | | |

TABLE 2

Percentage composition of the liquid crystal mixtures corresponding to the Examples 51 to 80 in respect of components of groups A to B V

| Compound | \multicolumn{15}{c}{Example} |
|---|---|---|---|---|---|---|---|---|---|---|---|---|---|---|---|
|  | 51 | 52 | 53 | 54 | 55 | 56 | 57 | 58 | 59 | 60 | 61 | 62 | 63 | 64 | 65 |
| A III 1 | 9 | 8 | 8 | 7 | 8 | 8 | 8 | 8 | 9 | 9 | 9 | 7 | 8 | 7 | 7 |
| A III 2 | 9 | 9 | 8 | 7 | 8 | 8 | 8 | 7 | 9 | 9 | 9 | 7 | 7 | 7 | 8 |
| A III 3 | 9 | 9 | 8 | 7 | 8 | 8 | 7 | 7 | 9 | 9 | 9 | 7 | 8 | 7 | 8 |
| A III 4 |   |   |   |   |   |   |   |   |   |   |   |   |   |   |   |
| A III 5 | 9 | 9 | 8 | 7 | 8 | 8 | 7 | 7 | 9 | 9 | 9 | 7 | 8 | 7 | 8 |
| B III 1 |   |   |   |   |   |   |   |   |   |   |   |   |   |   |   |
| B III 2 |   |   |   |   |   |   |   |   |   |   |   |   |   |   |   |
| B III 3 |   |   |   |   |   |   |   |   |   |   |   |   |   |   |   |
| B III 4 |   |   |   |   |   |   |   |   |   |   |   |   |   |   |   |
| B III 5 |   |   |   |   |   |   |   |   |   |   |   |   |   |   |   |
| B III 6 |   |   |   |   |   |   |   |   |   |   |   |   |   |   |   |
| B III 7 |   |   |   |   |   |   |   |   |   |   |   |   |   |   |   |
| B III 8 |   |   |   |   |   |   |   |   |   |   |   |   |   |   |   |
| B III 9 |   |   |   |   |   |   |   |   |   |   |   |   |   |   |   |
| B IV 1 | 10 |   | 9 |   |   |   |   |   |   |   |   |   |   | 12 |   |
| B IV 2 |   |   |   |   | 10 | 10 |   |   |   |   |   |   |   |   |   |
| B IV 3 |   |   |   |   |   |   |   |   |   |   |   |   |   |   |   |
| B IV 4 |   |   |   |   |   |   |   |   |   |   |   |   |   |   |   |
| B IV 5 | 15 | 17 |   |   | 5 | 5 |   |   | 15 | 5 | 5 |   | 7 |   | 10 |
| B IV 6 |   |   |   |   |   |   |   | 7 |   |   |   |   |   |   |   |
| B V 1 |   |   |   |   |   |   |   |   |   |   |   |   |   |   |   |
| B V 2 |   |   |   |   |   |   |   |   |   |   |   |   |   |   |   |
| B V 3 |   |   |   |   |   |   |   |   |   |   |   |   |   |   |   |
| B V 4 |   |   |   |   |   |   |   |   |   |   |   |   |   |   |   |
| B V 5 |   |   |   |   |   |   | 4 |   |   |   |   |   |   |   |   |
| B V 6 |   |   |   |   |   |   |   |   |   |   |   |   |   |   |   |
| B V 7 |   |   |   |   |   |   |   |   |   |   |   |   |   |   |   |
| B V 8 |   |   |   |   |   |   |   |   |   |   |   |   |   |   |   |
| B V 9 |   |   |   |   |   |   |   |   |   |   |   |   |   |   |   |
| B V 10 |   |   |   |   |   |   |   |   |   |   |   |   |   |   |   |

| Compound | \multicolumn{15}{c}{Example} |
|---|---|---|---|---|---|---|---|---|---|---|---|---|---|---|---|
|  | 66 | 67 | 68 | 69 | 70 | 71 | 72 | 73 | 74 | 75 | 76 | 77 | 78 | 79 | 80 |
| A III 1 | 7 | 8 | 8 | 8 | 8 | 8 | 7 | 8 | 7 | 6 | 5 |   | 6 | 7 | 8 |
| A III 2 | 8 | 8 | 7 | 8 | 8 | 8 | 7 | 8 | 7 | 6 |   |   | 6 | 7 |   |
| A III 3 | 8 | 7 | 7 | 8 | 8 | 8 | 7 | 8 | 7 | 6 | 5 | 6 | 7 | 7 | 8 |
| A III 4 |   |   |   |   |   |   |   |   |   |   |   |   |   |   |   |
| A III 5 | 8 | 7 | 7 | 8 | 8 | 8 | 7 | 8 | 7 | 7 | 5 | 5 | 7 | 7 | 8 |
| B III 1 |   |   |   |   |   |   |   |   |   |   |   |   |   |   |   |
| B III 2 |   |   |   |   |   |   |   |   |   |   |   |   |   |   |   |
| B III 3 |   |   |   |   |   |   |   | 10 |   |   |   |   |   |   |   |
| B III 4 |   |   |   |   |   |   |   |   |   |   |   |   |   |   |   |
| B III 5 |   |   |   |   |   |   |   |   |   |   |   |   |   |   |   |
| B III 6 |   |   |   |   |   |   |   |   |   |   |   |   |   |   |   |
| B III 7 |   |   |   |   |   |   |   |   |   |   |   |   |   |   |   |
| B III 8 |   |   |   |   |   |   |   |   |   |   |   |   |   |   |   |
| B III 9 |   |   |   |   |   |   |   |   |   |   |   |   |   |   |   |
| B IV 1 | 13 |   |   |   |   |   |   |   |   |   |   |   |   |   |   |
| B IV 2 |   |   |   | 9 | 11 |   |   |   |   | 5 | 10 | 16 | 8 | 13 | 9 |
| B IV 3 |   |   |   |   |   |   |   |   |   |   |   | 12 |   |   |   |
| B IV 4 |   |   |   |   |   |   |   |   |   |   |   |   |   |   |   |
| B IV 5 |   |   |   |   |   |   |   |   |   |   |   |   |   |   |   |
| B IV 6 |   |   | 7 | 8 |   | 4 | 15 | 10 |   | 10 | 10 | 17 | 10 | 12 | 10 |
| B V 1 |   |   |   |   |   |   |   |   |   |   |   |   |   |   |   |
| B V 2 |   |   |   |   |   |   |   |   |   |   |   |   |   |   |   |
| B V 3 |   |   |   |   |   |   |   |   |   |   |   |   |   |   |   |
| B V 4 |   |   |   |   |   |   |   |   |   |   |   |   |   |   |   |
| B V 5 |   | 4 |   |   |   |   |   |   |   |   |   |   |   |   |   |
| B V 6 |   |   |   |   |   |   |   |   |   |   |   |   |   |   |   |
| B V 7 |   |   |   |   |   | 5 |   |   |   |   |   |   |   |   |   |
| B V 8 |   |   |   |   |   | 4 |   |   |   |   |   |   |   |   |   |
| B V 9 |   |   |   |   |   |   |   |   |   |   |   |   |   |   |   |
| B V 10 |   |   |   |   |   |   |   |   |   |   |   |   |   |   |   |

TABLE 3

Percentage composition of the liquid crystal mixtures corresponding to the Examples 81 to 111 in respect of components of groups A to B V

| Compound | 81 | 82 | 83 | 84 | 85 | 86 | 87 | 88 | 89 | 90 | 91 | 92 | 93 | 94 | 95 | 96 | 97 | 98 | 99 |
|---|---|---|---|---|---|---|---|---|---|---|---|---|---|---|---|---|---|---|---|
| A III 1 | 7 |  | 5 | 5 | 5 | 5 | 5 | 7 | 8 | 8 | 7 | 9 | 8 | 7 | 8 | 8 | 8 | 4 | 8 |
| A III 2 | 7 | 9 | 5 |  | 5 | 5 | 4 |  |  |  |  |  |  |  |  |  |  |  | 8 |
| A III 3 | 7 | 8.1 | 4 |  |  |  |  | 7 | 7 | 8 | 7 |  | 7 | 7 | 8 | 9 | 8 | 8 | 8 |
| A III 4 |  |  |  |  |  |  |  |  |  |  |  |  |  |  |  |  |  |  |  |
| A III 5 | 7 | 8.1 | 4 |  |  | 5 |  |  | 7 | 8 |  |  | 7 | 7 | 7 | 9 | 7 | 9 | 8 |
| B III 1 |  |  | 19 |  |  |  |  |  |  |  |  |  |  |  |  |  |  |  |  |
| B III 2 |  |  |  |  |  |  |  |  |  |  |  |  |  |  |  |  |  |  |  |
| B III 3 |  |  |  |  |  |  |  |  |  | 14 | 16 | 15 | 16 |  |  | 16 |  |  |  |
| B III 4 |  |  |  |  |  |  |  |  |  |  |  |  |  |  |  |  |  |  |  |
| B III 5 |  |  |  |  |  |  |  |  |  |  |  |  |  |  |  |  |  |  |  |
| B III 6 |  |  |  | 7 | 5 | 7 | 9 | 7 | 7 |  |  |  |  |  |  |  |  |  |  |
| B III 7 |  |  |  | 6 | 6 | 7 | 7 | 7 | 7 |  |  |  |  |  |  |  |  |  |  |
| B III 8 |  |  |  |  |  |  |  |  |  |  |  |  |  | 8 |  |  |  |  |  |
| B III 9 |  |  |  |  |  |  |  |  |  |  |  |  |  | 8 |  |  |  |  |  |
| B IV 1 |  |  |  |  |  |  |  |  |  |  |  |  |  |  |  |  |  |  |  |
| B IV 2 |  |  |  |  |  |  |  | 12 | 12 | 8 | 10 |  | 10 | 13 | 19 | 10 | 19 | 17 | 19 |
| B IV 3 |  |  |  |  |  |  |  |  |  |  |  |  |  |  | 10 |  | 10 | 3 | 10 |
| B IV 4 |  |  |  |  |  |  |  |  |  |  |  |  |  |  |  |  |  |  |  |
| B IV 5 |  |  |  |  |  |  |  |  |  |  |  |  |  |  |  |  |  |  |  |
| B IV 6 |  | 11.7 |  |  |  |  |  |  |  |  |  |  |  |  |  |  |  |  |  |
| B V 1 |  |  |  | 7 | 7 | 7 | 7 | 8 | 8 | 8 | 8 | 7 | 8 | 8 | 8 | 8 | 8 | 8 | 8 |
| B V 2 |  |  |  | 7 | 7 | 7 | 7 | 8 | 8 | 8 | 8 | 7 | 8 | 8 | 8 | 8 | 8 | 8 | 8 |
| B V 3 |  |  |  |  |  |  |  |  |  |  |  |  |  |  |  |  |  |  |  |
| B V 4 |  |  |  |  |  |  |  |  |  |  |  |  |  |  |  |  |  |  |  |
| B V 5 |  |  |  |  |  |  |  |  |  |  |  |  |  |  |  |  |  |  |  |
| B V 6 |  |  |  |  |  |  |  |  |  |  |  |  |  |  |  |  |  |  |  |
| B V 7 |  |  |  | 8 | 6 | 7 | 6 | 7 | 6 |  | 7 | 7 | 6 | 7 | 6 | 6 | 6 | 9 |  |
| B V 8 |  |  |  | 8 | 7 |  | 5 |  |  |  |  | 6 |  |  |  |  |  | 9 |  |
| B V 9 |  |  |  |  |  |  |  |  |  |  |  |  |  |  |  |  |  |  |  |
| B V 10 |  |  |  |  |  |  |  |  |  |  |  |  |  |  |  |  |  |  |  |

| Compound | 100 | 101 | 102 | 103 | 104 | 105 | 106 | 107 | 108 | 109 | 110 | 111 |
|---|---|---|---|---|---|---|---|---|---|---|---|---|
| A III 1 |  | 5 | 11 | 9 | 9 |  | 9 | 7 |  | 8 |  |  |
| A III 2 |  |  |  |  |  |  |  |  |  |  |  |  |
| A III 3 | 6 | 7 | 10 | 9 | 9 | 12 | 10 | 9 | 10 | 10 | 9 | 10 |
| A III 4 |  |  |  |  |  |  |  |  |  |  |  |  |
| A III 5 | 5 |  | 10 | 9 | 8 | 11 | 9 |  |  |  |  | 11 |
| B III 1 |  | 7 |  |  |  |  |  |  |  |  |  |  |
| B III 2 |  |  |  |  |  |  |  |  |  |  |  |  |
| B III 3 |  |  |  | 12 | 13 | 17 | 14 |  | 22 | 21 |  | 10 |
| B III 4 |  |  |  |  |  |  |  |  |  |  |  |  |
| B III 5 |  |  |  | 5 | 11 | 6 | 12 |  | 11 | 5 |  |  |
| B III 6 |  |  |  |  |  |  |  |  |  |  |  |  |
| B III 7 |  |  |  |  |  |  |  |  |  |  |  |  |
| B III 8 |  |  |  |  |  |  |  | 8 |  |  | 9 |  |
| B III 9 |  |  |  |  |  |  |  | 8 |  |  | 9 |  |
| B IV 1 |  |  | 8 |  |  |  |  |  |  |  |  | 9 |
| B IV 2 |  |  | 9 | 10 |  | 5 |  | 15 | 5 | 7 | 12 | 10 |
| B IV 3 |  |  | 9 |  |  |  |  |  |  |  |  |  |
| B IV 4 |  |  |  |  |  |  |  |  |  |  |  |  |
| B IV 5 |  |  |  |  |  |  |  |  |  |  |  |  |
| B IV 6 |  |  |  |  |  |  |  |  |  |  |  |  |
| B V 1 | 7 |  | 7 | 9 | 9 | 9 | 9 | 8 | 9 | 9 | 9 | 7 |
| B V 2 | 6 |  | 6 | 9 | 9 | 9 | 9 | 8 | 9 | 9 | 9 | 6 |
| B V 3 |  | 3 |  |  |  |  |  |  |  |  |  |  |
| B V 4 |  | 2 |  |  |  |  |  |  |  |  |  |  |
| B V 5 |  | 3 |  |  |  |  |  | 2 |  |  |  |  |
| B V 6 |  | 3 |  |  |  |  |  | 2 |  |  |  |  |
| B V 7 | 5 |  |  |  |  |  |  | 3 |  |  | 4 |  |
| B V 8 | 5 |  |  |  |  |  |  |  |  |  |  |  |
| B V 9 | 4 |  |  |  |  |  |  |  |  |  | 3 |  |
| B V 10 | 4 |  |  |  |  |  |  |  |  |  | 3 |  |

TABLE 4

Percentage composition of the liquid crystal mixtures corresponding to the Examples 112 to 132 in respect of components of groups A to B V

| Compound | Example | | | | | | | | | | |
|---|---|---|---|---|---|---|---|---|---|---|---|
| | 112 | 113 | 114 | 115 | 116 | 117 | 118 | 119 | 120 | 121 | 122 |
| A III 1 | | | | | | | | | | | |
| A III 2 | | | | | | | | | | | |
| A III 3 | 11 | 8 | 9 | 4 | 7 | 11 | 11 | 12 | 4 | 11 | 11 |
| A III 4 | | | | | | | | | | | |
| A III 5 | 10 | 13 | 8 | | 6 | 10 | 12 | 12 | | 10 | 12 |
| B III 1 | 12 | 15 | 12 | | | | | | | | |
| B III 2 | | | | | | | | | | | |
| B III 3 | 12 | 14 | 12 | 19 | 19 | 20 | 15 | 18 | 19 | 20 | 15 |
| B III 4 | | | | 12 | 12 | 10 | 7 | 8 | 12 | 10 | 7 |
| B III 5 | | | | 7 | 10 | 11 | 8 | 9 | 7 | 11 | 8 |
| B III 6 | | | | | | | | | | | |
| B III 7 | | | | | | | | | | | |
| B III 8 | | | | | | | | | | | |
| B III 9 | | | | | | | | | | | |
| B IV 1 | 5 | | 5 | | | | | | | | |
| B IV 2 | | | | | | | | | | | |
| B IV 3 | | | | | | | | | | | |
| B IV 4 | | | | | | | | | | | |
| B IV 5 | | | | | | | | | | | |
| B IV 6 | | | | | | | | | | | |
| B V 1 | 7 | 7 | 7 | 8 | | | 7 | | 8 | | 7 |
| B V 2 | 6 | 6 | 6 | 6 | | | 8 | | 6 | | 8 |
| B V 3 | | | | | | | | | | | |
| B V 4 | | | | | | | | | | | |
| B V 5 | | | | | | | | | | | |
| B V 6 | | | | | | | | | | | |
| B V 7 | | | | | | | | 4 | | | |
| B V 8 | | | | | | | | 4 | | | |
| B V 9 | | | | | | | | 5 | | | |
| B V 10 | | | | | | | | | | | |

| Compound | Example | | | | | | | | | |
|---|---|---|---|---|---|---|---|---|---|---|
| | 123 | 124 | 125 | 126 | 127 | 128 | 129 | 130 | 131 | 132 |
| A III 1 | | 6 | 5 | 5 | 9 | | 9 | 9 | 5 | |
| A III 2 | | 6 | 5 | 4 | | | | | | |
| A III 3 | 12 | 5 | | | 9 | 6 | 9 | 9 | 7 | 6 |
| A III 4 | | | | | | | | | | |
| A III 5 | 12 | 5 | 5 | | 8 | 5 | 8 | 8 | | 5 |
| B III 1 | | 14 | | | | | | | 7 | |
| B III 2 | | | | | | | | | | |
| B III 3 | 18 | 10 | | | 12 | | 12 | 12 | | |
| B III 4 | 8 | | | | 10 | | 8 | 6 | | |
| B III 5 | 9 | | | | 11 | | 10 | 11 | | |
| B III 6 | | | 7 | 9 | | | | | | |
| B III 7 | | | 7 | 7 | | | | | | |
| B III 8 | | | | | | | | | | |
| B III 9 | | | | | | | | | | |
| B IV 1 | | | | | | | | | | |
| B IV 2 | | | | | | | | | | |
| B IV 3 | | | | | | | | | | |
| B IV 4 | | | | | | | | | | |
| B IV 5 | | | | | | | | | | |
| B IV 6 | | | | | | | | | | |
| B V 1 | | | 7 | 7 | 7 | 7 | 9 | 9 | | 7 |
| B V 2 | | | 7 | 7 | 7 | 6 | 9 | 9 | | 6 |
| B V 3 | | 5 | | | | | | | 3 | |
| B V 4 | | 5 | | | | | | | 2 | |
| B V 5 | | 4 | | | | | | | 3 | |
| B V 6 | | | | | | | | | 3 | |
| B V 7 | 4 | | 7 | 6 | 4 | 5 | | | | 5 |
| B V 8 | 4 | | | 5 | | 5 | | | | 5 |
| B V 9 | 5 | | | | | 4 | | | | 4 |
| B V 10 | | | | | | | | | | 4 |

TABLE 5

Percentage composition of the liquid crystal mixtures corresponding to the Examples 22 to 50 in respect of components of groups B VI to C 10

| Compound | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 |
|---|---|---|---|---|---|---|---|---|---|---|---|---|---|---|---|---|---|---|---|---|---|---|---|---|---|---|---|---|---|
| B VI 1 | 9 | 8 | 8 | 9 | 8 | 8 | 8 | 8 |  | 9 | 8 |  |  |  |  |  |  |  |  | 8 | 8 |  |  |  |  |  | 7 | 7 | 8 |
| B VI 2 | 8 | 8 |  | 8 | 8 | 8 |  |  |  | 8 |  |  |  |  |  |  |  |  |  | 6 | 6 |  |  |  |  |  |  |  |  |
| B VIII 1 | 5 |  |  | 5 | 5 |  | 5 |  |  |  |  |  |  |  |  |  |  |  |  |  |  |  | 5 |  |  |  | 5 |  |  |
| B VIII 2 | 5 |  |  |  | 4 |  | 5 |  |  |  |  |  |  |  |  |  |  |  |  |  |  |  | 5 | 5 |  |  |  | 5 |  |
| B VIII 3 |  |  |  |  |  |  |  |  |  |  |  |  |  |  |  |  |  |  |  |  |  |  |  |  |  |  |  |  |  |
| B VIII 4 |  |  |  |  |  |  |  |  |  |  |  |  |  |  |  |  |  |  |  |  |  |  |  |  |  | 5 |  | 5 |  |
| B VIII 5 |  |  |  |  |  |  |  |  |  |  |  |  |  |  |  |  |  |  |  |  |  |  |  |  |  |  |  | 5 |  |
| B VIII 6 |  |  |  |  |  |  |  |  |  |  |  |  |  |  |  |  |  |  |  |  |  |  |  |  |  |  | 4 |  |  |
| B VIII 7 |  |  |  |  |  |  |  |  |  |  |  |  |  |  |  |  |  |  |  |  |  |  |  |  |  |  |  | 4 |  |
| B VIII 8 |  |  |  |  |  |  |  |  |  |  |  |  |  |  |  |  |  |  |  |  |  |  |  |  |  | 5 | 5 |  |  |
| B VIII 9 |  |  |  |  |  |  |  |  |  |  |  |  |  |  |  |  |  |  |  |  |  |  |  |  |  | 4 | 5 |  |  |
| B VIII 10 |  |  |  |  |  |  |  |  |  |  |  |  |  |  |  |  |  |  |  |  |  |  |  |  |  |  | 5 |  |  |
| B VIII 11 |  |  |  |  |  |  |  |  |  |  |  |  |  |  |  |  |  |  |  |  |  |  |  |  |  | 4 |  |  |  |
| C 1 |  |  |  |  |  | 7 |  |  | 15 | 10 | 10 | 15 | 15 | 12 |  |  | 15 |  |  | 10 | 12 |  |  |  |  |  |  |  |  |
| C 2 | 15 | 15 | 15 | 15 | 15 | 13 | 14 | 15 | 22 | 20 | 20 | 22 | 22 | 13 |  |  | 18 | 20 | 22 | 20 | 20 | 20 |  | 15 |  |  | 13 | 10 | 17 |
| C 3 |  |  |  |  |  |  |  |  | 14 |  |  | 17 | 14 | 11 |  |  |  | 4 | 14 |  |  |  | 10 |  |  |  |  |  |  |
| C 4 |  | 15 | 15 |  | 15 |  |  | 15 | 10 | 7 | 10 |  | 10 |  |  | 7 |  |  |  | 10 | 13 | 10 |  |  |  |  | 10 |  |  |
| C 5 | 14 |  |  | 14 |  |  | 14 |  |  |  | 17 |  |  |  |  |  |  |  |  |  |  |  |  |  |  |  |  |  | 11 |
| C 6 |  |  |  |  |  |  |  |  |  |  |  |  |  |  |  |  |  |  |  |  |  |  |  |  |  |  |  |  |  |
| C 7 |  |  |  |  |  |  |  |  |  |  |  |  |  | 7 |  |  | 6 |  | 10 |  |  |  |  |  |  |  |  |  |  |
| C 8 |  |  |  |  | 3 |  |  |  |  |  |  |  |  |  |  |  | 9 |  |  |  |  |  |  |  |  |  |  |  |  |
| C 9 |  |  |  |  |  | 7 |  |  |  |  |  |  |  |  |  |  |  |  |  |  |  |  |  |  |  |  |  |  |  |
| C 10 |  |  |  |  |  |  |  |  |  |  |  |  |  |  |  |  |  |  |  |  |  |  |  |  |  |  |  |  |  |

TABLE 6

Percentage composition of the liquid crystal mixtures corresponding to the Examples 51 to 80 in respect of components of groups B VI to C 10

| Compound | 51 | 52 | 53 | 54 | 55 | 56 | 57 | 58 | 59 | 60 | 61 | 62 | 63 | 64 | 65 |
|---|---|---|---|---|---|---|---|---|---|---|---|---|---|---|---|
| B VI 1 | 9 | 8 | 8 | 8 | 9 | 9 |  |  | 10 | 10 | 10 | 9 | 9 | 8 | 7 |
| B VI 2 |  |  |  |  |  | 8 | 8 |  | 9 | 9 | 9 |  | 8 | 7 | 7 |
| B VIII 1 |  |  | 6 | 5 |  |  | 7 | 7 |  |  |  | 7 |  |  |  |
| B VIII 2 |  |  | 6 | 5 |  |  | 7 | 7 |  |  |  | 7 |  |  |  |
| B VIII 3 |  |  | 7 |  |  |  |  |  |  |  |  | 7 |  |  |  |
| B VIII 4 |  |  | 7 | 5 |  |  | 7 | 7 |  |  |  | 7 |  |  |  |
| B VIII 5 |  |  |  |  |  |  |  |  |  |  |  |  |  |  |  |
| B VIII 6 |  |  |  |  |  |  |  |  |  |  |  |  |  |  |  |
| B VIII 7 |  |  |  |  |  |  |  |  |  |  |  |  |  |  |  |
| B VIII 8 |  |  |  |  |  |  |  |  |  |  |  |  | 5 |  |  |
| B VIII 9 |  |  |  |  | 5 |  |  |  |  |  | 5 |  | 5 |  |  |
| B VIII 10 |  |  |  |  | 4 |  |  |  |  |  | 5 |  | 5 |  |  |
| B VIII 11 |  |  |  |  |  |  |  |  |  |  |  |  |  |  |  |
| C 1 |  |  |  |  |  |  |  |  |  |  |  |  |  |  |  |
| C 2 |  |  |  | 10 | 14 | 14 | 18 | 23 | 15 | 15 | 15 | 10 | 19 | 19 | 15 |
| C 3 |  |  |  |  |  |  |  | 5 |  |  |  |  |  |  |  |
| C 4 |  |  |  |  |  |  |  |  |  |  | 15 |  |  | 15 |  |
| C 5 |  |  |  |  |  |  |  |  |  |  |  | 11 | 11 |  |  |
| C 6 |  |  |  |  |  |  |  |  |  |  |  |  |  |  |  |
| C 7 |  |  |  |  |  |  |  |  |  |  |  |  |  |  |  |
| C 8 | 10 | 10 |  |  |  |  |  |  |  |  |  |  |  |  |  |
| C 9 | 10 | 10 |  |  |  |  |  |  |  |  |  |  |  |  |  |
| C 10 |  |  |  |  |  |  |  |  |  |  |  |  |  |  |  |

| Compound | 66 | 67 | 68 | 69 | 70 | 71 | 72 | 73 | 74 | 75 | 76 | 77 | 78 | 79 | 80 |
|---|---|---|---|---|---|---|---|---|---|---|---|---|---|---|---|
| B VI 1 | 7 |  |  | 10 |  |  |  | 9 |  |  |  |  |  |  |  |
| B VI 2 | 7 |  |  |  |  |  |  |  |  |  |  |  |  |  |  |
| B VIII 1 |  | 7 | 7 |  | 6 | 7 | 7 |  | 7 | 6 |  | 6 |  |  |  |
| B VIII 2 |  | 7 | 7 | 7 | 7 | 7 | 7 |  | 7 | 7 |  | 6 |  |  |  |
| B VIII 3 |  |  |  |  | 7 |  |  |  | 7 |  |  |  |  |  |  |
| B VIII 4 |  | 7 | 7 | 7 | 7 | 7 | 7 |  | 7 | 7 |  |  | 7 |  |  |
| B VIII 5 |  |  |  |  |  |  |  |  |  |  |  |  |  |  |  |
| B VIII 6 |  |  |  |  |  |  |  |  |  |  |  |  |  |  |  |

TABLE 6-continued

Percentage composition of the liquid crystal mixtures corresponding to the Examples 51 to 80 in respect of components of groups B VI to C 10

| Compound | | | | | | | | | | | | |
|---|---|---|---|---|---|---|---|---|---|---|---|---|
| B VIII 7 | | | | | | | | | | | | |
| B VIII 8 | 5 | | | | | | | | | | | |
| B VIII 9 | 5 | | | | | | | | | | | |
| B VIII 10 | 5 | | | | | | | | | | | |
| B VIII 11 | | | | | | | | | | | | |
| C 1 | | | | | | | | | | | | |
| C 2 | 15 | 18 | 23 | | 15 | | 10 | 18 | 18 | 15 | | 16 |
| C 3 | | 5 | | | | | | | | | | |
| C 4 | 12 | | | | | | 6 | | 10 | | | |
| C 5 | | | | | | | | | | | | |
| C 6 | | | | | | | | | | | | |
| C 7 | | | | | | | | | | | | |
| C 8 | | | | | | | | | | | | |
| C 9 | | | | | | | | | | | | |
| C 10 | | | | | | | | 8 | 8 | 8 | | |

TABLE 7

Percentage composition of the liquid crystal mixtures corresponding to the Examples 81 to 111 in respect of components of groups B VI to C 10

| Compound | 81 | 82 | 83 | 84 | 85 | 86 | 87 | 88 | 89 | 90 | 91 | 92 | 93 | 94 | 95 | 96 | 97 | 98 | 99 |
|---|---|---|---|---|---|---|---|---|---|---|---|---|---|---|---|---|---|---|---|
| B VI 1 | 9 | 8.1 | | 11 | 11 | 10 | 10 | 7 | | 8 | 7 | 10 | | | | | | | |
| B VI 2 | | | | 11 | 11 | 10 | 10 | | | | | 10 | | | | | | | |
| B VIII 1 | 7 | 6.3 | | | | | | | | | | | | | | | | | |
| B VIII 2 | 7 | 6.3 | | | | | | | | | | | | | | | | | |
| B VIII 3 | 7 | 6.3 | | | | | | | | | | | | | | | | | |
| B VIII 4 | 7 | 6.3 | | | | | | | | | | | | | | | | | |
| B VIII 5 | | | | | | | | | | | | | | | | | | | |
| B VIII 6 | | | | | | | | | | | | | | | | | | | |
| B VIII 7 | | | | | | | | | | | | | | | | | | | |
| B VIII 8 | | | | | | | | | | | | | | | | | | | |
| B VIII 9 | | | | | | | | | | | | | | | | | | | |
| B VIII 10 | | | | | | | | | | | | | | | | | | | |
| B VIII 11 | | | | | | | | | | | | | | | | | | | |
| C 1 | | | | | | | | | | | | | | | | | | | |
| C 2 | 10 | 10 | | 12 | | 12 | 12 | 12 | 12 | 12 | 12 | 12 | 10 | 10 | 10 | 10 | 10 | 8 | |
| C 3 | | | | 8 | 16 | 8 | 10 | 11 | 11 | 11 | 11 | 10 | 11 | 10 | 9 | 9 | 9 | 9 | 9 |
| C 4 | | | | 10 | 14 | 10 | 8 | 7 | 7 | 7 | 7 | 7 | 7 | 7 | 7 | 7 | 7 | 6 | 6 |
| C 5 | | | | | | | | | | | | | | | | | | | |
| C 6 | | | | | | | | | | | | | | | | | | | |
| C 7 | | | | | | | | | | | | | | | | | | | |
| C 8 | | | | | | | | | | | | | | | | | | | |
| C 9 | | | | | | | | | | | | | | | | | | | |
| C 10 | | | | | | | | | | | | | | | | | | | |

| Compound | 100 | 101 | 102 | 103 | 104 | 105 | 106 | 107 | 108 | 109 | 110 | 111 |
|---|---|---|---|---|---|---|---|---|---|---|---|---|
| B VI 1 | 10 | 11 | 11 | | | | | | | | | 10 |
| B VI 2 | 10 | 11 | | | | | | | | | | |
| B VIII 1 | | | | | | | | | | | | |
| B VIII 2 | | | | | | | | | | | | |
| B VIII 3 | | | | | | | | | | | | |
| B VIII 4 | | | | | | | | | | | | |
| B VIII 5 | | | | | | | | | | | | |
| B VIII 6 | | | | | | | | | | | | |
| B VIII 7 | | | | | | | | | | | | |
| B VIII 8 | | | | | | | | | | | | |
| B VIII 9 | | | | | | | | | | | | |
| B VIII 10 | | | | | | | | | | | | |
| B VIII 11 | | | | | | | | | | | | |
| C 1 | | | | | | | | | | | | |
| C 2 | 10 | 20 | 9 | 9 | 19 | 9 | 9 | 11 | 10 | 10 | 12 | 12 |
| C 3 | | | 7 | 12 | 13 | 12 | 12 | 12 | 13 | 13 | 13 | 10 |
| C 4 | | | 3 | 7 | | 7 | 7 | 7 | 8 | 8 | 8 | 5 |
| C 5 | | | | | | | | | | | | |
| C 6 | | | | | | | | | | | | |
| C 7 | | | | | | | | | | | | |

TABLE 7-continued

Percentage composition of the liquid crystal mixtures corresponding to the Examples 81 to 111 in respect of components of groups B VI to C 10

C 8
C 9
C 10

TABLE 8

Percentage composition of the liquid crystal mixtures corresponding to the Examples 112 to 132 in respect of components of groups B VI to C 10

| | Example | | | | | | | | | | |
|---|---|---|---|---|---|---|---|---|---|---|---|
| Compound | 112 | 113 | 114 | 115 | 116 | 117 | 118 | 119 | 120 | 121 | 122 |
| B VI 1 | 10 | 10 | 10 | | | | | | | | |
| B VI 2 | | | | | | | | | | | |
| B VIII 1 | | | | | | | | | | | |
| B VIII 2 | | | | | | | | | | | |
| B VIII 3 | | | | | | | | | | | |
| B VIII 4 | | | | | | | | | | | |
| B VIII 5 | | | | | | | | | | | |
| B VIII 6 | | | | | | | | | | | |
| B VIII 7 | | | | | | | | | | | |
| B VIII 8 | | | | | | | | | | | |
| B VIII 9 | | | | | | | | | | | |
| B VIII 10 | | | | | | | | | | | |
| B VIII 11 | | | | | | | | | | | |
| C 1 | | | | | | | | | | | |
| C 2 | 12 | 12 | 13 | 10 | 14 | 17 | 18 | 16 | 10 | 17 | 18 |
| C 3 | 10 | 10 | 10 | 14 | 11 | | | | 14 | | |
| C 4 | 5 | 5 | 8 | 10 | 7 | | 6 | | 10 | | 6 |
| C 5 | | | | | | | | | | | |
| C 6 | | | | | | | | | | | |
| C 7 | | | | | | | | | | | |
| C 8 | | | | | | | | | | | |
| C 9 | | | | | | | | | | | |
| C 10 | | | | | | | | | | | |

| | Example | | | | | | | | | |
|---|---|---|---|---|---|---|---|---|---|---|
| Compound | 123 | 124 | 125 | 126 | 127 | 128 | 129 | 130 | 131 | 132 |
| B VI 1 | | | 10 | 10 | | 10 | | | 11 | 10 |
| B VI 2 | | | 10 | 10 | | 10 | | | 11 | 10 |
| B VIII 1 | | | | | | | | | | |
| B VIII 2 | | | | | | | | | | |
| B VIII 3 | | | | | | | | | | |
| B VIII 4 | | | | | | | | | | |
| B VIII 5 | | | | | | | | | | |
| B VIII 6 | | | | | | | | | | |
| B VIII 7 | | | | | | | | | | |
| B VIII 8 | | | | | | | | | | |
| B VIII 9 | | | | | | | | | | |
| B VIII 10 | | | | | | | | | | |
| B VIII 11 | | | | | | | | | | |
| C 1 | | 5 | | | | | | | | |
| C 2 | 16 | 10 | 12 | 12 | 8 | 10 | 8 | 10 | 20 | 10 |
| C 3 | | | 8 | 10 | 15 | | 12 | 17 | | |
| C 4 | | | 10 | 8 | | | 6 | | | |
| C 5 | | | | | | | | | | |
| C 6 | | | | | | | | | | |
| C 7 | | | | | | | | | | |
| C 8 | | | | | | | | | | |
| C 9 | | | | | | | | | | |
| C 10 | | | | | | | | | | |

TABLE 9

Percentage composition of the liquid crystal mixtures corresponding to the Examples 22 to 50 in respect of components of groups C 11 to H

| Compound | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 |
|---|---|---|---|---|---|---|---|---|---|---|---|---|---|---|---|---|---|---|---|---|---|---|---|---|---|---|---|---|---|
| C 11 | | | | | | | | | | | | | | | | | | | | | | | | | | | | | |
| C 12 | | | | | | | | | | | | | | | | | | | | | | | | | | | | | |
| C 13 | | | | | | | | | | | | | | | | | | | | | | | | | | | | 15 | |
| C 14 | | | 8 | | | | 8 | 8 | | | 11 | 11 | 10 | | 5 | 6 | 11 | | | | | | 4 | 4 | 4 | 2 | 9 | 10 | 9 |
| C 15 | | | | | | | | | 3 | | | | | 2 | | | | | 2 | 3 | | | | | | | | | |
| C 16 | | | | | | | | | 4 | | | | | 3 | | | | | 3 | 4 | | | 5 | 5 | 5 | 3 | | | |
| C 17 | | | | | | | | | | | | | | 8 | | | | | 8 | | | | 9 | 12 | 12 | 9 | | | |
| C 18 | | | | | | | | | | | | | | | | | | | | | | | 6 | 6 | 6 | 9 | | | |
| C 19 | | | | | | | | 4 | | | | 4 | 4 | 7 | | | | 4 | 6 | | 5 | | 6 | 4 | 5 | | | | |
| C 20 | | | | | | | | | | | | | | 7 | | | | | | | | | 7 | 5 | 7 | | | | |
| C 21 | | | | | | | | | | | | | | 6 | | | | | | | | | 7 | 3 | 4 | | | | |
| C 22 | | | | | | | | | | | | | | | | | | | | | | | | | | | | | |
| C 23 | | | | | | | | | | | | | | | | | | | | | | | | | | | | | |
| C 24 | | | | | | | | | | | | | | | | | | | | | | | | | | | | | |
| F 1 | | | | | | | | | | | | | | | | | | | | | | | | | | | | | |
| F 2 | | | | | | | | | | | | | | | | | | | | | | | | | | | | | |
| F 3 | | | | | | | | | | | | | | | | | | | | | | | | | | | | | |
| H 1 | | | | | | | | | | | | | | | | | | | | | | | 3 | | | | | | 5 |
| H 2 | | | | | | | | | | | | | | | | 5 | | | | | | | 4 | | | | | | 5 |
| H 3 | | | | | | | | | | | | | | | | | | | | | | | | | | | | | 5 |
| H 4 | | | | | | | | | | | | | | | | 5 | | | | | | | 4 | | | | | | |
| H 5 | | | | | | | | | | | | | | | | | | | | | | | 4 | | | | | | |
| H 6 | | | | | | | | | | | 4 | | | | | 6 | | | 6 | | | | 5 | | 3 | | | | |
| H 7 | | | | | | | | | | | 3 | | | | | 5 | | | 5 | | | | 4 | | 4 | | | | |
| H 8 | | | | | | | | | | | | | | | | 7 | | | 7 | | | | 6 | | 3 | | | | |

TABLE 10

Percentage composition of the liquid crystal mixtures corresponding to the Examples 51 to 80 in respect of components of groups C 11 to H

| Compound | 51 | 52 | 53 | 54 | 55 | 56 | 57 | 58 | 59 | 60 | 61 | 62 | 63 | 64 | 65 |
|---|---|---|---|---|---|---|---|---|---|---|---|---|---|---|---|
| C 11 | | | | | | | | | | | | | | | |
| C 12 | | | | | | | | | | | | | | | |
| C 13 | | 10 | | 15 | 13 | 13 | 10 | 10 | 15 | 15 | 15 | | | | |
| C 14 | 10 | 10 | | 9 | | | | | | | | 10 | | | |
| C 15 | | | | | | | | | | | | | | | |
| C 16 | | | | | | | | | | | | | | | |
| C 17 | | | | | | | | | | | | | | | |
| C 18 | | | | | | | | | | | | | | | |
| C 19 | | | | | | | | | | | | | | | |
| C 20 | | | | | | | | | | | | | | | |
| C 21 | | | | | | | | | | | | | | | |
| C 22 | | | 4 | | | | | | | | | | | | |
| C 23 | | | 4 | | | | | | | | | | | | |
| C 24 | | | 5 | | | | | | | | | | | | |
| F 1 | | | | | | | | | | | | | | | |
| F 2 | | | | | | | | | | | | | | | |
| F 3 | | | | | | | | | | | | | | | |
| H 1 | | | | 5 | 5 | | | 5 | | | | 5 | 5 | | |
| H 2 | | | | 5 | 4 | | | 5 | | | | 5 | 5 | | |
| H 3 | | | | 5 | | | | | | | | 5 | 5 | | |
| H 4 | | | | | | | | | | | | | | | |
| H 5 | | | | | | | | | | | | | | | |
| H 6 | | | | | | | | | | | | | | | |
| H 7 | | | | | | | | | | | | | | | |
| H 8 | | | | | | | | | | | | | | | |

| Compound | 66 | 67 | 68 | 69 | 70 | 71 | 72 | 73 | 74 | 75 | 76 | 77 | 78 | 79 | 80 |
|---|---|---|---|---|---|---|---|---|---|---|---|---|---|---|---|
| C 11 | | | | | | | | | | | | 8 | 8 | | |
| C 12 | | | | | | | | | | | | 8 | 8 | | 8 |
| C 13 | | 10 | 10 | | | 10 | | 15 | | | | | | | |

TABLE 10-continued

Percentage composition of the liquid crystal mixtures corresponding to the Examples 51 to 80 in respect of components of groups C 11 to H

| Compound | ... | | | | | | | | | |
|---|---|---|---|---|---|---|---|---|---|---|
| C 14 | | | | | | 10 | | | | |
| C 15 | | | | 3 | | | | | | |
| C 16 | | 3 | | 3 | 3 | | | 3 | | |
| C 17 | | | | 4 | | | | 4 | | |
| C 18 | | | | | | | | | | |
| C 19 | | | | 4 | | | | | | |
| C 20 | | | | | | | | | | |
| C 21 | | | | | | | | | | |
| C 22 | | 4 | 4 | 4 | | | 4 | | | |
| C 23 | | 5 | 4 | 5 | | | 5 | | | |
| C 24 | | 5 | 5 | | | | 5 | | | |
| F 1 | | | | | | | | | | |
| F 2 | | | | | | | | | | |
| F 3 | | | | | | | | | | |
| H 1 | | | | 7 | | | | | | |
| H 2 | | | | 7 | | | | | | |
| H 3 | | | | | | | | | | |
| H 4 | | | | | | | | | | |
| H 5 | | | | 3 | | | | | | |
| H 6 | | | | | | | | | | |
| H 7 | | | | | | | | | | |
| H 8 | | | | | | | | | | |

TABLE 11

Percentage composition of the liquid crystal mixtures corresponding to the Examples 81 to 111 in respect of components of groups C 11 to H

| | Example | | | | | | | | | | | | | | | | | | |
|---|---|---|---|---|---|---|---|---|---|---|---|---|---|---|---|---|---|---|---|
| Compound | 81 | 82 | 83 | 84 | 85 | 86 | 87 | 88 | 89 | 90 | 91 | 92 | 93 | 94 | 95 | 96 | 97 | 98 | 99 |
| C 11 | | | | | | | | | | | | | | | | | | | |
| C 12 | | | | | | | | | | | | | | | | | | | |
| C 13 | 15 | | | | | | | | | | | | | | | | | | |
| C 14 | 10 | 9 | | | | | | | | | | | | | | | | | |
| C 15 | | 2.7 | 3 | | | | | | | | | | | | | | | | |
| C 16 | | 2.7 | 4 | | | | | | | | | | | | | | | | |
| C 17 | | | 7 | | | | | | | | | | | | | | | | |
| C 18 | | | 4 | | | | | | | | | | | | | | | | |
| C 19 | | 5.4 | 5 | | | | | | | | | | | | | | | | |
| C 20 | | | 5 | | | | | | | | | | | | | | | | |
| C 21 | | | 4 | | | | | | | | | | | | | | | | |
| C 22 | | | | | | | | | | | | | | | | | | | |
| C 23 | | | | | | | | | | | | | | | | | | | |
| C 24 | | | | | | | | | | | | | | | | | | | |
| F 1 | | | | | | | | | | | | | | | | | | | |
| F 2 | | | | | | | | | | | | | | | | | | | |
| F 3 | | | | | | | | | | | | | | | | | | | |
| H 1 | | | | | | | | | | | | | | | | | | | |
| H 2 | | | | | | | | | | | | | | | | | | | |
| H 3 | | | | | | | | | | | | | | | | | | | |
| H 4 | | | | | | | | | | | | | | | | | | | |
| H 5 | | | | | | | | | | | | | | | | | | | |
| H 6 | | 3 | | | | | | | | | | | | | | | | | |
| H 7 | | 4 | | | | | | | | | | | | | | | | | |
| H 8 | | 4 | | | | | | | | | | | | | | | | | |

| | Example | | | | | | | | | | | |
|---|---|---|---|---|---|---|---|---|---|---|---|---|
| Compound | 100 | 101 | 102 | 103 | 104 | 105 | 106 | 107 | 108 | 109 | 110 | 111 |
| C 11 | | | | | | | | | | | | |
| C 12 | | | | | | | | | | | | |
| C 13 | | | | | | | | | | | | |
| C 14 | | | | | | | | | | | | |
| C 15 | | | | | | | | | | | | |
| C 16 | | | | | | | | | | | | |
| C 17 | | | | | | | | | | | | |
| C 18 | | | | | | | | | | | | |
| C 19 | | | | | | | | | | | | |
| C 20 | | | | | | | | | | | | |
| C 21 | | | | | | | | | | | | |

TABLE 11-continued

Percentage composition of the liquid crystal mixtures corresponding to the Examples 81 to 111 in respect of components of groups C 11 to H

| Compound | | |
|---|---|---|
| C 22 | | |
| C 23 | | |
| C 24 | | |
| F 1 | 11 | 10 |
| F 2 | 9 | |
| F 3 | 8 | 10 |
| H 1 | | |
| H 2 | | |
| H 3 | | |
| H 4 | | |
| H 5 | | |
| H 6 | | |
| H 7 | | |
| H 8 | | |

TABLE 12

Percentage composition of the liquid crystal mixtures corresponding to the Examples 112 to 132 in respect of components of groups C 11 to H

| Compound | 112 | 113 | 114 | 115 | 116 | 117 | 118 | 119 | 120 | 121 | 122 |
|---|---|---|---|---|---|---|---|---|---|---|---|
| C 11 | | | | | | | | | | | |
| C 12 | | | | | | | | | | | |
| C 13 | | | | | | | | | | | |
| C 14 | | | | | | | | | | | |
| C 15 | | | | | | 4 | 4 | 4 | | 4 | 4 |
| C 16 | | | | | | 5 | 4 | 4 | | 5 | 4 |
| C 17 | | | | | | | | | | | |
| C 18 | | | | | | | | | | | |
| C 19 | | | | | | | | | | | |
| C 20 | | | | | | | | | | | |
| C 21 | | | | | | | | | | | |
| C 22 | | | | | | | | | | | |
| C 23 | | | | | | | | | | | |
| C 24 | | | | | | | | | | | |
| F 1 | | | | | | | | | | | |
| F 2 | | | | | | | | | | | |
| F 3 | | | | | | | | | | | |
| H 1 | | | | | | | | | | | |
| H 2 | | | | | | | | | | | |
| H 3 | | | | | | | | | | | |
| H 4 | | | | | | | | | | | |
| H 5 | | | | | | | | | | | |
| H 6 | | | | | | | | | | | |
| H 7 | | | | | | | | | | | |
| H 8 | | | | | | | | | | | |

| Compound | 123 | 124 | 125 | 126 | 127 | 128 | 129 | 130 | 131 | 132 |
|---|---|---|---|---|---|---|---|---|---|---|
| C 11 | | | | | | | | | | |
| C 12 | | | | | | | | | | |
| C 13 | | | | | | | | | | |
| C 14 | | 6 | | | | | | | | |
| C 15 | 4 | 2 | | | | | | | | |
| C 16 | 4 | 3 | | | | | | | | |
| C 17 | | 5 | | | | | | | | |
| C 18 | | 5 | | | | | | | | |
| C 19 | | | | | | | | | | |
| C 20 | | | | | | | | | | |
| C 21 | | | | | | | | | | |
| C 22 | | | | | | | | | | |
| C 23 | | | | | | | | | | |
| C 24 | | | | | | | | | | |
| F 1 | | | | | | 11 | | | 10 | 11 |
| F 2 | | | | | | 9 | | | | 9 |
| F 3 | | | | | | 8 | | | 10 | 8 |
| H 1 | | | | | | | | | | |
| H 2 | | | | | | | | | | |

TABLE 12-continued

Percentage composition of the liquid crystal mixtures corresponding to the Examples 112 to 132 in respect of components of groups C 11 to H

H 3
H 4
H 5
H 6
H 7
H 8

TABLE 13

Percentage composition of the liquid crystal mixtures corresponding to the Examples 22 to 50 in respect of components of groups K and L

| Compound | Example | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 |
| K 1 | | | | | | | | | | | | | | | | | | | | | | | | | | | | | |
| K 2 | | | | | | | | | | | | | | | | | | | | | | | | | | | | | |
| K 3 | | | | | | | | | | | | | | | | | | | | | | | | | | | | | |
| K 4 | | | | | | | | | | | | | | | | | | | | | | | | | | | | | |
| K 5 | | | | | | | | | | | | | | | | | | | | | | | | | | | | | |
| L 1 | | | | | | | | | | | | | | | | | | | | | | | | | | | | | |
| L 2 | | | | | | | | | | | | | | | | | | | | | | | | | | | | | |
| L 3 | | | | | | | | | | | | | | | | | | | | | | | | | | | | | |
| L 4 | | | | | | | | | | | | | | | | | | 5 | | 4 | | | 5 | 4 | | | | | |
| L 5 | | | | | | | | | | | | | | | | 3 | | 5 | | 3 | | | | 4 | 3 | | | | |
| L 6 | | | | | | | | | | | | | | | | | | 5 | | | | | 4 | 2 | | | | | |

TABLE 14

Percentage composition of the liquid crystal mixtures corresponding to the Examples 51 to 80 in respect of components of groups K and L

| Compound | Example | | | | | | | | | | | | | | |
|---|---|---|---|---|---|---|---|---|---|---|---|---|---|---|---|
| | 51 | 52 | 53 | 54 | 55 | 56 | 57 | 58 | 59 | 60 | 61 | 62 | 63 | 64 | 65 |
| K 1 | | | | | | | 6 | | | | | | | | |
| K 2 | | | | | | | 6 | | | | | | | | |
| K 3 | | | | | | | | | | | | | | | |
| K 4 | | | | | | | | | | | | | | | |
| K 5 | | | | | | | | | | | | | | | |
| L 1 | | | | | | | | 5 | | | | | | | |
| L 2 | | | | | | | | 5 | | | | | | | |
| L 3 | | | | | | | | | | | | | | | |
| L 4 | | | 4 | | | | | | | | | | | | |
| L 5 | | | 4 | | | | | | | | | | | | |
| L 6 | | | 4 | | | | | | | | | | | | |

| Compound | Example | | | | | | | | | | | | | | |
|---|---|---|---|---|---|---|---|---|---|---|---|---|---|---|---|
| | 66 | 67 | 68 | 69 | 70 | 71 | 72 | 73 | 74 | 75 | 76 | 77 | 78 | 79 | 80 |
| K 1 | | 6 | | | 10 | | 7 | | | 8 | 8 | | 9 | 8 | |
| K 2 | | 6 | | | | | 7 | | | 8 | 8 | | 8 | 8 | |
| K 3 | | | | | | | | | | 7 | 7 | | 6 | | |
| K 4 | | | | | | | | | | | | | | | 9 |
| K 5 | | | | | | | | | | | | | | | |
| L 1 | | | 5 | 5 | 4 | | 4 | | | 5 | | 4 | 4 | | |
| L 2 | | | 5 | 4 | 3 | | 4 | | | 5 | | 4 | 4 | | |
| L 3 | | | | 4 | | | 4 | | | 6 | 5 | | 5 | | |
| L 4 | | | | | | | | | | | | | | | |
| L 5 | | | | | | | | | | | | | | | |
| L 6 | | | | | | | | | | | | | | | |

TABLE 15

Percentage composition of the liquid crystal mixtures corresponding to the Examples 81 to 111 in respect of components of groups K and L

| Compound | Example |  |  |  |  |  |  |  |  |  |  |  |  |  |  |  |  |  |  |
|---|---|---|---|---|---|---|---|---|---|---|---|---|---|---|---|---|---|---|---|
|  | 81 | 82 | 83 | 84 | 85 | 86 | 87 | 88 | 89 | 90 | 91 | 92 | 93 | 94 | 95 | 96 | 97 | 98 | 99 |
| K 1 |  |  |  |  |  |  |  |  |  |  |  |  |  |  |  |  |  |  |  |
| K 2 |  |  |  |  |  |  |  |  |  |  |  |  |  |  |  |  |  |  |  |
| K 3 |  |  |  |  |  |  |  |  |  |  |  |  |  |  |  |  |  |  |  |
| K 4 |  |  |  |  |  |  |  |  |  |  |  |  |  |  |  |  |  |  |  |
| K 5 |  |  | 5 |  |  |  |  |  |  |  |  |  |  |  |  |  |  |  |  |
| L 1 |  |  |  |  |  |  |  |  |  |  |  |  |  |  |  |  |  |  |  |
| L 2 |  |  |  |  |  |  |  |  |  |  |  |  |  |  |  |  |  |  |  |
| L 3 |  |  |  |  |  |  |  |  |  |  |  |  |  |  |  |  |  |  |  |
| L 4 |  |  | 5 |  |  |  |  |  |  |  |  |  |  |  |  |  |  |  |  |
| L 5 |  |  | 5 |  |  |  |  |  |  |  |  |  |  |  |  |  |  |  |  |
| L 6 |  |  | 5 |  |  |  |  |  |  |  |  |  |  |  |  |  |  |  |  |

| Compound | Example |  |  |  |  |  |  |  |  |  |  |  |
|---|---|---|---|---|---|---|---|---|---|---|---|---|
|  | 100 | 101 | 102 | 103 | 104 | 105 | 106 | 107 | 108 | 109 | 110 | 111 |
| K 1 |  |  |  |  |  |  |  |  |  |  |  |  |
| K 2 |  |  |  |  |  |  |  |  |  |  |  |  |  |
| K 3 |  |  |  |  |  |  |  |  |  |  |  |  |  |
| K 4 |  |  |  |  |  |  |  |  |  |  |  |  |  |
| K 5 |  |  |  |  |  |  |  |  |  |  |  |  |  |
| L 1 |  |  |  |  |  |  |  |  |  |  |  |  |  |
| L 2 |  |  |  |  |  | 3 |  |  | 3 |  |  |  |
| L 3 |  |  |  |  |  |  |  |  |  |  |  |  |  |
| L 4 |  | 4 |  |  |  |  |  |  |  |  |  |  |
| L 5 |  | 4 |  |  |  |  |  |  |  |  |  |  |
| L 6 |  |  |  |  |  |  |  |  |  |  |  |  |  |

TABLE 16

Percentage composition of the liquid crystal mixtures corresponding to the Examples 112 to 132 in respect of components of groups K and L

| Compound | Example |  |  |  |  |  |  |  |  |  |  |
|---|---|---|---|---|---|---|---|---|---|---|---|
|  | 112 | 113 | 114 | 115 | 116 | 117 | 118 | 119 | 120 | 121 | 122 |
| K 1 |  |  |  |  |  |  |  |  |  |  |  |
| K 2 |  |  |  |  |  |  |  |  |  |  |  |
| K 3 |  |  |  |  |  |  |  |  |  |  |  |
| K 4 |  |  |  |  |  |  |  |  |  |  |  |
| K 5 |  |  |  |  |  |  |  |  |  |  |  |
| L 1 |  |  |  | 5 | 5 | 6 |  |  | 5 | 6 |  |
| L 2 |  |  |  | 5 | 5 | 6 |  |  | 5 | 6 |  |
| L 3 |  |  |  |  | 4 |  |  |  |  |  |  |
| L 4 |  |  |  |  |  |  |  |  |  |  |  |
| L 5 |  |  |  |  |  |  |  |  |  |  |  |
| L 6 |  |  |  |  |  |  |  |  |  |  |  |

| Compound | Example |  |  |  |  |  |  |  |  |  |
|---|---|---|---|---|---|---|---|---|---|---|
|  | 123 | 124 | 125 | 126 | 127 | 128 | 129 | 130 | 131 | 132 |
| K 1 |  |  |  |  |  |  |  |  |  |  |
| K 2 |  |  |  |  |  |  |  |  |  |  |
| K 3 |  |  |  |  |  |  |  |  |  |  |
| K 4 |  |  |  |  |  |  |  |  |  |  |
| K 5 |  |  |  |  |  |  |  |  |  |  |
| L 1 |  |  |  |  |  |  |  |  |  |  |
| L 2 |  |  |  |  |  |  |  |  |  |  |
| L 3 |  |  |  |  |  |  |  |  |  |  |
| L 4 |  | 4 |  |  |  |  |  |  | 4 |  |
| L 5 |  |  |  |  |  |  |  |  | 4 |  |
| L 6 |  |  |  |  |  |  |  |  |  |  |

TABLE 17

Physical data for Examples 22 to 132

| Example | Clear point (° C.) | Viscosity at 20° (mPa · S) | Δn | Threshold voltage V (10, 0, 20) (Volts) | Preferred use |
|---|---|---|---|---|---|
| 22 | 79 | 16 | 0.1068 | 2.06 (1ST) | TFT |
| 23 | 76 | 15 | 0.0969 | 2.06 (1ST) | TFT |
| 24 | 82 | 17 | 0.1019 | 2.00 | TFT |
| 25 | 80 | 16 | 0.1019 | 1.98 (5.44) | TFT |
| 26 | 75 | 16 | 0.1043 | 2.05 (5.38) | TFT |
| 27 | 73 | 15 | 0.1059 | 1.89 (5.18) | TFT |
| 28 | 81 | 17 | 0.1106 | — | TFT |
| 29 | 82 | 17 | 0.1019 | — | TFT |
| 30 | 77 | 22 | 0.1147 | 1.82 (10.4) | STN |
| 31 | 84 | 21 | 0.1082 | 1.96 (5.12) | OMI |
| 32 | 77 | 20 | 0.1048 | 1.45 (5.31) | OMI |
| 33 | 79 | 25 | 0.1266 | 1.75 (9.81) | STN |
| 34 | 83 | 25 | 0.1223 | 1.94 (10.1) | STN |
| 35 | 90 | 22 | 0.1108 | 1.99 (5.03) | OMI |
| 36 | 91 | 28 | 0.1003 | 1.34 (5.57) | OMI |
| 37 | 111 | 23 | 0.1831 | 2.38 (7.07) | TFT 2nd |
| 38 | 108 | 22 | 0.0999 | 2.42 (5.60) | TFT 2nd |
| 39 | 79 | 25 | 0.1331 | 1.82 (9.42) | STN |
| 40 | 105 | 22 | 0.1447 | 2.30 (8.32) | GH |
| 41 | 80 | 19 | 0.1092 | 1.49 (5.07) | OMI |
| 42 | 83 | 20 | 0.1097 | 1.70 (5.02) | OMI |
| 43 | 82 | 18 | 0.1576 | 2.17 (2nd) | NTN |
| 44 | 99 | 41 | 0.1450 | 1.46 (2nd) | STN Low Duty |
| 45 | 87 | 37 | 0.1405 | 1.39 (2nd) | STN Low Duty |
| 46 | 89 | 34 | 0.1406 | 1.32 (2nd) | STN Low Duty |
| 47 | 64 | 31 | 0.1019 | 1.61 (5.51) | Low DN mpx |
| 48 | 86 | 19 | 0.1115 | 2.70 (2nd) | DSTN |
| 49 | 81 | 21 | 0.1310 | 2.68 (2nd) | DSTN |
| 50 | 82 | 16 | 0.1240 | 2.55 (2nd) | DSTN |
| 51 | 82 | 16 | 0.1181 | 2.70 (2nd) | DSTN |
| 52 | 81 | 16 | 0.1292 | 2.59 (2nd) | DSTN |
| 53 | 88 | 27 | 0.1355 | 2.71 (2nd) | DSTN |
| 54 | 80 | 18 | 0.1509 | 2.64 (2nd) | DSTN |
| 55 | 81 | 14 | 0.1226 | 2.81 | DSTN |
| 56 | 85 | 16 | 0.1144 | 2.83 | DSTN |
| 57 | 80 | 18 | 0.1339 | 2.75 (2nd) | DSTN |
| 58 | 78 | 17 | 0.1335 | 2.45 (2nd) | DSTN |
| 59 | 81 | 14 | 0.1072 | 2.29 | DSTN |
| 60 | 89 | 16 | 0.1271 | 2.82 (2nd) | DSTN |
| 61 | 93 | 18 | 0.1186 | 2.83 (2nd) | DSTN |
| 62 | 84 | 20 | 0.1250 | 2.59 | DSTN |
| 63 | 78 | — | — | — | DSTN |
| 64 | 76 | SW | — | — | DSTN |
| 65 | 80 | — | — | — | DSTN |
| 66 | 85 | SW | — | — | DSTN |
| 67 | 80 | 18 | 0.1339 | 2.75 (2nd) | DSTN |
| 68 | 78 | 17 | 0.1335 | 2.45 (2nd) | High Response TYPE |
| 69 | 81 | — | — | — | TYPE |
| 70 | 72 | 27 | 0.1480 | 2.53 | TYPE |
| 71 | 83 | 24 | 0.1313 | — | TYPE |
| 72 | 79 | 23 | 0.1366 | — | TYPE |
| 73 | 76 | SW | — | — | TYPE |
| 74 | 81 | 18 | 0.1387 | 2.64 | TYPE |
| 75 | 86 | 18 | 0.1251 | 2.708 | DSTN |
| 76 | 80 | 18 | 0.1180 | 2.273 | DSTN |
| 77 | 84 | 17 | 0.1167 | 2.705 | DSTN |
| 78 | 79 | 23 | 0.1189 | 2.43 (2nd) | DSTN |
| 79 | 85 | 20 | 0.1122 | 2.55 (2nd) | DSTN |
| 80 | 81 | 19 | 0.1219 | 2.29 | DSTN |
| 81 | 81 | 18 | 0.1387 | 2.64 | DSTN |
| 82 | 75 | 22 | 0.1241 | 2.21 (2nd) | DSTN |
| 83 | 128 | 40 | 0.1446 | 1.83 | STN |
| 84 | 110 | 23 | 0.0936 | 2.10 (1st) | TFT TV |
| 85 | 111 | 24 | 0.0933 | 2.06 (1st) | TFT TV |
| 86 | 106 | 22 | 0.0934 | 2.02 (1st) | TFT |
| 87 | 105 | 22 | 0.0922 | 2.02 (1st) | TFT |
| 88 | 91 | 19 | 0.0939 | 2.03 (1st) | TFT TV |
| 89 | 91 | 19 | 0.0945 | 2.00 (1st) | TFT TV |
| 90 | 91 | 18 | 0.0929 | 2.08 (1st) | TFT |
| 91 | 89 | 18 | 0.0916 | 1.98 (1st) | TFT |
| 92 | 89 | 18 | 0.0916 | 1.98 (1st) | TFT |
| 93 | 90 | 18 | 0.0923 | 2.03 (1st) | TFT |
| 94 | 88 | 19 | 0.0903 | 2.07 (1st) | TFT |
| 95 | 87 | 17 | 0.0979 | 1.96 | TFT |
| 96 | 94 | 18 | 0.0914 | 2.17 (1st) | TFT TV |
| 97 | 87 | 17 | 0.0979 | 1.96 | TFT |
| 98 | 104 | 19 | 0.0985 | 2.18 | TFT |
| 99 | 88 | 17 | 0.0967 | 2.10 | TFT TV |
| 100 | 92 | 16 | 0.0812 | 2.11 | TFT |
| 101 | 88 | 17 | 0.0873 | 1.86 | TFT |
| 102 | 93 | — | 0.0950 | 2.27 | TFT TV |
| 103 | 90 | 18 | 0.0910 | 2.01 | TFT TV |
| 104 | 91 | 18 | 0.0901 | 1.88 | TFT TV |
| 105 | 93 | 18 | 0.0901 | 2.04 | TFT TV |
| 106 | 94 | 19 | 0.0871 | 2.04 | TFT TV |
| 107 | 82 | 18 | 0.0895 | 1.81 | TFT TV |
| 108 | 79 | 17 | 0.0856 | 1.80 | TFT TV |
| 109 | 80 | 16 | 0.0867 | 1.80 | TFT TV |
| 110 | 80 | 19 | 0.0865 | 1.67 | TFT TV |
| 111 | 81 | — | 0.0909 | 1.82 | TFT |
| 112 | 81 | 17 | 0.0845 | 1.83 | TFT TV USE |
| 113 | 83 | 17 | 0.0827 | 1.88 | TFT TV USE |
| 114 | 77 | 17 | 0.0858 | 1.74 | TFT TV USE |
| 115 | 83 | 19 | 0.0896 | 1.70 | |
| 116 | 84 | 19 | 0.0919 | 1.90 | |
| 117 | 87 | 19 | 0.0949 | 1.70 | |
| 118 | 80 | 19 | 0.0902 | 1.54 | |
| 119 | 86 | 19 | 0.086 | 1.78 | |
| 120 | 82 | 19 | 0.0896 | 1.70 | TFT |
| 121 | 82 | 19 | 0.0949 | 1.70 | TFT |
| 122 | 79 | 19 | 0.0902 | 1.54 | TFT |
| 123 | 86 | 19 | 0.086 | 1.78 | TFT |
| 124 | 90 | 23 | 0.0959 | 1.55 | OMI |
| 125 | 106 | 22 | 0.0934 | 2.02 | TFT TV |
| 126 | 105 | 22 | 0.0922 | 2.02 | TFT TV |
| 127 | 90 | 19 | 0.0816 | 2.14 | TFT TV |
| 128 | 92 | 16 | 0.0812 | 2.11 | TFT |
| 129 | 90 | 19 | 0.0815 | 2.03 | TFT TV |
| 130 | 90 | 19 | 0.0835 | 1.95 | TFT TV |
| 131 | 88 | 17 | 0.0873 | 1.86 | TFT |
| 132 | 92 | 16 | 0.0812 | 2.11 | TFT |

The following examples relate to further mixtures according to the invention:

EXAMPLE 133

A liquid crystal mixture consisting of:

14.7% of p-trans-4-propylcyclohexyl-benzonitrile,

5% of p-trans-4-ethylcyclohexyl-benzonitrile, 10.8% of p-trans-4-butylcyclohexyl-benzonitrile, 6% of p-trans-4-pentylcyclohexyl-benzonitrile, 5% of trans-1-p-methoxyphenyl-4-propylcyclohexane, 9.8% of trans,trans-4-methoxy-4'-propylcyclohexylcyclohexane, 8% of 1-[p-(trans-4-propylcyclohexyl)-phenyl]-2-(p-propylphenyl) -ethane, 8% of 1-[p-(trans-4-pentylcyclohexyl)-phenyl]-2-(p-propylphenyl)-ethane, 8% of 1-(p-[trans-4-pentylcyclohexyl]-phenyl]-2-(trans-4-propylcyclohexyl)-ethane, 8% of 1-[p-(trans-4-pentylcyclohexyl)-phenyl]-2-(trans-4-pentylcyclohexyl)-ethane, 8% of 1-(trans-4-propylcyclohexyl)-2-[trans-4-(p-cyanophenyl)-cyclohexyl]-ethane, 8% of p-[trans-4-(trans-4-propylcyclohexyl)-cyclohexyl]-fluorobenzene and 0.7% of optically active 2-octyl p-(p-n-hexylbenzoyloxy)-benzoate is prepared.

EXAMPLE 134

A liquid crystal mixture consisting of a base mixture containing

21% of p-trans-4-propylcyclohexylbenzonitrile,
5% of trans-1-p-methoxyphenyl-4-propylcyclohexane,
6% of 2-p-ethylphenyl-5-propylpyrimidine,
6% of 2-p-propylphenyl-5-propylpyrimidine,
6% of 2-p-propylphenyl-5-pentylpyrimidine,
4% of 2-p-ethylphenyl-5-heptylpyrimidine,
4% of 1-[trans-4-propylcyclohexyl)-2-trans-4-(p-propylphenyl)-cyclohexyl]-ethane,
4% of 1-(trans-4-pentylcyclohexyl)-2-[trans-4-(p-propylphenyl)-cyclohexyl]-ethane,
4% of p-[trans-4-(trans-4-propylcyclohexyl)-cyclohexyl]-ethylbenzene,
5% of 1,4-bis-(trans-4-propylcyclohexyl)-benzene,
5% of 4-butyl-4'-propyl-tolane,
5% of 4-pentyl-4'-propyl-tolane,
5% of 4-methoxy-4'-ethyl-tolane,
7% of 4-(trans-4-propylcyclohexyl)-4'-methoxy-tolane,
6% of 4-(trans-4-propylcylcohexyl) [sic]-4'-ethoxytolane and
7% of 4-(trans-4-propylcyclohexyl)-4'-propoxy-tolane and a suitable chiral component (for example 0.7% of 2-octyl p-(p-n-hexylbenzoyloxy)-benzoate) exhibits short switching times.

EXAMPLE 135

A liquid crystal mixture consisting of:

13% of p-trans-4-propylcyclohexyl-benzonitrile,
14.3% of 1-(trans-4-propylcyclohexyl)-2-(p-cyanophenyl)ethane,
12% of 1-(trans-4-pentylcyclohexyl)-2-(p-cyanophenyl)ethane,
7% of 5-propyl-2-(trans-4-ethylcyclohexyl)-trans-1,3-dioxane,
12% of 4-(trans-4-propylcyclohexyl)-1-propylcyclohex-1-ene,
6% of 1-[trans-4-(trans-4-propylcyclohexyl)-cyclohexyl]-2-(p-methylphenyl)-ethane,
6% of 1-[trans-4-(trans-4-propylcyclohexyl)-cyclohexyl]-2-(p-ethylphenyl)-ethane,
6% of 1-[trans-4-(trans-4-propylcyclohexyl)-cyclohexyl]-2-(p-propylphenyl)-ethane,
6% of 1-[trans-4-(trans-4-propylcyclohexyl)-cyclohexyl]-2-(p-pentylphenyl)-ethane,
5% of 1-[trans-4-(trans-4-propylcyclohexyl)-cyclohexyl]-2-(3,4-difluorophenyl)-ethane,
5% of 1-(trans-4-propylcyclohexyl)-2-[trans-4-(3-fluoro-4-cyanophenyl)-cyclohexyl]-ethane,
4% of 4,4'-bis-(trans-4-propylcyclohexyl)-biphenyl,
3% of 4,4'-bis-(trans-4-pentylcyclohexyl)-biphenyl and
0.7% of optically active 2-octyl p-(p-n-hexylbenzoyloxy)-benzoate is prepared.

EXAMPLE 136

A liquid crystal mixture consisting of:
5% of p-trans-4-propylcyclohexyl-benzonitrile,
5% of p-trans-4-ethylcyclohexyl-benzonitrile,
14.3% of 1-(trans-4-propylcyclohexyl)-2-(p-cyanophenyl)ethane,
12% of 1-(trans-4-pentylcyclohexy)[sic]-2-(p-cyanophenyl)-ethane,
10% of trans-1-p-methoxyphenyl-4-propylcyclohexane,
5% of 1,2-bis-(trans-4-propylcyclohexyl)-ethane,
8% of 1-[trans-4-(trans-4-propylcyclohexyl)-cyclohexyl]-2-(p-methylphenyl)-ethane,
8% of 1-[trans-4-(trans-4-propylcyclohexyl)-cyclohexyl]-2-(p-ethylphenyl)-ethane,
8% of 1-[trans-4-(trans-4-propylcyclohexyl)-cyclohexyl]-2-(p-propylphenyl)-ethane,
8% of 1-[trans-4-(trans-4-propylcyclohexyl)-cyclohexyl]-2-(p-pentylphenyl)-ethane,
8% of 1-[trans-4-(trans-4-propylcyclohexyl)-cyclohexyl]-3,,4-difluorobenzene,
8% of 4-(trans-4-propylcyclohexyl)-3'-fluoro-4'-cyanobiphenyl and
0.7% of optically active 2-octyl p-(p-n-hexylbenzoyloxy)-benzoate is prepared.

EXAMPLE 137

A liquid crystal mixture consisting of:

15% of p-trans-4-propylcyclohexylbenzonitrile,
11% of p-trans-4-butylcyclohexylbenzonitrile,
4% of trans-1-p-methoxyphenyl-4-propylcyclohexane,
14% of trans,trans-4-methoxy-4'-pentylcyclohexylcyclohexane,
14% of trans,trans-4-ethoxy-4'-pentylcyclohexylcyclohexane,
6% of 1-[trans-4-(trans-4-propylcyclohexyl)-cyclohexyl]-2-(p-methylphenyl)-ethane,
6% of 1-[trans-4-(trans-4-propylcyclohexyl)-cyclohexyl]-2-(p-ethylphenyl)-ethane,
6% of 1-[trans-4-(trans-4-propylcyclohexyl)-cyclohexyl]-2-(p-propylphenyl)-ethane,
6% of 1-[trans-4-(trans-4-propylcyclohexyl)-cyclohexyl]-2-(p-pentylphenyl)-ethane,
6% of 1-[trans-4-(trans-4-propylcyclohexyl)-cyclohexyl]-2-(p-cyanophenyl)-ethane,
6% of 1-[trans-4-(trans-4-propylcyclohexyl)-cyclohexyl]-2-(p-fluorophenyl)-ethane,
3% of 4,4'-bis-(trans-4-propylcyclohexyl)-biphenyl and
3% of 2-(p-pentylphenyl)-5-propyl-pyridine is prepared.

EXAMPLE 138

An SLC display element having the following parameters:

| | |
|---|---|
| twisting angle | 220° |
| angle of incidence | 1° |
| d/p (layer thickness/pitch) | 0.36 |
| d · Δn | 0.85 | containing a liquid crystal mixture having the following parameters:

| | |
|---|---|
| clearing point | 94° |
| Δn | 0.1238 (589 nm) |
| viscosity | 25 mPa · s |
| Δε | +7.5 |
| $\epsilon_\perp$ | 5.9 | and consisting of
- 15% of p-trans-4-propylcyclohexyl-benzonitrile,
- 11% of p-trans-4-butylcyclohexyl-benzonitrile,
- 11% of p-trans-4-pentylcyclohexyl-benzonitrile,
- 5% of p-trans-4-ethylcyclohexyl-benzonitrile,
- 7% of 2,3-difluoro-4-ethoxyphenyl trans-4-propylcyclohexanecarboxylate,
- 6% of 2,3-difluoro-4-ethoxyphenyl trans-4-pentylcyclohexanecarboxylate,
- 7% of 2,3-difluoro-4-ethoxyphenyl trans,trans-4-propylcyclohexylcyclohexane-4'-carboxylate,
- 5% of 4-(trans-4-propylcyclohexyl)-2',3'-difluoro-4'-ethozy-tolane,
- 5% of 4-(trans-4-pentylcyclohexyl)-2',3'-difluoro-4'-ethoxy-tolane,
- 6% of 1-[trans-4-(trans-4-propylcyclohexyl)-cyclohexyl]-2-(p-methylphenyl)-ethane,
- 6% of 1-[trans-4-(trans-4-propylcyclohexyl)-cyclohexyl]-2-(p-propylphenyl)-ethane,
- 6% of 1-[trans-4-(trans-4-propylcyclohexyl)-cyclohexyl]-2-(p-pentylphenyl)-ethane,
- 4% of 1-[trans-4-(trans-4-propylcyclohexyl)-cyclohexyl]-2-(p-cyanophenyl)-ethane and
- 6% of 1-[trans-4-(trans-4-propylcyclohexyl)-cyclohexyl]-2-(p-fluorophenyl)-ethane, exhibits a characteristic line gradient $V_{50}/V_{10}$ of 2.7%.

In an SLC display element of relatively high angle of incidence (5°), d/p=0.40, d.Δn=0.85 and a twisting angle of 220°, the same mixture exhibits a gradient $V_{50}/V_{10}$ of 2.9% and a value 8 of the angular dependency of the contrast of 0.4%.

EXAMPLE 139

An SLC display element having the following parameters:

| | |
|---|---|
| twisting angle | 220° |
| angle of incidence | 1° |
| d/p (layer thickness/pitch) | 0.40 |
| d · Δn | 0.85 | containing a liquid crystal mixture having the following parameters:

| | |
|---|---|
| clearing point | 91° |
| Δn | 0.1085 (589 nm) |
| viscosity | 25 mPa · s |
| Δε | +8.2 |
| $\epsilon_\perp$ | 5.1 | and consisting of
- 15% of p-trans-4-propylcyclohexyl-benzonitrile,
- 11% of p-trans-4-butylcyclohexyl-benzonitrile,
- 11% of p-trans-4-pentylcyclohexyl-benzonitrile,
- 5% of p-trans-4-ethylcyclohexyl-benzonitrile,
- 7% of 2,3-difluoro-4-ethoxyphenyl trans-4-propylcyclohexanecarboxylate,
- 6% of 2,3-difluoro-4-ethoxyphenyl trans-4-pentylcyclohexanecarboxylate,
- 7% of 2,3-difluoro-4-ethoxyphenyl trans,trans-4-propylcyclohexylcyclohexane-4'-carboxylate,
- 8% of 1-[trans-4-(trans-4-propylcyclohexyl)-cyclohexyl]-2-(p-methylphenyl)-ethane,
- 6% of 1-[trans-4-(trans-4-propylcyclohexyl)-cyclohexyl]-2-(p-propylphenyl)-ethane,
- 8% of 1-[trans-4-(trans-4-propylcyclohexyl)-cyclohexyl]-2-(p-pentylphenyl)-ethane,
- 8% of 1-[trans-4-(trans-4-propylcyclohexyl)-cyclohexyl]-2-(p-cyanophenyl)-ethane and
- 8% of 1-[trans-4-(trans-4-propylcyclohexyl)-cyclohexyl]-2-(p-fluorophenyl)-ethane exhibits a characteristic line gradient $V_{50}/V_{10}$ of 2.2%.

EXAMPLE 140

An SLC display element having the following parameters:

| | |
|---|---|
| twisting angle | 220° |
| angle of incidence | 1° |
| d/p (layer thickness/pitch) | 0.41 |
| d · Δn | 0.85 | containing a liquid crystal mixture having the following parameters:

| | |
|---|---|
| clearing point | 88° |
| Δn | 0.1569 (589 nm) |
| viscosity | 22 mPa · s |
| Δε | +7.8 |
| $\epsilon_\perp$ | 5.9 | and consisting of
- 15% of p-trans-4-propylcyclohexyl-benzonitrile,
- 11% of p-trans-4-butylcyclohexyl-benzonitrile,
- 11% of p-trans-4-pentylcyclohexyl-benzonitrile,
- 5% of p-trans-4-ethylcyclohexyl-benzonitrile,
- 9% of 4-propyl-2',3'-difluoro-4'-ethoxy-tolane,
- 9% of 4-pentyl-2',3'-difluoro-4'-ethoxy-tolane,
- 6% of 4-(trans-4-propylcyclohexyl)-2',3'-difluoro-4'-ethoxy-tolane,
- 6% of 4-(trans-4-pentylcyclohexyl)-2',3'-difluoro-4'-ethoxy-tolane,
- 6% of 1-[trans-4-(trans-4-propylcyclohexyl)-cyclohexyl]-2-(p-methylphenyl)-ethane,
- 6% of 1-[trans-4-(trans-4-propylcyclohexyl)-cyclohexyl]-2-(p-propylphenyl)-ethane,
- 6% of 1-[trans-4-(trans-4-propylcylcohexyl)[sic]-cyclohexyl]-2-(p-pentylphenyl)-ethane,
- 4% of 1-[trans-4-(trans-4-propylcylcohexyl)[sic]-cyclohexyl]-2-(p-cyanophenyl)-ethane,
- 6% of 1-[trans-4-(trans-4-propylcyclohexyl)-cyclohexyl]-2-(p-fluorophenyl)-ethane, exhibits a characteristic line gradient $V_{50}/V_{10}$ of 3.7%.

EXAMPLE 141

An SLC display element having the following parameters:

| | |
|---|---|
| twisting angle | 220° |
| angle of incidence | 1° |
| d/p (layer thickness/pitch) | 0.42 |
| d · Δn | 0.85 | containing a liquid crystal mixture having the following parameters:

| | |
|---|---|
| clearing point | 94° |
| Δn | 0.1420 (589 nm) |
| viscosity | 23 mPa · s |
| Δε | +8.3 |
| ε$_\perp$ | 5.0 | and consisting of

15% of p-trans-4-propylcyclohexyl-benzonitrile,
11% of p-trans-4-butylcyclohexyl-benzonitrile,
11% of p-trans-4-pentylcyclohexyl-benzonitrile,
5% of p-trans-4-ethylcyclohexyl-benzonitrile,
12% of 4-pentyl-2',3'-difluoro-4'-ethoxy-tolane,
5% of 4-(trans-4-propylcyclohexyl)-2',3'-difluoro-4'-ethoxy-tolane,
6% of 1-[trans-4-(trans-4-propylcyclohexyl)-cyclohexyl]-2-(p-methylphenyl)-ethane,
6% of 1-[trans-4-(trans-4-propylcyclohexyl)-cyclohexyl]-2-(p-propylphenyl)-ethane,
6% of 1-[trans-4-(trans-4-propylcyclohexyl)-cyclohexyl]-2-(p-pentylphenyl)-ethane,
4% of 1-[trans-4-(trans-4-propylcyclohexyl)-cyclohexyl]-2-(p-cyanophenyl)-ethane and
6% of 1-[trans-4-(trans-4-propylcyclohexyly-cyclohexyl]-2-(p-fluorophenyl)-ethane exhibits a characteristic line gradient $V_{50}/V_{10}$ of 3.6%.

EXAMPLE 142

An SLC display element having the following parameters:

| | |
|---|---|
| twisting angle | 220° |
| angle of incidence | 1° |
| d/p (layer thickness/pitch) | 0.44 |
| d · Δn | 0.85 | containing a liquid crystal mixture having the following parameters:

| | |
|---|---|
| clearing point | 92° |
| Δn | 0.1250 (589 nm) |
| viscosity | 21 mPa · s |
| Δε | +8.2 |
| ε$_\perp$ | 4.3 | and consisting of

15% of p-trans-4-propylcylcohexyl[sic]-benzonitrile,
11% of p-trans-4-butylcyclohexyl-benzonitrile,
11% of p-trans-4-pentylcyclohexyl-benzonitrile,
5% of p-trans-4-ethylcyclohexyl-benzonitrile,
10% of 4-pentyl-2',3'-difluoro-4-ethoxy-tolane,
8% of 1-[trans-4-(trans-4-propylcyclohexyl)-cyclohexyl]-2-(p-methylphenyl)-ethane,
8% of 1-[trans-4-(trans-4-propylcyclohexyl)-cyclohexyl]-2-(p-ethylphenyl)-ethane,
8% of 1-[trans-4-(trans-4-propylcyclohexyl)-cyclohexyl]-2-(p-propylphenyl)-ethane,
8% of 1-[trans-4-(trans-4-propylcyclohexyl)-cyclohexyl]-2-(p-pentylphenyl)-ethane,
8% of 1-[trans-4-(trans-4-propylcyclohexyl)-cyclohexyl]-2-(p-cyanophenyl)-ethane and
8% of 1-[trans-4-(trans-4-propylcyclohexyl)-cyclohexyl]-2-(p-fluorophenyl)-ethane exhibits a characteristic line gradient $V_{50}/V_{10}$ of 4.0%.

EXAMPLE 143

An SLC display element having the following parameters:

| | |
|---|---|
| twisting angle | 220° |
| angle of incidence | 1° |
| d/p (layer thickness/pitch) | 0.37 |
| d · Δn | 0.85 | containing a liquid crystal mixture having the following parameters:

| | |
|---|---|
| clearing point | 88° |
| Δn | 0.1544 (589 nm) |
| viscosity | 26 mPa · s |
| Δε | +7.3 |
| ε$_\perp$ | 6.4 | and consisting of

15% of p-trans-4-propylcyclohexyl-benzonitrile,
11% of p-trans-4-butylcyclohexyl-benzonitrile,
11% of p-trans-4-pentylcyclohexyl-benzonitrile,
5% of p-trans-4-ethylcyclohexyl-benzonitrile,
7% of 2,3-difluoro-4-ethoxyphenyl trans-4-propylcyclohexanecarboxylate,
6% of 2,3-difluoro-4-ethoxyphenyl trans-4-butylcyclohexanecarboxylate,
7% of 2,3-difluoro-4-ethoxyphenyl trans-4-pentylcyclohexanecarboxylate,
6% of 4-propyl-2',3'-difluoro-4'-ethoxy-tolane,
4% of 4-(trans-4-propylcyclohexyl)-2',3'-difluoro-4'-ethoxy-tolane,
6% of 4-(trans-4-propylcyclohexyl)-4'-methoxy-tolane,
5% of 4-(trans-4-propylcyclohexyl)-4,-ethoxy-tolane,
7% of 4-(trans-4-propylcyclohexyl)-4,-propoxy-tolane,
6% of 1-[trans-4-(trans-4-propylcyclohexyl)-cyclohexyl]-2-(p-methylphenyl)-ethane and
4% of 1-[trans-(trans-4-propylcyclohexyl)-cyclohexyl]-2-(p-propylphenyl)-ethane exhibits a characteristic line gradient $V_{50}/V_{10}$ of 2.7% and an angular dependency of the contrast β=0.9%.

In the tables which follow, properties and composition of the mixtures of Examples 144 to 428 are given, the individual compounds having the following code:

ECCP-31: 1-[trans-4-(trans-4-propylcyclohexyl) cyclohexyl]-(2-p-methylphenyl)ethane ECCP-32: 1-[trans-4-(trans-4-propylcyclohexyl)cyclohexyl]-(2-p-ethylphenyl)-ethane
ECCP-33: 1-[trans-4-(trans-4-propylcyclohexyl)cyclohexyl]-(2-p-propylphenyl)-ethane
ECCP-34 1-[trans-4-(trans-4-propylcyclohexyl)cyclohexyl]-(2-p-butylphenyl)-ethane
ECCP-35: 1-[trans-4-(trans-4-propylcyclohexyl)cyclohexyl]-(2-p-pentylphenyl.)-ethane
CCH-301: trans,trans-4-propyl-4'-methoxy-cyclohexylcyclohexane
CCH-302: trans,trans-4-propyl-4'-ethoxy-cyclohexylcyclohexane
CCH-303: trans,trans-4-propyl-4'-propoxy-cyclohexylcyclohexane
CCH-501: trans,trans-4-pentyl-4'-methoxy-cyclohexylcyclohexane
CCH-502: trans,trans-4-pentyl-4'-ethoxy-cyclohexylcyclohexane
C-33: trans,,trans-4-propyl-4'-butyryloxy-cyclohexylcyclohexane
C-35: trans,trans-4-propyl-4'-hexanoyloxycyclohexylcyclohexane
OS-33: trans-4-propylcyclohexyl trans-4-propylcyclohexanecarboxylate
OS-53: trans-4-pentylcyclohexyl trans-4-propylcyclohexanecarboxylate
PCH-301: trans-1-p-methoxyphenyl-4-propylcyclohexane
PCH-302: trans-1-p-ethoxyphenyl-4-propylcyclohexane
PCH-304: trans-1-p-butoxyphenyl-4-propylcyclohexane
PCH-501: trans-1-p-methoxyphenyl-4-pentylcyclohexane
PCH-53: trans-1-p-propylphenyl-4-pentylcyclohexane
PCH-52: trans-1-p-ethylphenyl-4-pentylcyclohexane
CP-3F: p-fluorophenyl trans,trans-4-propylcyclohexylcyclohexane-4'-carboxylate
CP-5F: p-fluorophenyl trans,trans-4-pentylcyclohexylcyclohexane-4'-carboxylate
CH-33: trans-4-propylcyclohexyl trans,trans-4-propylcyclohexylcyclohexane-4'-carboxylate
CH-35: trans-4-pentylcyclohexyl trans,trans-4-propylcyclohexylcyclohexane-4'-carboxylate
CH-43: trans-4-propylcyclohexyl trans,trans-4-butylcyclohexylcyclohexane-4'-carboxylate
CH-45: trans-4-pentylcyclohexyl trans,trans-4-butylcyclohexylcyclohexane-4'-carboxylate
CP-33: p-propylphenyl trans,trans-4-propylcyclohexylcyclohexane-4'-carboxylate
CP-35: p-pentylphenyl trans,trans-4-propylcyclohexylcyclohexane-4'-carboxylate
CP-43: p-propylphenyl trans,trans-4-butylcyclohexylcyclohexane-4'-carboxylate
CP-45: p-pentylphenyl trans,trans-4-butylcyclohexylcyclohexane-4'-carboxylate
ECCP-3F: 1-[trans-4-(trans-4-propylcyclohexyl)cyclohexyl]-2-(p-fluorophenyl)-ethane
ECCP-5F: 1-[trans-4-(trans-4-pentylcyclohexyl)cyclohexyl]-2-(p-fluorophenyl)-ethane
PYP-32: 2-p-ethylphenyl-5-propyl-pyrimidine
PYP-33: 2-p-propylphenyl-5-propyl-pyrimidine
PYP-53: 2-p-propylphenyl-5-pentyl-pyrimidine
PYP-72: 2-p-ethylphenyl-5-heptyl-pyrimidine
PYP-605: 2-p-pentyloxyphenyl-5-hexyl-pyrimidine
PYP-607: 2-p-heptyloxyphenyl-5-hexyl-pyrimidine
PYP-609: 2-p-nonyloxyphenyl-5-hexyl-pyrimidine
PYP-707: 2-p-heptyloxyphenyl-5-heptyl-pyrimidine
PYP-709: 2-p-nonyloxyphenyl-5-heptyl-pyrimidine
PYP-706: 2-p-Hexyloxyphenyl-5-nonyl-pyrimidine
PYP-909: 2-p-nonyloxyphenyl-5-nonyl-pyrimidine
PCH-2: p-trans-4-ethylcyclohexylbenzonitrile
PCH-3: p-trans-4-propylcyclohexylbenzonitrile
PCH-4: p-trans-4-butylcyclohexylbenzonitrile
PCH-5: p-trans-4-pentylcyclohexylbenzonitrile
G9=EPCH-3: 1-(trans-4-propylcyclohexyl)-2-(p-cyanophenyl)-ethane
G15=EPCH-5: 1-(trans-4-pentylcyclohexyl)-2-(p-cyanophenyl)-ethane
K6: 4-ethyl-4'-cyanobiphenyl
K9: 4-propyl-4'-cyanobiphenyl
K15: 4-pentyl-4'-cyanobiphenyl
PDX-3: 2-p-cyanophenyl-5-propyl-1,3-dioxane
PDX-4: 2-p-cyanophenyl-5-butyl-1,3-dioxane
PDX-5: 2-p-cyanophenyl-5-pentyl-1,3-dioxane
PCH-3S: trans-1-p-isothiocyantophenyl-4-propylcyclohexane
ECCP-3: 1-[trans-4-(trans-4-propylcyclohexyl]-cyclohexyl]-2-(p-cyanophenyl)-ethane
ME-2N,F: 4-cyano-3-fluorophenyl p-ethylbenzoate
ME-3N,F: 4-cyano-3-fluorophenyl p-propylbenzoate
ME-5N,F: 4-cyano-3-fluorophenyl p-pentylbenzoate
ME-7N,F: 4-cyano-3-fluorophenyl p-heptylbenzoate
HP-3N,,F: 4-cyano-3-fluorophenyl p-(trans-4-propylcyclohexyl)-benzoate
HP-4N,F: 4-cyano-3-fluorophenyl p-(trans-4-butylcyclohexyl)-benzoate
HP-5N,F: 4-cyano-3-fluorophenyl p-(trans-4-pentylcyclohexyl)-benzoate
PYP-5N,F: 2-(3-fluoro-4-cyanophenyl)-5-pentylpyrimidine
PYP-6N,F: 2-(3-fluoro-4-cyanophenyl)-5-hexylpyridine
PYP-7N,F: 2-(3-fluoro-4-cyanophenyl)-5-heptylpyrimidine
PCH-5F: trans-1-p-fluorophenyl-4-pentylcyclohexane
PCH-7F: trans-i-p-fluorophenyl-4-hexylcyclohexane
trans-1-p-fluorophenyl-4-heptylcyclohexane
PTP-34: 4-butyl-4'-propyl-tolan
5 PTP-35: 4-pentyl-4'-propyl-tolan
PTP-45: 4-butyl-4'-pentyl-tolan
PTP-201: 4-ethyl-4'-methoxy-tolan
PTP-102: 4-methyl-4'-ethoxy-tolan
CPTP-301: 4-(trans-4-propylcyclohexyl)-4'-methoxy-tolan
CPTP-302: 4-(trans-4-propylcyclohexyl)-4'-ethoxy-tolan
CPTP-303: 4-(trans-4-propylcyclohexyl)-4'-propoxy-tolan
BCH-32: 4-ethyl-4'-(trans-4-propylcyclohexyl)-biphenyl
BCH-52: 4-ethyl-4'-(trans-4-pentylcyclohexyl)-biphenyl
BCH-59: 4-nonyl-4'-(trans-4-pentylcyclohexyl)-biphenyl
BCH-52F: 4-ethyl-4'-(trans-4-pentylcyclohexyl) -2'-fluorobiphenyl I52: 1-(trans-4-pentylcyclohexyl)-2-(4'-ethyl-2'-fluorobiphenyl-4-yl)-ethane CBC-33: 4,4'-bis-(trans-4-propylcyclohexyl)-biphenyl CBC-35: 4-(trans-4-pentylcyclohexyl)-4'-(trans-4-propylcyclohexyl)-biphenyl
(=CBC-53)

CBC-55: 4,4'-bis-(trans-4-pentylcyclohexyl)-biphenyl

CBC-33F: 4,4-bis-(trans-4-propylcyclohexyl)-2-fluorobiphenyl

CBC-35F: 4-(trans-4-pentylcyclohexyl)-4'-(trans-4-propylcyclohexyl)-2-fluorobiphenyl
(=CBC-53F)

CBC-55F: 4,4'-bis-(trans-4-pentylcyclohexyl)-2-fluorobiphenyl

D-301: p-methoxyphenyl trans-4-propylcyclohexane carboxylate

D-401: p-methoxyphenyl trans-4-butylcyclohexane carboxylate

D-501: p-methoxyphenyl trans-4-pentylcyclohexane carboxylate

D-302: p-ethoxyphenyl trans-4-propylcyclohexane carboxylate

D-402: p-ethoxyphenyl trans-4-butylcyclohexane carboxylate

D-302FF: (2,3-difluoro-4-ethoxyphenyl) trans-4-propylcyclohexane carboxylate

D-402FF: (2,3-difluoro-4-ethoxyphenyl) trans-4-butylcyclohexane carboxylate

D-502FF: (2,3-difluoro-4-ethoxyphenyl) trans-4-pentylcyclohexane carboxylate

PYP-3N,F: 2-(3-fluoro-4-cyanophenyl)-5-propylpyrimidine

CBC-44: 4,4'-bis(trans-4-butylcyclohexyl)-biphenyl

PYP-3F: 2-(p-fluorophenyl)-S-propylpyrimidine

PYP-5F: 2-(p-fluorophenyl)-5-pentylpyrimidine

PYP-35: 2-(p-pentylphenyl)-5-propylpyrimidine

PYP-53: 2-(p-propylphenyl)-5-pentylpyrimidine

PYP-5OCF$_3$: 2-(p-trifluoromethoxyphenyl)-5-pentylpyrimidine

PYP-7OCF$_3$: 2-(p-trifluoromethoxyphenyl)-5-heptylpyrimidine

I 32: 1-(trans-4-propylcyclohexyl)-2-(4'-ethyl-2'-fluorobiphenyl-4-yl)-ethane

I 35: 1-(trans-4-propylcyclohexyl)-2-(4'-pentyl-2'-fluorobiphenyl-4-yl)-ethane

ME-2N: p-cyanophenyl p-ethylbenzoate

ME-3N: p-cyanophenyl p-propylbenzoate

ME-4NF: 3-fluoro-4-cyanophenyl p-butylbenzoate

BCH-5: 4-cyano-4'-(trans-4-pentylcyclohexyl)-biphenyl

BCH-3OCF$_3$: 4-trifluoromethoxy-4'(trans-4-propylcyclohexyl)-biphenyl

BCH-5OCF$_3$: 4-trifluoromethoxy-4'(trans-4-pentylcyclohexyl)-biphenyl

CCP-3OCF$_3$: 1-[trans-4-(trans-4-propylcyclohexyl)-cyclohexyl]-4-trifluoromethoxybenzol [sic]

ECCP-3OCF$_3$: 1-[trans-4-(trans-4-propylcyclohexyl)-cyclohexyl]-2-p-trifluoromethoxyphenyl)-ethane ECCP-5OCF$_3$: 1-[trans-4-(trans-4-pentylcyclohexyl)-cyclohexyl]-2-(p-trifluoromethoxyphenyl)-ethane ECCP-3F,F: 1-[trans-4-(trans-4-propylcyclohexyl)-cyclohexyl]-2-(3,4-difluorophenyl)-ethane CPTP-3O2FF: 4-(trans-4-propylcyclohexyl)-2',3'-difluoro-4-ethoxytolan CPTP-5O2FF 4-(trans-4-pentylcyclohexyl)-2',3'-difluoro-4-ethoxytolan PTP-3O2FF: 4'-propyl-2,3-difluoro-4-ethoxytolan PTP-5O2FF: 4'-pentyl-2,3-difluoro-4-ethoxytolan CCPC-33: p-(trans-4-propylcyclohexyl)phenyl trans-4-(trans-4-propylcyclohexyl)-cyclohexanecarboxylate CCPC-34: p-(trans-4-butylcyclohexyl)phenyl trans-4-(trans-4-(propylcyclohexyl)-cyclohexanecarboxylate CCPC-35: p-(trans-4-pentylcyclohexyl)phenyl trans-4-(trans-4-propylcyclohexyl)-cyclohexanecarboxylate K12: 4-butyl-4'-cyanobiphenyl K18: 4-hexyl-4'-cyanobiphenyl T15: 4-p-cyanophenyl-4'-pentylbiphenyl DR-31: 2-methylpyridine-5-yl trans-4-propylcyclohexanecarboxylate DR-41: 2-methylpyridine-5-yl trans-4-butylcyclohexanecarboxylate DR-S1: 2-methylpyridine-5-yl trans-4-pentylcyclohexanecarboxylate CP-33F: 2-fluoro-4-propylphenyl trans-4-(trans-4-propylcyclohexyl)cyclohexanecarboxylate CP-35F: 2-fluoro-4-pentylphenyl trans-4-(trans-4-propylcyclohexyl)cyclohexanecarboxylate CP-55F: 2-fluoro-4-pentylphenyl trans-4-(trans-4-pentylcyclohexyl)cyclohexanecarboxylate CP-3O2F: 2,3-difluoro-4-ethoxyphenyl trans-4-(trans-4-propylcyclohexyl)cyclohexanecarboxylate CP-4O2FF: 2,3-difluoro-4-ethoxyphenyl trans-4-(trans-4-butylcyclohexyl)cyclohexanecarboxylate HP-2N.F: 3-fluoro-4-cyanophenylp-(trans-4-ethylcyclohexyl)-benzoate EHP-3F.F: 3,4-difluorophenylp-(trans-4-propylcyclohexylethyl)-benzoate PCH-5OCF$_2$: trans-1-p-(difluoromethoxyphenyl)-4-pentylcyclohexane PCH-7: trans-1-p-(cyanophenyl)-4-heptylcyclohexane PDX-2: 2-p-cyanophenyl-5-ethyl-1,3-dioxane OS-35: trans-4-pentylcyclohexyl trans-4-propylcyclohexanecarboxylate CCH-3: trans,trans-4-propylcyclohexylcyclohexane-4,-carbonitrile M3: 4-methoxy-4'-cyanobiphenyl M9: 4-propoxy-4'-cyanobiphenyl T-3FN: 4-(p-cyanophenyl)-2-fluoro-4'-propylbiphenyl

| | | Multiplex values measured at 240° twist | | | | | | | |
|---|---|---|---|---|---|---|---|---|---|
| Examples | | 144 | | 145 | | 146 | | 147 | |
| S → N [° C.] | | <−40 | | <−40 | | <−40 | | <−40 | |
| Clearing point [° C.] | | +85 | | +89 | | +90 | | +86 | |
| Viscosity [mm²s⁻¹] 20° C. | | 26 | | 25 | | 24 | | 23 | |
| $\Delta n$ (589 nm, 20° C.) | | +0.1127 | | +0.1222 | | +0.1094 | | +0.1221 | |
| $n_\alpha$ (589 nm, 20° C.) | | 1.6023 | | 1.6166 | | 1.5984 | | 1.6165 | |
| $\Delta\epsilon$ (1 kHz, 20° C.) | | +12.9 | | +14.5 | | +9.9 | | +10.6 | |
| $\epsilon_\parallel$ (1 kHz, 20° C.) | | 17.7 | | 19.3 | | 14.2 | | 14.8 | |
| $V_{(10,0,20)}$ | | 1.76 | | 1.75 | | 2.03 | | 2.01 | |
| $V_{(50,0,20)}$ | | 1.85 | | 1.81 | | 2.11 | | 2.08 | |
| $V_{(90,0,20)}$ | | 1.89 | | 1.87 | | 2.16 | | 2.13 | |
| $K_3/K_1$ +20° C. | | 1.77 | | 1.69 | | 1.74 | | 1.77 | |
| Composition [%]: | CCH-3 | 4 | PCH-3 | 18 | PCH-2 | 7 | PCH-2 | 7 |
| | PCH-3 | 18 | PCH-4 | 12 | PCH-3 | 18 | PCH-3 | 18 |
| | PCH-4 | 13 | PCH-5 | 11 | PCH-4 | 14 | PCH-4 | 14 |
| | PCH-5 | 11 | ME2N.F | 3 | PCH-5 | 17 | PCH-5 | 15 |
| | ME2N.F | 3 | ME3N.F | 4 | CCH-303 | 3 | PCH-7 | 7 |
| | ME3N.F | 3 | ME5N.F | 8 | ECCP-3 | 8 | BCH-32 | 10 |
| | ME5N.F | 5 | ECCP-31 | 5 | ECCP-3F | 6 | CP-33 | 5 |
| | CCH-303 | 6 | ECCP-32 | 4 | ECCP-5F | 6 | CP-35 | 5 |
| | CP-33 | 4 | ECCP-33 | 4 | CH-33 | 4 | ECCP-3 | 7 |
| | CP-35 | 5 | BCH-32 | 4 | CH-35 | 4 | ECCP-3F | 6 |
| | CP-43 | 4 | CP-33 | 5 | CP-33 | 5 | ECCP-5F | 6 |
| | CP-45 | 4 | CP-35 | 4 | CP-35 | 4 | | |
| | ECCP-3 | 8 | CP-43 | 4 | CP-43 | 4 | | |
| | ECCP-3F | 6 | ECCP-3 | 4 | | | | |
| | ECCP-5F | 6 | ECCP-3F | 6 | | | | |
| | | | ECCP-5F | 4 | | | | |

| | | Multiplex values measured at 240° twist | | | | | |
|---|---|---|---|---|---|---|---|
| Examples | | 148 | | 149 | | 150 | |
| S → N [° C.] | | <−40 | | <−40 | | <−20 | |
| Clearing point [° C.] | | +89 | | +90 | | +91 | |
| Viscosity [mm²s⁻¹] 20° C. | | 21 | | 28 | | 24 | |
| $\Delta n$ (589 nm, 20° C.) | | +0.1479 | | +0.1438 | | 0.1427 | |
| $n_\alpha$ (589 nm, 20° C.) | | 1.6486 | | 1.6400 | | 1.6397 | |
| $\Delta\epsilon$ (1 kHz, 20° C.) | | +9.6 | | +14.8 | | 11.1 | |
| $\epsilon_\parallel$ (1 kHz, 20° C.) | | 13.4 | | 20.0 | | 15.3 | |
| $V_{(10,0,20)}$ | | 1.99 | | 1.63 | | 2.00 | |
| $V_{(50,0,20)}$ | | 2.14 | | 1.71 | | 2.08 | |
| $V_{(90,0,20)}$ | | 2.21 | | 1.76 | | 2.13 | |
| $K_3/K_1$ +20° C. | | 1.36 | | 1.68 | | 1.78 | |
| Composition [%]: | PCH-2 | 9 | PCH-3 | 18 | PCH-2 | 7.0 |
| | PCH-3 | 16 | PCH-4 | 12 | PCH-3 | 18.0 |
| | PCH-4 | 11 | PCH-5 | 15 | PCH-4 | 14.0 |
| | PCH-5 | 12 | ME2N.F | 3 | PCH-5 | 15.0 |
| | BCH-5 | 8 | ME3N.F | 4 | PCH-7 | 7.0 |
| | BCH-32 | 8 | ME5N.F | 8 | BCH-32 | 8.0 |
| | BCH-52 | 8 | PTP-201 | 3 | CPTP-301 | 4.0 |
| | ECCP-31 | 6 | CPTP-301 | 3 | CPTP-302 | 4.0 |
| | ECCP-32 | 6 | CPTP-302 | 3 | CPTP-303 | 4.0 |
| | ECCP-33 | 6 | CPTP-303 | 4 | ECCP-3 | 7.0 |
| | PTP-35 | 6 | CBC-33F | 4 | ECCP-3F | 6.0 |
| | PTP-102 | 4 | CP-33 | 5 | ECCP-5F | 6.0 |
| | | | CP-35 | 4 | | |
| | | | CP-43 | 4 | | |
| | | | ECCP-3F | 6 | | |
| | | | ECCP-5F | 4 | | |

| | Multiplex values measured at 220° twist | | | |
|---|---|---|---|---|
| Examples | 151 | 152 | 153 | 154 |
| S → N [° C.] | <−40 | <−40 | <−40 | <−40 |
| Clearing point [° C.] | +88 | +89 | +93 | +96 |
| Viscosity [mm²s⁻¹] 20° C. | 26 | 21 | 21 | 20 |
| $\Delta n$ (589 nm, 20° C.) | +0.1544 | +0.1433 | +0.1400 | +0.1374 |
| $n_\alpha$ (589 nm, 20° C.) | 1.6466 | 1.6410 | 1.6339 | 1.6346 |
| $\Delta\epsilon$ (1 kHz, 20° C.) | +7.3 | +9.7 | +8.1 | +8.6 |
| $\epsilon_\parallel$ (1 kHz, 20° C.) | 13.7 | 13.8 | 12.9 | 12.4 |
| $V_{(10,0,20)}$ | 2.20 | 2.07 | 2.26 | 2.25 |
| $V_{(50,0,20)}$ | 2.26 | 2.12 | 2.32 | 2.31 |
| $V_{(90,0,20)}$ | 2.30 | 2.20 | 2.38 | 2.38 |
| $K_3/K_1$ +20° C. | 1.54 | 1.58 | 1.51 | 1.59 |

-continued

| Composition [%]: | PCH-2 | 5 | PCH-2 | 7.0 | PCH-2 | 5.0 | PCH-2 | 12.0 |
|---|---|---|---|---|---|---|---|---|
| | PCH-3 | 15 | PCH-3 | 18.0 | PCH-3 | 15.0 | PCH-3 | 15.0 |
| | PCH-4 | 11 | PCH-4 | 14.0 | PCH-4 | 11.0 | PCH-4 | 10.0 |
| | PCH-5 | 11 | PCH-5 | 12.0 | PCH-5 | 11.0 | PCH-5 | 8.0 |
| | D-302FF | 7 | PTP-102 | 5.0 | PTP-302FF | 7.0 | PTP-201 | 3.0 |
| | D-402FF | 6 | PTP-201 | 5.0 | PTP-502FF | 7.0 | PCH-301 | 3.0 |
| | D-502FF | 7 | CPTP-302 | 4.0 | CPTP-302 | 5.0 | CPTP-301 | 5.0 |
| | PTP-302FF | 6 | CPTP-303 | 3.0 | CP-33 | 4.0 | CPTP-302 | 5.0 |
| | CPTP-302FF | 4 | CP-33 | 4.0 | CP-35 | 5.0 | CPTP-303 | 4.0 |
| | CPTP-301 | 6 | CP-35 | 4.0 | ECCP-31 | 6.0 | ECCP-31 | 7.0 |
| | CPTP-302 | 5 | ECCP-31 | 4.0 | ECCP-33 | 6.0 | ECCP-33 | 7.0 |
| | CPTP-303 | 7 | ECCP-33 | 4.0 | ECCP-35 | 6.0 | ECCP-35 | 7.0 |
| | ECCP-31 | 6 | ECCP-35 | 4.0 | ECCP-3 | 4.0 | ECCP-3F | 7.0 |
| | ECCP-33 | 4 | ECCP-3 | 4.0 | ECCP-3F | 4.0 | ECCP-5F | 7.0 |
| | | | ECCP-3F | 4.0 | ECCP-5F | 4.0 | | |
| | | | ECCP-5F | 4.0 | | | | |

| Examples | 155 | 156 | 157 | 158 | 159 |
|---|---|---|---|---|---|
| S → N [° C.] | | <−30 | <−30 | <−40 | — |
| Clearing point [° C.] | | +74 | +118 | +90 | +85 |
| Viscosity [mm²s⁻¹] 20° C. | | 23 | 31 | 20 | 22.2 |
| Δn (20° C., 589 nm) | | +0.1105 | +0.1184 | +0.1564 | +0.1021 |
| $V_{(10,0,20)}$ | | 1.15 | 2.22 | 2.06 | 1.54(1st) |
| $V_{(50,0,20)}$ | | 1.51 | 2.51 | 2.34 | 1.88 |
| $V_{(90,0,20)}$ | | 2.00 | 2.97 | 2.80 | 2.32 |
| Composition [%]: | PCH-3 | 20.00 PCH-3 | 18.00 PCH-3 | 22.00 PDX-3 | 11.00 |
| | PCH-4 | 12.00 PDX-3 | 8.00 PCH-4 | 23.00 PDX-4 | 10.00 |
| | ME2N.F | 3.00 PDX-4 | 8.00 PCH-302 | 6.00 PDX-5 | 6.00 |
| | ME3N.F | 4.00 PDX-5 | 8.00 PTP-102 | 5.00 PCH-3 | 12.00 |
| | ME4N.F | 11.00 CCH-301 | 10.00 PTP-201 | 5.00 PCH-4 | 8.00 |
| | PCH-301 | 6.00 ECCP-31 | 4.00 CPTP-301 | 5.00 CCH-303 | 11.00 |
| | CCH-301 | 4.00 ECCP-32 | 4.00 CPTP-303 | 3.00 ECCP-31 | 5.00 |
| | ECCP-31 | 5.00 CH-33 | 3.00 ECCP-31 | 6.00 ECCP-32 | 5.00 |
| | ECCP-32 | 6.00 CH-35 | 4.00 ECCP-33 | 6.00 ECCP-33 | 5.00 |
| | ECCP-33 | 7.00 CP-43 | 3.00 ECCP-3 | 10.00 ECCP-3 | 6.00 |
| | ECCP-35 | 7.00 CBC-33 | 5.00 BCH-52 | 9.00 ECCP-3F | 7.00 |
| | CP-3F | 8.00 CBC-53 | 6.00 | CP-3F | 7.00 |
| | CP-5F | 7.00 CBC-53F | 5.00 | CP-5F | 7.00 |
| | | CBC-55F | 5.00 | | |
| | | ECCP-3 | 9.00 | | |

| Examples | 160 | 161 | 162 | 163 | 164 |
|---|---|---|---|---|---|
| S → N [° C.] | <−40 | — | — | — | — |
| Clearing point [° C.] | +90 | 95.0 | +87 | +87 | +86 |
| Viscosity [mm²s⁻¹] 20° C. | 20 | — | — | — | — |
| Δn (20° C., 589 nm) | +0.1509 | — | +0.1073 | +0.1075 | +0.1070 |
| $V_{(10,0,20)}$ | 2.14 | — | 1.39(1st) | 1.41(1st) | 1.40(1st) |
| $V_{(50,0,20)}$ | 2.45 | — | 1.79 | 1.78 | 1.75 |
| $V_{(90,0,20)}$ | 2.93 | — | 2.33 | 2.27 | 2.21 |
| Composition [%]: | PCH-3 | 22.00 PDX-2 | 7.00 PDX-2 | 6.00 PCH-2 | 7.00 PCH-2 | 5.00 |
| | PCH-4 | 20.00 PDX-3 | 10.50 PDX-3 | 11.00 PCH-3 | 15.00 PCH-3 | 20.00 |
| | PCH-5 | 5.00 PCH-3 | 9.30 PDX-4 | 10.00 PCH-4 | 12.00 PCH-4 | 10.00 |
| | CCH-301 | 7.00 PCH-4 | 5.80 PCH-3 | 12.00 ME2N.F | 2.00 ME2N.F | 2.00 |
| | PTP-102 | 4.00 ME2N.F | 2.30 PCH-4 | 8.00 ME3N.F | 3.00 ME3N.F | 3.00 |
| | PTP-201 | 5.00 ME3N.F | 3.50 PCH-302 | 7.00 ME5N.F | 6.00 ME5N.F | 6.00 |
| | CPTP-301 | 5.00 CCH-303 | 9.30 ECCP-31 | 5.00 CCH-303 | 10.00 CCH-303 | 11.00 |
| | CPTP-302 | 5.00 ECCP-31 | 7.00 ECCP-32 | 5.00 ECCP-31 | 6.00 ECCP-31 | 6.00 |
| | CPTP-303 | 6.00 ECCP-32 | 7.00 ECCP-33 | 5.00 ECCP-32 | 6.00 ECCP-32 | 6.00 |
| | ECCP-31 | 6.00 ECCP-33 | 7.00 ECCP-35 | 4.00 ECCP-33 | 6.00 ECCP-33 | 5.00 |
| | ECCP-33 | 7.00 ECCP-3 | 7.00 ECCP-3 | 6.00 ECCP-3 | 6.00 ECCP-3 | 6.00 |
| | ECCP-35 | 8.00 ECCP-3F | 8.10 ECCP-3F | 7.00 ECCP-3F | 7.00 ECCP-3F | 7.00 |
| | | CP-3F | 8.10 CP-3F | 7.00 CP-3F | 7.00 CP-3F | 7.00 |
| | | CP-5F | 8.10 CP-5F | 7.00 CP-5F | 7.00 CP-5F | 7.00 |

| Examples | 165 | 166 | 167 | 168 | 169 |
|---|---|---|---|---|---|
| S → N [° C.] | <−20 | <−40 | <−30 | <−20 | <−40 |
| Clearing point [° C.] | +129 | +92 | +96 | 83 | +83 |
| Viscosity [mm²s⁻¹] 20° C. | 34 | 22 | 22 | 20 | 20 |
| Δn (20° C., 589 nm) | +0.1381 | +0.1046 | +0.1229 | 0.0987 | +0.1073 |
| $V_{(10,0,20)}$ | 2.04 | 1.63(1st) | 2.32 | 2.20 | 1.53(1st) |
| $V_{(50,0,20)}$ | 2.33 | 2.02 | 2.64 | 2.50 | 1.93 |
| $V_{(90,0,20)}$ | 2.84 | 2.55 | 3.15 | 3.08 | 2.44 |
| Composition [%]: | PCH-3 | 18.00 PCH-3 | 20.00 PCH-2 | 8.00 PCH-3 | 17.00 PCH-3 | 17.00 |
| | ME2N.F | 2.00 PCH-4 | 18.00 PCH-3 | 17.00 PDX-3 | 8.00 PCH-4 | 16.00 |
| | ME3N.F | 3.00 ME2N.F | 2.00 PCH-5 | 10.00 PDX-4 | 7.00 PCH-5 | 17.00 |
| | ME5N.F | 6.00 ME3N.F | 3.00 G9 | 8.00 D-301 | 11.00 CCH-303 | 11.00 |

-continued

|  |  |  |  |  |  |  |  |  |  |
|---|---:|---|---:|---|---:|---|---:|---|---:|
| ME7N.F | 6.00 | CCH-303 | 12.00 | ME2N.F | 2.00 | D-401 | 11.00 | CP-3F | 7.00 |
| HP-3N.F | 6.00 | ECCP-31 | 5.00 | PCH-302 | 8.00 | D-501 | 11.00 | CP-5F | 7.00 |
| PCH-302 | 6.00 | ECCP-32 | 5.00 | CPTP-301 | 4.00 | CP-33 | 6.00 | ECCP-3F | 8.00 |
| CCH-303 | 5.00 | ECCP-33 | 5.00 | ECCP-3F | 8.00 | CP-35 | 6.00 | ECCP-5F | 8.00 |
| ECCP-31 | 4.00 | ECCP-3 | 7.00 | ECCP-31 | 8.00 | ECCP-31 | 5.00 | BCH-32 | 9.00 |
| ECCP-32 | 4.00 | ECCP-3F | 7.00 | ECCP-32 | 8.00 | ECCP-32 | 6.00 |  |  |
| ECCP-3F | 10.00 | CP-3F | 8.00 | ECCP-33 | 9.00 | ECCP-33 | 6.00 |  |  |
| CBC-33 | 4.00 | CP-5F | 8.00 | CBC-33F | 5.00 | ECCP-35 | 6.00 |  |  |
| CBC-53 | 4.00 |  |  | CBC-53F | 5.00 |  |  |  |  |
| CBC-55 | 4.00 |  |  |  |  |  |  |  |  |
| CBC-33F | 6.00 |  |  |  |  |  |  |  |  |
| CBC-53F | 6.00 |  |  |  |  |  |  |  |  |
| CBC-55F | 6.00 |  |  |  |  |  |  |  |  |

| Examples |  | 170 |  | 171 |  | 172 |  | 173 |  | 174 |
|---|---|---:|---|---:|---|---:|---|---:|---|---:|
| S → N [° C.] |  | — |  | <−30 |  | — |  | <−40 |  | <−40 |
| Clearing point [° C.] |  | +86 |  | +90 |  | 89.0 |  | +85 |  | +85 |
| Viscosity [mm²s⁻¹] 20° C. |  | 21.5 |  | 22 |  | 19.0 |  | 20 |  | 21 |
| Δn (20° C., 589 nm) |  | +0.1069 |  | +0.1548 |  | +0.1557 |  | +0.1570 |  | +0.1399 |
| $V_{(10,0,20)}$ |  | 1.40(1st) |  | 1.96 |  | 2.1 |  | 1.97 |  | 1.95(2nd) |
| $V_{(50,0,20)}$ |  | 1.80 |  | 2.25 |  | 2.4 |  | 2.26 |  | 2.20 |
| $V_{(90,0,20)}$ |  | 2.34 |  | 2.70 |  | 2.9 |  | 2.73 |  | 2.58 |
| Composition [%]: | PDX-2 | 5.00 | PCH-3 | 20.00 | PCH-3 | 22.00 | PCH-2 | 8.00 | PCH-2 | 9.00 |
|  | PCH-3 | 20.00 | PCH-4 | 16.00 | PCH-4 | 20.00 | PCH-3 | 17.00 | PCH-3 | 18.00 |
|  | PCH-4 | 10.00 | ME3N.F | 4.00 | PCH-5 | 3.00 | K6 | 6.00 | PCH-4 | 15.00 |
|  | ME2N.F | 2.00 | ME5N.F | 5.00 | PCH-301 | 7.00 | K9 | 6.00 | PCH-5 | 20.00 |
|  | ME3N.F | 2.00 | CCH-301 | 8.00 | PTP-102 | 5.00 | G9 | 6.00 | BCH-32 | 12.00 |
|  | ME5N.F | 6.00 | PTP-102 | 4.00 | PTP-201 | 5.00 | ME2N.F | 2.00 | BCH-52 | 10.00 |
|  | CCH-303 | 11.00 | PTP-201 | 4.00 | CPTP-301 | 6.00 | ME3N.F | 2.00 | ECCP-31 | 5.00 |
|  | ECCP-31 | 6.00 | CPTP-301 | 6.00 | CPTP-302 | 5.00 | PCH-302 | 6.00 | ECCP-32 | 5.00 |
|  | ECCP-32 | 6.00 | CPTP-302 | 5.00 | ECCP-31 | 5.00 | PTP-35 | 5.00 | CPTP-302 | 6.00 |
|  | ECCP-33 | 5.00 | CPTP-303 | 6.00 | ECCP-33 | 6.00 | PTP-102 | 5.00 |  |  |
|  | ECCP-3 | 6.00 | ECCP-31 | 7.00 | ECCP-35 | 6.00 | CPTP-301 | 4.00 |  |  |
|  | ECCP-3F | 7.00 | ECCP-33 | 7.00 | BCH-32 | 10.00 | ECCP-31 | 8.00 |  |  |
|  | CP-3F | 7.00 | ECCP-35 | 8.00 |  |  | ECCP-32 | 8.00 |  |  |
|  | CP-5F | 7.00 |  |  |  |  | ECCP-33 | 7.00 |  |  |
|  |  |  |  |  |  |  | CBC-33F | 5.00 |  |  |
|  |  |  |  |  |  |  | CBC-53F | 5.00 |  |  |

| Examples |  | 175 |  | 176 |  | 177 |  | 178 |  | 179 |
|---|---|---:|---|---:|---|---:|---|---:|---|---:|
| S → N [° C.] |  | — |  | — |  | — |  | <−30 |  | <−30 |
| Clearing point [° C.] |  | 90.0 |  | +85 |  | +88 |  | +85 |  | +86 |
| Viscosity [mm²s⁻¹] 20° C. |  | — |  | 22.4 |  | — |  | 24 |  | 24 |
| Δn (20° C., 589 nm) |  | — |  | +0.1082 |  | +0.1094 |  | +0.1073 |  | +0.1082 |
| $V_{(10,0,20)}$ |  | — |  | 1.42(1st) |  | 1.43(1st) |  | 1.47(1st) |  | 1.44(1st) |
| $V_{(50,0,20)}$ |  | — |  | 1.80 |  | 1.83 |  | 1.87 |  | 1.82 |
| $V_{(90,0,20)}$ |  | — |  | 2.30 |  | 2.35 |  | 2.42 |  | 2.30 |
| Composition [%]: | PDX-2 | 6.30 | PDX-3 | 11.00 | PDX-2 | 5.00 | PDX-3 | 11.00 | PCH-3 | 19.00 |
|  | PDX-3 | 9.50 | PDX-5 | 10.00 | PCH-3 | 20.00 | PDX-5 | 9.00 | PCH-4 | 9.00 |
|  | PCH-3 | 16.80 | PCH-3 | 21.00 | PCH-4 | 10.00 | PCH-3 | 20.00 | PCH-5 | 7.00 |
|  | PCH-4 | 11.60 | PCH-4 | 12.00 | ME2N.F | 2.00 | PCH-4 | 13.00 | ME2N.F | 2.00 |
|  | CCH-303 | 8.40 | CCH-303 | 5.00 | ME3N.F | 3.00 | CCH-303 | 6.00 | ME3N.F | 3.00 |
|  | ECCP-31 | 6.30 | ECCP-31 | 4.00 | ME5N.F | 6.00 | ECCP-31 | 3.00 | ME5N.F | 6.00 |
|  | ECCP-32 | 6.30 | ECCP-32 | 3.00 | CCH-303 | 8.00 | ECCP-32 | 5.00 | CCH-303 | 13.00 |
|  | ECCP-33 | 6.30 | ECCP-33 | 4.00 | ECCP-31 | 6.00 | ECCP-33 | 3.00 | ECCP-31 | 4.00 |
|  | ECCP-3 | 6.30 | ECCP-35 | 4.00 | ECCP-32 | 6.00 | ECCP-35 | 4.00 | ECCP-32 | 5.00 |
|  | ECCP-3F | 7.40 | ECCP-3 | 5.00 | ECCP-33 | 6.00 | ECCP-3 | 5.00 | ECCP-33 | 4.00 |
|  | CP-3F | 7.40 | ECCP-3F | 7.00 | ECCP-3 | 6.00 | ECCP-3F | 6.00 | ECCP-3 | 8.00 |
|  | CP-5F | 7.40 | CP-3F | 7.00 | ECCP-3F | 8.00 | CP-3F | 8.00 | ECCP-3F | 6.00 |
|  |  |  | CP-5F | 7.00 | CP-3F | 7.00 | CP-5F | 7.00 | CP-3F | 7.00 |
|  |  |  |  |  | CP-5F | 7.00 |  |  | CP-5F | 7.00 |

| Examples |  | 180 |  | 181 |  | 182 |  | 183 |  | 184 |
|---|---|---:|---|---:|---|---:|---|---:|---|---:|
| S → N [° C.] |  | <−40 |  | <0 |  | — |  | <−20 |  | <−30 |
| Clearing point [° C.] |  | +80 |  | +80 |  | 94.0 calc. |  | +112 |  | +75 |
| Viscosity [mm²s⁻¹] 20° C. |  | 21 |  | 20 |  | 19.3 |  | 26 |  | 21 |
| Δn (20° C., 589 nm) |  | +0.1416 |  | 0.0980 |  | +0.156 |  | +0.1488 |  | +0.1125 |
| $V_{(10,0,20)}$ |  | 1.83 |  | 2.20 |  | — |  | 1.95 |  | 1.35 |
| $V_{(50,0,20)}$ |  | 2.07 |  | 2.50 |  | — |  | 2.26 |  | 1.70 |
| $V_{(90,0,20)}$ |  | 2.50 |  | 3.05 |  | — |  | 2.74 |  | 2.19 |
| Composition [%]: | PCH-2 | 9.00 | PCH-3 | 17.00 | PCH-3 | 20.00 | ME2N.F | 2.00 | PCH-3 | 20.00 |
|  | PCH-3 | 18.00 | PDX-3 | 8.00 | PCH-4 | 10.00 | ME3N.F | 3.00 | PCH-5 | 12.00 |
|  | PCH-4 | 12.00 | PDX-4 | 7.00 | G9 | 15.00 | ME4N.F | 6.00 | ME2N.F | 3.00 |
|  | PCH-5 | 14.00 | PCH-301 | 3.00 | PTP-35 | 6.00 | ME5N.F | 6.00 | ME3N.F | 4.00 |
|  | BCH-32 | 10.00 | D-301 | 10.00 | PTP-102 | 2.00 | HP-3N.F | 4.00 | ME4N.F | 9.00 |
|  | BCH-52 | 10.00 | D-401 | 10.00 | PTP-201 | 4.00 | PCH-301 | 19.00 | PCH-301 | 11.00 |

-continued

|  |  |  |  |  |  |  |  |  |  |
|---|---|---|---|---|---|---|---|---|---|
|  | BCH-52F | 9.00 | D-501 | 10.00 | CPTP-301 | 4.00 | ECCP-31 | 4.00 | ECCP-31 | 6.00 |
|  | ECCP-3F | 6.00 | CP-33 | 6.00 | CPTP-303 | 4.00 | ECCP-32 | 6.00 | ECCP-32 | 6.00 |
|  | ECCP-5F | 5.00 | ECCP-31 | 8.00 | ECCP-31 | 7.00 | ECCP-33 | 6.00 | ECCP-33 | 7.00 |
|  | PTP-102 | 7.00 | ECCP-32 | 7.00 | ECCP-33 | 7.00 | ECCP-35 | 6.00 | ECCP-35 | 7.00 |
|  |  |  | ECCP-33 | 7.00 | ECCP-35 | 8.00 | CP-3F | 9.00 | ECCP-3F | 9.00 |
|  |  |  | ECCP-35 | 7.00 | BCH-32 | 6.00 | CP-5F | 8.00 | CP-3F | 6.00 |
|  |  |  |  |  | BCH-52 | 7.00 | PTP-201 | 5.00 |  |  |
|  |  |  |  |  |  |  | CPTP-301 | 5.00 |  |  |
|  |  |  |  |  |  |  | CPTP-302 | 5.00 |  |  |
|  |  |  |  |  |  |  | CPTP-303 | 6.00 |  |  |

| Examples |  | 185 | 186 | 187 | 188 | 189 |
|---|---|---|---|---|---|---|
| S → N [° C.] |  | <0 | <−40 | <20 | — | — |
| Clearing point [° C.] |  | +113 | +88 | +101 | +78 | 79.0 |
| Viscosity [mm²s⁻¹] 20° C. |  | 26 | 22 | Sm | — | 26 |
| Δn (20° C., 589 nm) |  | +0.1484 | +0.1210 | +0.126 | 0.1047 | +0.1637 |
| $V_{(10,0,20)}$ |  | 2.06 | 2.05 | — | 2.04 | — |
| $V_{(50,0,20)}$ |  | 2.36 | 2.32 | — | 2.31 | — |
| $V_{(90,0,20)}$ |  | 2.86 | 2.78 | — | 2.81 | — |
| Composition [%]: | ME2N.F | 2.00 PCH-3 | 16.00 ME2N.F | 2.00 PCH-3 | 17.00 PCH-3 | 13.00 |
|  | ME3N.F | 3.00 PCH-4 | 16.00 ME3N.F | 3.00 PDX-3 | 8.00 PYP-3N.F | 4.00 |
|  | ME4N.F | 6.00 PCH-5 | 15.00 ME5N.F | 7.00 PDX-4 | 7.00 PYP-5N.F | 4.00 |
|  | ME5N.F | 6.00 PCH-7 | 10.00 ME7N.F | 6.00 PCH-301 | 3.00 PYP-7N.F | 4.00 |
|  | HP-3N.F | 4.00 BCH-32 | 8.00 CCH-303 | 19.00 D-301 | 12.00 PYP-32 | 8.00 |
|  | PCH-301 | 18.00 BCH-52 | 7.00 D-302FF | 7.00 D-401 | 12.00 PYP-33 | 8.00 |
|  | ECCP-31 | 5.00 ECCP-31 | 6.00 D-402FF | 7.00 D-501 | 12.00 PYP-53 | 8.00 |
|  | ECCP-32 | 6.00 ECCP-32 | 6.00 ECCP-31 | 9.00 BCH-52 | 4.00 PYP-72 | 8.00 |
|  | ECCP-33 | 6.00 ECCP-33 | 6.00 ECCP-32 | 8.00 ECCP-31 | 6.00 ECCP-31 | 8.00 |
|  | ECCP-35 | 6.00 ECCP-3F | 10.00 ECCP-33 | 8.00 ECCP-32 | 5.00 ECCP-32 | 7.00 |
|  | CP-3F | 9.00 |  | ECCP-35 | 8.00 ECCP-33 | 5.00 ECCP-33 | 7.00 |
|  | CP-5F | 8.00 |  | CPTP-302FF | 8.00 ECCP-3 | 9.00 ECCP-35 | 7.00 |
|  | PTP-201 | 5.00 |  | CPTP-502FF | 8.00 |  | CPTP-301 | 5.00 |
|  | CPTP-302FF | 5.00 |  |  |  |  | CPTP-302 | 4.00 |
|  | CPTP-302 | 5.00 |  |  |  |  | CPTP-303 | 5.00 |
|  | CPTP-303 | 6.00 |  |  |  |  |  |  |

| Examples |  | 190 | 191 | 192 | 193 | 194 |
|---|---|---|---|---|---|---|
| S → N [° C.] |  | <−30 | <0 | <−40 | <−30 | <−40 |
| Clearing point [° C.] |  | +93 | +88 | +80 | +84 | +85 |
| Viscosity [mm²s⁻¹] 20° C. |  | 23 | 21 | 20 | 23 | 22 |
| Δn (20° C., 589 nm) |  | +0.1524 | 0.1046 | +0.1421 | +0.1485 | +0.1181 |
| $V_{(10,0,20)}$ |  | 2.10(2nd) | 2.24 | 1.98 | 1.98 | 2.04 |
| $V_{(50,0,20)}$ |  | 2.42 | 2.54 | 2.25 | 2.25 | 2.33 |
| $V_{(90,0,20)}$ |  | 2.93 | 3.08 | 2.75 | 2.71 | 2.83 |
| Composition [%]: | PCH-2 | 7.00 PCH-3 | 17.00 PCH-2 | 7.00 PCH-2 | 7.00 PCH-3 | 15.00 |
|  | PCH-3 | 16.00 PDX-3 | 8.00 PCH-3 | 18.00 PCH-3 | 16.00 PCH-4 | 15.00 |
|  | PCH-4 | 10.00 PDX-4 | 7.00 PCH-4 | 14.00 PCH-4 | 10.00 PCH-5 | 14.00 |
|  | PCH-5 | 12.00 D-301 | 10.00 PCH-5 | 14.00 PCH-5 | 12.00 PCH-7 | 8.00 |
|  | BCH-5 | 8.00 D-401 | 10.00 BCH-32 | 10.00 BCH-5 | 8.00 I32 | 9.00 |
|  | BCH-32 | 10.00 D-501 | 10.00 BCH-52 | 9.00 BCH-52F | 9.00 BCH-52F | 9.00 |
|  | BCH-52 | 9.00 CP-33 | 6.00 I32 | 10.00 I32 | 10.00 ECCP-31 | 5.00 |
|  | I32 | 10.00 CP-35 | 6.00 ECCP-3F | 5.00 I35 | 10.00 ECCP-32 | 5.00 |
|  | ECCP-3F | 6.00 ECCP-31 | 5.00 ECCP-5F | 5.00 ECCP-3F | 6.00 ECCP-33 | 5.00 |
|  | ECCP-5F | 5.00 ECCP-32 | 6.00 PTP-102 | 7.00 ECCP-5F | 5.00 ECCP-3F | 8.00 |
|  | PTP-102 | 7.00 ECCP-33 | 6.00 |  | PTP-102 | 7.00 ECCP-5F | 7.00 |
|  |  | ECCP-35 | 6.00 |  |  |  |  |
|  |  | CPTP-301 | 3.00 |  |  |  |  |

| Examples |  | 195 | 196 | 197 | 198 | 199 |
|---|---|---|---|---|---|---|
| S → N [° C.] |  |  | <0 | <20 | <−20 | <−30 |
| Clearing point [° C.] |  |  | +113 | +110 | +75 | +76 |
| Viscosity [mm²s⁻¹] 20° C. |  |  | 25 | 24 | 25 | 21 |
| Δn (20° C., 589 nm) |  |  | +0.1523 | +0.1518 | +0.1069 | 0.1144 |
| $V_{(10,0,20)}$ |  |  | 2.24 | 2.09 | 1.20 | 2.04 |
| $V_{(50,0,20)}$ |  |  | 2.55 | 2.39 | 1.53 | 2.34 |
| $V_{(90,0,20)}$ |  |  | 3.05 | 2.84 | 1.96 | 2.86 |
| Composition [%]: |  |  | ME2N.F | 2.00 ME2N.F | 2.00 ME2N.F | 3.00 PCH-3 | 17.00 |
|  |  |  | ME3N.F | 3.00 ME3N.F | 3.00 ME3N.F | 4.00 PDX-3 | 8.00 |
|  |  |  | PYP-5N.F | 8.00 ME4N.F | 6.00 ME5N.F | 9.00 PDX-4 | 7.00 |
|  |  |  | PYP-6N.F | 8.00 ME5N.F | 6.00 ME7N.F | 4.00 PCH-301 | 3.00 |
|  |  |  | HP-3N.F | 3.00 HP-3N.F | 4.00 HP-3N.F | 6.00 D-301 | 13.00 |
|  |  |  | PCH-301 | 10.00 PCH-301 | 15.00 HP-4N.F | 6.00 D-401 | 13.00 |
|  |  |  | PCH-302 | 5.00 PTP-35 | 8.00 PCH-301 | 17.00 D-501 | 13.00 |
|  |  |  | CCH-303 | 7.00 ECCP-31 | 6.00 CCH-303 | 14.00 ECCP-31 | 5.00 |
|  |  |  | ECCP-31 | 7.00 ECCP-32 | 6.00 D-302FF | 10.00 ECCP-32 | 4.00 |
|  |  |  | ECCP-32 | 7.00 ECCP-33 | 6.00 ECCP-31 | 6.00 ECCP-33 | 4.00 |

-continued

|  |  |  |  |  |  |  |  |  |
|---|---|---|---|---|---|---|---|---|
| ECCP-33 | 8.00 | ECCP-35 | 6.00 | ECCP-32 | 7.00 | ECCP-35 | 4.00 |  |
| ECCP-35 | 8.00 | ECCP-3F | 7.00 | ECCP-33 | 7.00 | CPTP-301 | 5.00 |  |
| CPTP-301 | 6.00 | CP-3F | 9.00 | ECCP-35 | 7.00 | CPTP-302 | 4.00 |  |
| CPTP-302 | 5.00 | CPTP-301 | 5.00 |  |  |  |  |  |
| CPTP-303 | 7.00 | CPTP-302 | 5.00 |  |  |  |  |  |
| CBC-33F | 4.00 | CPTP-303 | 6.00 |  |  |  |  |  |
| CBC-53F | 2.00 |  |  |  |  |  |  |  |

| Examples | 200 | 201 | 202 | 203 | 204 |
|---|---|---|---|---|---|
| S → N [° C.] | <0 | <−20 | <−40 | <−40 | <−30 |
| Clearing point [° C.] | 78 | 82 | +92 | +85 | +87 |
| Viscosity [mm²s⁻¹] 20° C. | 19 | 21 | 22 | 20 | 23 |
| Δn (20° C., 589 nm) | +0.1616 | +0.1609 | +0.1046 | +0.1272 | +0.1090 |
| $V_{(10,0,20)}$ | 2.15 | 2.06 | 1.63(1st) | 2.03 | 1.59(1st) |
| $V_{(50,0,20)}$ | 2.44 | 2.33 | 2.02 | 2.29 | 1.98 |
| $V_{(90,0,20)}$ | 2.87 | 2.71 | 2.55 | 2.75 | 2.57 |
| Composition [%]: | K6 8.00 | PYP-3N.F 4.00 | PCH-3 20.00 | PCH-3 15.00 | ME2N.F 2.00 |
|  | K9 10.00 | PYP-5N.F 4.00 | PCH-4 18.00 | PCH-3 15.00 | PCH-3 18.00 |
|  | K12 6.00 | PYP-6N.F 4.00 | ME2N.F 2.00 | PCH-4 14.00 | PCH-4 16.00 |
|  | K15 10.00 | PYP-7N.F 5.00 | ME3N.F 3.00 | K15 8.00 | PCH-5 18.00 |
|  | PCH-301 8.00 | PYP-32 5.00 | CCH-303 12.00 | CCH-303 5.00 | CCH-303 7.00 |
|  | ECCP-31 8.00 | PYP-33 5.00 | ECCP-31 5.00 | BCH-32 9.00 | CP-302FF 7.00 |
|  | ECCP-32 8.00 | PTP-34 4.00 | ECCP-32 5.00 | BCH-52 9.00 | ECCP-31 4.00 |
|  | ECCP-33 8.00 | PTP-35 4.00 | ECCP-33 5.00 | ECCP-31 5.00 | ECCP-33 4.00 |
|  | ECCP-35 8.00 | PTP-45 4.00 | ECCP-3 7.00 | ECCP-32 5.00 | ECCP-3F 8.00 |
|  | ECCP-3 10.00 | PCH-301 10.00 | ECCP-3F 7.00 | ECCP-33 5.00 | ECCP-5F 8.00 |
|  | PYP-32 5.00 | ECCP-31 7.00 | CP-3F 8.00 | ECCP-3F 10.00 | ECCP-3 8.00 |
|  | PYP-33 5.00 | ECCP-32 8.00 | CP-5F 8.00 |  |  |
|  | PTP-35 6.00 | ECCP-33 8.00 |  |  |  |
|  |  | ECCP-35 8.00 |  |  |  |
|  |  | ECCP-3 10.00 |  |  |  |
|  |  | PTP-201 5.00 |  |  |  |
|  |  | CPTP-301 5.00 |  |  |  |

| Examples | 205 | 206 | 207 | 208 | 209 |
|---|---|---|---|---|---|
| S → N [° C.] | <−40 | — | <−40 | <−40 | — |
| Clearing point [° C.] | +83 | +90 | +88 | +82 | +82 |
| Viscosity [mm²s⁻¹] 20° C. | 20 | 21 | 21 | 21 | 20.1 |
| Δn (20° C., 589 nm) | +0.1561 | +0.1168 | +0.1468 | +0.1003 | +0.1241 |
| $V_{(10,0,20)}$ | 1.94 | 2.18 | 1.98 | 1.88 | 1.85 |
| $V_{(50,0,20)}$ | 2.23 | 2.49 | 2.23 | 2.12 | 2.12 |
| $V_{(90,0,20)}$ | 2.69 | 2.99 | 2.70 | 2.55 | 2.56 |
| Composition [%]: | PCH-2 8.00 | PCH-3 20.00 | PCH-2 9.00 | PCH-3 11.00 | PCH-2 17.00 |
|  | PCH-3 17.00 | PCH-4 16.00 | PCH-3 16.00 | ME2N.F 2.00 | PCH-3 15.00 |
|  | K6 6.00 | PCH-5 15.00 | PCH-4 11.00 | ME3N.F 3.00 | PYP-3N.F 5.00 |
|  | K9 6.00 | PTP-201 4.00 | PCH-5 12.00 | ME5N.F 7.00 | PYP-5N.F 5.00 |
|  | G9 6.00 | ECCP-31 7.00 | BCH-5 8.00 | ME7N.F 7.00 | PCH-304 10.00 |
|  | ME2N.F 2.00 | ECCP-32 7.00 | BCH-32 8.00 | PCH-301 10.00 | PCH-501 12.00 |
|  | ME3N.F 2.00 | ECCP-33 7.00 | BCH-52 8.00 | CCH-301 9.00 | ECCP-31 6.00 |
|  | PCH-302 6.00 | ECCP-35 7.00 | ECCP-3F 6.00 | CCH-303 9.00 | ECCP-32 6.00 |
|  | PTP-35 5.00 | ECCP-3F 7.00 | ECCP-5F 6.00 | ECCP-31 6.00 | ECCP-33 6.00 |
|  | PTP-102 5.00 | CP-3F 8.00 | ECCP-33 6.00 | ECCP-32 6.00 | CBC-33 5.00 |
|  | CPTP-302FF 4.00 | CPTP-301 2.00 | PTP-35 6.00 | ECCP-33 6.00 | CBC-53 5.00 |
|  | ECCP-31 8.00 |  | PTP-102 4.00 | ECCP-35 6.00 | CBC-33F 4.00 |
|  | ECCP-32 8.00 |  |  | CP-33F 6.00 | CBC-55F 4.00 |
|  | ECCP-33 7.00 |  |  | CP-35F 6.00 |  |
|  | CBC-33F 5.00 |  |  | CP-55F 5.00 |  |
|  | CBC-53F 5.00 |  |  | CBC-53F 3.00 |  |

| Examples | 210 | 211 | 212 | 213 | 214 |
|---|---|---|---|---|---|
| S → N [° C.] | <−30 | <−30 | — | <−40 | <−40 |
| Clearing point [° C.] | +86 | +84 | +93 | +88 | +91 |
| Viscosity [mm²s⁻¹] 20° C. | 24 | 24 | 18 | 19 | 19 |
| Δn (20° C., 589 nm) | +0.1073 | +0.1088 | +0.0901 | 0.0903 | +0.0945 |
| $V_{(10,0,20)}$ | 1.48(1st) | 1.46(1st) | 2.04 | 19 | 2.00 |
| $V_{(50,0,20)}$ | 1.86 | 1.88 | 2.50 | 2.54 | 2.46 |
| $V_{(90,0,20)}$ | 2.40 | 2.44 | 3.11 | 3.20 | 3.07 |
| Composition [%]: | PDX-2 6.00 | ME2N.F 2.00 | PCH-3 9 | PCH-3 10.00 | PCH-3 12.00 |
|  | PDX-3 9.00 | PCH-3 18.00 | PCH-4 12 | PCH-4 10.00 | PCH-4 11.00 |
|  | PCH-3 16.00 | PCH-4 16.00 | PCH-5 7 | PCH-5 7.00 | PCH-5 7.00 |
|  | PCH-4 11.00 | PCH-5 18.00 | PCH-302 5 | PCH-302 13.00 | PCH-302 12.00 |
|  | ME2N.F 2.00 | CCH-303 5.00 | CCH-303 17 | OS-33 6.00 | C-33 7.00 |
|  | ME3N.F 3.00 | D-502FF 5.00 | CCH-502 6 | OS-35 6.00 | C-35 7.00 |
|  | CCH-303 8.00 | CP-302FF 7.00 | CP-3F 9 | OS-53 4.00 | CP-3F 8.00 |
|  | ECCP-31 6.00 | ECCP-31 5.00 | CP-3F 9 | CP-3F 8.00 | CP-5F 8.00 |
|  | ECCP-32 6.00 | ECCP-3F 8.00 | ECCP-33 12 | CP-5F 8.00 | ECCP-31 8.00 |

-continued

|  | ECCP-33 | 6.00 | ECCP-5F | 8.00 | ECCP-35 | 11 | ECCP-31 | 7.00 | ECCP-33 | 7.00 |
|---|---|---|---|---|---|---|---|---|---|---|
|  | ECCP-3 | 6.00 | ECCP-3 | 8.00 | CBC-53 | 3 | ECCP-33 | 7.00 | ECCP-35 | 7.00 |
|  | ECCP-3F | 7.00 |  |  |  |  | ECCP-35 | 7.00 | CP-33 | 6.00 |
|  | CP-3F | 7.00 |  |  |  |  | CP-33 | 7.00 |  |  |
|  | CP-5F | 7.00 |  |  |  |  |  |  |  |  |

| Examples |  | 215 |  | 216 |  | 217 |  | 218 |  | 219 |  | 220 |
|---|---|---|---|---|---|---|---|---|---|---|---|---|
| S → N [° C.] |  | <−30 |  | <−40 |  | — |  | — |  | <−30 |  | <−30 |
| Clearing point [° C.] |  | +81 |  | +85 |  | +67 |  | +94 |  | +91 |  | +106 |
| Viscosity [mm²s⁻¹] 20° C. |  | 19 |  | 23 |  | 40 |  | 19 |  | 18 |  | 21 |
| Δn (20° C., 589 nm) |  | +0.0997 |  | +0.1072 |  | +0.1235 |  | +0.0871 |  | +0.0929 |  | 0.0915 |
| $V_{(10,0,20)}$ |  | 1.71(1st) |  | 1.44(1st) |  | 1.14 |  | 2.04 |  | 2.08 |  | 2.08 |
| $V_{(50,0,20)}$ |  | 2.13 |  | 1.79 |  | 1.28 |  | 2.46 |  | 2.55 |  | 2.57 |
| $V_{(90,0,20)}$ |  | 2.72 |  | 2.25 |  | 1.46 |  | 3.14 |  | 3.18 |  | 3.23 |
| Composition [%]: | PCH-3 | 14.60 | PCH-3 | 19.00 | ME2N.F | 4 | PCH-3 | 9 | PCH-3 | 12.00 | PCH-3 | 12.00 |
|  | PCH-4 | 13.80 | PCH-4 | 11.00 | ME3N.F | 6 | PCH-4 | 12 | PCH-4 | 11.00 | PCH-4 | 10.00 |
|  | PCH-5 | 15.60 | PCH-5 | 6.00 | ME5N.F | 10 | PCH-5 | 7 | PCH-5 | 7.00 | PCH-5 | 7.00 |
|  | PCH-302 | 9.60 | ME2N.F | 2.00 | ME7N.F | 10 | PCH-302 | 14 | PCH-302 | 8.00 | CCH-303 | 15.00 |
|  | C-33 | 5.60 | ME3N.F | 4.00 | HP-3N.F | 4 | CCH-502 | 12 | CCH-303 | 14.00 | CP-3F | 7.00 |
|  | C-35 | 5.60 | ME5N.F | 5.00 | HP-4N.F | 8 | CP-3F | 9 | CP-3F | 8.00 | CP-5F | 7.00 |
|  | CP-3F | 6.40 | CCH-303 | 12.00 | HP-5N.F | 4 | CP-5F | 9 | CP-5F | 8.00 | CP-33 | 7.00 |
|  | CP-5F | 6.40 | ECCP-31 | 5.00 | CCH-303 | 9 | ECCP-31 | 9 | ECCP-3F | 8.00 | CP-35 | 6.00 |
|  | ECCP-3F | 5.60 | ECCP-32 | 5.00 | CCH-502 | 9 | ECCP-33 | 10 | ECCP-31 | 8.00 | ECCP-31 | 9.00 |
|  | ECCP-31 | 5.60 | ECCP-33 | 4.00 | PCH-302 | 13 | ECCP-35 | 9 | ECCP-33 | 8.00 | ECCP-3F | 10.00 |
|  | ECCP-33 | 5.60 | ECCP-3 | 5.00 | PYP-707 | 4 |  |  | ECCP-35 | 8.00 | ECCP-5F | 10.00 |
|  | CP-33 | 5.60 | ECCP-3F | 7.00 | PYP-709 | 4 |  |  |  |  |  |  |
|  |  |  | CP-3F | 8.00 | PYP-909 | 3 |  |  |  |  |  |  |
|  |  |  | CP-5F | 7.00 | ECCP-31 | 4 |  |  |  |  |  |  |
|  |  |  |  |  | ECCP-33 | 4 |  |  |  |  |  |  |
|  |  |  |  |  | ECCP-35 | 4 |  |  |  |  |  |  |

| Examples |  | 221 |  | 222 |  | 223 |  | 224 |  | 225 |
|---|---|---|---|---|---|---|---|---|---|---|
| S → N [° C.] |  | <−30 |  | <−30 |  | <−40 |  | <−30 |  | <−40 |
| Clearing point [° C.] |  | +91 |  | +87 |  | +90 |  | +94 |  | +89 |
| Viscosity [mm²s⁻¹] 20° C. |  | 23 |  | 23 |  | 18 |  | 18 |  | 18 |
| Δn (20° C., 589 nm) |  | +0.1081 |  | +0.1090 |  | 0.0923 |  | 0.0914 |  | +0.0916 |
| $V_{(10,0,20)}$ |  | 1.62 |  | 1.59(1st) |  | 2.03 |  | 2.17 |  | 1.98 |
| $V_{(50,0,20)}$ |  | 2.00 |  | 1.98 |  | 2.49 |  | 2.65 |  | 2.45 |
| $V_{(90,0,20)}$ |  | 2.52 |  | 2.57 |  | 3.11 |  | 3.27 |  | 3.11 |
| Composition [%]: | PCH-3 | 20.00 | ME2N.F | 2.00 | PCH-3 | 12.00 | PCH-3 | 10.00 | PCH-3 | 12.00 |
|  | PCH-4 | 10.00 | PCH-3 | 18.00 | PCH-4 | 11.00 | PCH-4 | 9.00 | PCH-4 | 11.00 |
|  | PCH-5 | 10.00 | PCH-4 | 16.00 | PCH-5 | 7.00 | PCH-5 | 7.00 | PCH-5 | 7.00 |
|  | ME2N.F | 3.00 | PCH-5 | 18.00 | PCH-302 | 10.00 | PCH-302 | 10.00 | PCH-302 | 10.00 |
|  | ME3N.F | 4.00 | CCH-303 | 7.00 | CCH-303 | 16.00 | CCH-303 | 16.00 | CCH-303 | 16.00 |
|  | PCH-302 | 7.00 | CP-302FF | 7.00 | CP-3F | 8.00 | CP-3F | 8.00 | CP-3F | 8.00 |
|  | ECCP-31 | 7.00 | ECCP-31 | 4.00 | CP-5F | 8.00 | CP-5F | 8.00 | CP-5F | 8.00 |
|  | ECCP-32 | 7.00 | ECCP-33 | 4.00 | ECCP-31 | 8.00 | ECCP-31 | 8.00 | ECCP-3F | 7.00 |
|  | ECCP-33 | 9.00 | ECCP-3F | 8.00 | ECCP-33 | 7.00 | ECCP-33 | 9.00 | ECCP-31 | 7.00 |
|  | CH-33 | 4.00 | ECCP-5F | 8.00 | ECCP-35 | 7.00 | ECCP-35 | 9.00 | ECCP-33 | 7.00 |
|  | CH-35 | 4.00 | ECCP-3 | 8.00 | CP-33 | 6.00 | CP-33 | 6.00 | CP-33 | 7.00 |
|  | CP-3F | 8.00 |  |  |  |  |  |  |  |  |
|  | CP-5F | 7.00 |  |  |  |  |  |  |  |  |

| Examples |  | 226 |  | 227 |  | 228 |  | 229 |  | 230 |
|---|---|---|---|---|---|---|---|---|---|---|
| S → N [° C.] |  | <−20 |  | <−40 |  | <−40 |  | <−30 |  | <−40 |
| Clearing point [° C.] |  | +87 |  | +90 |  | +91 |  | +87 |  | +91 |
| Viscosity [mm²s⁻¹] 20° C. |  | 27 |  | 18 |  | 19 |  | 23 |  | 19 |
| Δn (20° C., 589 nm) |  | +0.1076 |  | 0.0923 |  | +0.0939 |  | +0.1090 |  | +0.0939 |
| $V_{(10,0,20)}$ |  | 1.54 |  | 2.03 |  | 2.03 |  | 1.59(1st) |  | 2.03 |
| $V_{(50,0,20)}$ |  | 1.87 |  | 2.49 |  | 2.47 |  | 1.98 |  | 2.47 |
| $V_{(90,0,20)}$ |  | 2.37 |  | 3.11 |  | 3.05 |  | 2.57 |  | 3.05 |
| Composition [%]: | PDX-2 | 7.00 | PCH-3 | 12.00 | PCH-3 | 12.00 | ME2N.F | 2.00 | PCH-3 | 12.00 |
|  | PDX-3 | 12.00 | PCH-4 | 11.00 | PCH-4 | 11.00 | PCH-3 | 18.00 | PCH-4 | 11.00 |
|  | PDX-4 | 13.00 | PCH-5 | 7.00 | PCH-5 | 7.00 | PCH-4 | 16.00 | PCH-5 | 7.00 |
|  | PDX-5 | 12.00 | PCH-302 | 10.00 | PCH-302 | 12.00 | PCH-5 | 18.00 | PCH-302 | 12.00 |
|  | PCH-302 | 18.00 | CCH-303 | 16.00 | C-33 | 7.00 | CCH-303 | 7.00 | C-33 | 7.00 |
|  | ECCP-31 | 4.00 | CP-3F | 8.00 | C-35 | 7.00 | CP-302FF | 7.00 | C-35 | 7.00 |
|  | ECCP-32 | 5.00 | CP-5F | 8.00 | CP-3F | 8.00 | ECCP-31 | 4.00 | CP-3F | 8.00 |
|  | ECCP-33 | 5.00 | ECCP-31 | 8.00 | CP-5F | 8.00 | ECCP-33 | 4.00 | CP-5F | 8.00 |
|  | CH-33 | 3.00 | ECCP-33 | 7.00 | ECCP-3F | 7.00 | ECCP-3F | 8.00 | ECCP-3F | 7.00 |
|  | CH-35 | 3.00 | ECCP-35 | 7.00 | ECCP-31 | 7.00 | ECCP-5F | 8.00 | ECCP-31 | 7.00 |
|  | CH-43 | 3.00 | CP-33 | 6.00 | ECCP-33 | 7.00 | ECCP-3 | 8.00 | ECCP-33 | 7.00 |
|  | CH-45 | 3.00 |  |  | CP-33 | 7.00 |  |  | CP-33 | 7.00 |

-continued

|  |  |  |  |  |  |  |  |  |  |
|---|---|---|---|---|---|---|---|---|---|
| | CBC-33F | 4.00 | | | | | | | |
| | CBC-53F | 4.00 | | | | | | | |
| | CBC-55F | 4.00 | | | | | | | |

| Examples | 231 | | 232 | | 233 | | 234 | | 235 | |
|---|---|---|---|---|---|---|---|---|---|---|
| S → N [° C.] | — | | <−40 | | <−40 | | — | | — | |
| Clearing point [° C.] | +68 | | +91 | | +72 | | +84 | | +119 | |
| Viscosity [mm²s⁻¹] 20° C. | 17 | | 23 | | 16 | | 19 | | — | |
| Δn (20° C., 589 nm) | +0.0938 | | +0.1170 | | +0.1134 | | +0.1186 | | +0.1511 | |
| $V_{(10,0,20)}$ | 1.41 | | 1.99 | | 1.83 | | 1.97(2nd) | | 2.22 | |
| $V_{(50,0,20)}$ | 1.79 | | 2.30 | | 2.12 | | 2.25 | | 2.56 | |
| $V_{(90,0,20)}$ | 2.29 | | 2.78 | | 2.56 | | 2.68 | | 3.11 | |
| Composition [%]: | PCH-2 | 8.0 | PCH-3 | 22.0 | K6 | 8.0 | PCH-3 | 15.0 | PCH-3 | 20.00 |
| | PCH-3 | 21.0 | PCH-4 | 23.0 | K9 | 8.0 | PCH-4 | 10.0 | PCH-4 | 13.00 |
| | PCH-4 | 10.0 | PCH-5 | 9.0 | PCH-3 | 20.0 | PCH-5 | 15.0 | PCH-5 | 15.00 |
| | PCH-5F | 12.0 | K6 | 5.0 | PCH-5F | 10.0 | ME2N.F | 2.0 | BCH-5 | 8.00 |
| | PCH-7F | 10.0 | ECCP-31 | 4.0 | PCH-7F | 10.0 | ME3N.F | 3.0 | T15 | 8.00 |
| | ECCP-3F | 8.0 | ECCP-32 | 5.0 | ECCP-3F | 10.0 | PCH-302 | 7.0 | ECCP-3 | 8.00 |
| | ECCP-5F | 7.0 | ECCP-33 | 5.0 | ECCP-5F | 10.0 | CCH-303 | 5.0 | CCH-303 | 10.00 |
| | CP-3F | 9.0 | ECCP-35 | 5.0 | CP-3F | 11.0 | BCH-32 | 9.0 | CBC-33 | 3.00 |
| | CP-5F | 9.0 | CP-3F | 10.0 | CP-5F | 11.0 | BCH-52 | 9.0 | CBC-33F | 5.00 |
| | CBC-33F | 2.0 | CP-5F | 7.0 | CPTP-303 | 2.0 | ECCP-31 | 5.0 | CBC-53F | 5.00 |
| | CBC-53F | 2.0 | CCPC-33 | 5.0 | | | ECCP-32 | 5.0 | CBC-55F | 5.00 |
| | CBC-55F | 2.0 | | | | | ECCP-33 | 5.0 | | |
| | | | | | | | ECCP-3F | 10.0 | | |

| Examples | 236 | | 237 | | 238 | | 239 | | 240 | |
|---|---|---|---|---|---|---|---|---|---|---|
| S → N [° C.] | <−40 | | <−20 | | <−40 | | <−30 | | <−20 | |
| Clearing point [° C.] | +83 | | +126 | | +89 | | +87 | | +117 | |
| Viscosity [mm²s⁻¹] 20° C. | 20 | | 33 | | 22 | | 21 | | 30 | |
| Δn (20° C., 589 nm) | +0.1563 | | +0.1316 | | +0.1493 | | +0.1489 | | +0.1167 | |
| $V_{(10,0,20)}$ | 1.92 | | 2.00 | | 1.92 | | 2.01 | | 2.03 | |
| $V_{(50,0,20)}$ | 2.21 | | 2.30 | | 2.17 | | 2.30 | | 2.32 | |
| $V_{(90,0,20)}$ | 2.67 | | 2.76 | | 2.64 | | 2.77 | | 2.78 | |
| Composition [%]: | PCH-2 | 8.00 | PCH-3 | 18.00 | PCH-2 | 9.00 | PCH-2 | 8.00 | PCH-3 | 14.00 |
| | PCH-3 | 17.00 | ME2N.F | 2.00 | PCH-3 | 16.00 | PCH-3 | 17.00 | ME2N.F | 2.00 |
| | K6 | 6.00 | ME3N.F | 3.00 | PCH-4 | 11.00 | K6 | 6.00 | ME3N.F | 3.00 |
| | K9 | 5.00 | ME5N.F | 6.00 | PCH-5 | 12.00 | K9 | 6.00 | ME5N.F | 7.00 |
| | G9 | 7.00 | ME7N.F | 6.00 | BCH-5 | 8.00 | G9 | 7.00 | ME7N.F | 7.00 |
| | ME2N.F | 2.00 | HP-3N.F | 6.00 | BCH-32 | 8.00 | ME2N.F | 2.00 | CCH-301 | 9.00 |
| | ME3N.F | 3.00 | CCH-302 | 5.00 | BCH-52 | 8.00 | ME3N.F | 3.00 | CCH-303 | 8.00 |
| | PCH-302 | 6.00 | CCH-303 | 6.00 | ECCP-3F | 6.00 | PCH-302 | 6.00 | ECCP-31 | 4.00 |
| | PTP-35 | 5.00 | ECCP-31 | 4.00 | ECCP-5F | 6.00 | PTP-35 | 3.00 | ECCP-32 | 6.00 |
| | PTP-102 | 5.00 | ECCP-32 | 4.00 | ECCP-33 | 6.00 | PTP-102 | 3.00 | ECCP-33 | 4.00 |
| | CPTP-302FF | 4.00 | ECCP-33 | 4.00 | PTP-102 | 4.00 | CPTP-302FF | 4.00 | CH-33 | 4.00 |
| | ECCP-31 | 8.00 | ECCP-3F | 5.00 | PTP-201 | 6.00 | ECCP-31 | 7.00 | CH-35 | 4.00 |
| | ECCP-32 | 7.00 | ECCP-5F | 5.00 | | | ECCP-32 | 7.00 | CH-43 | 4.00 |
| | ECCP-33 | 8.00 | CBC-33 | 4.00 | | | ECCP-33 | 7.00 | CBC-53 | 6.00 |
| | CBC-33 | 5.00 | CBC-53 | 4.00 | | | ECCP-35 | 6.00 | CBC-33F | 6.00 |
| | CBC-53 | 4.00 | CBC-33F | 6.00 | | | CBC-33F | 5.00 | CBC-53F | 6.00 |
| | | | CBC-53F | 6.00 | | | CBC-53F | 5.00 | CBC-55F | 6.00 |
| | | | CBC-55F | 6.00 | | | | | | |

| Examples | 241 | | 242 | | 243 | | 244 | | 245 | |
|---|---|---|---|---|---|---|---|---|---|---|
| S → N [° C.] | — | | <−40 | | <−40 | | — | | — | |
| Clearing point [° C.] | +68 | | +91 | | +72 | | +84 | | +119 | |
| Viscosity [mm²s⁻¹] 20° C. | 17 | | 23 | | 16 | | 19 | | — | |
| Δn (20° C., 589 nm) | +0.0938 | | +0.1170 | | +0.1134 | | +0.1186 | | +0.1511 | |
| $V_{(10,0,20)}$ | 1.41 | | 1.99 | | 1.83 | | 1.97(2nd) | | 2.22 | |
| $V_{(50,0,20)}$ | 1.79 | | 2.30 | | 2.12 | | 2.25 | | 2.56 | |
| $V_{(90,0,20)}$ | 2.29 | | 2.78 | | 2.56 | | 2.68 | | 3.11 | |
| Composition [%]: | PCH-2 | 8.0 | PCH-3 | 22.0 | K6 | 8.0 | PCH-3 | 15.0 | PCH-3 | 20.00 |
| | PCH-3 | 21.0 | PCH-4 | 23.0 | K9 | 8.0 | PCH-4 | 10.0 | PCH-4 | 13.00 |
| | PCH-4 | 10.0 | PCH-5 | 9.0 | PCH-3 | 20.0 | PCH-5 | 15.0 | PCH-5 | 15.00 |
| | PCH-5F | 12.0 | K6 | 5.0 | PCH-5F | 10.0 | ME2N.F | 2.0 | BCH-5 | 8.00 |
| | PCH-7F | 10.0 | ECCP-31 | 4.0 | PCH-7F | 10.0 | ME3N.F | 3.0 | T15 | 8.00 |
| | ECCP-3F | 8.0 | ECCP-32 | 5.0 | ECCP-3F | 10.0 | PCH-302 | 7.0 | ECCP-3 | 8.00 |
| | ECCP-5F | 7.0 | ECCP-33 | 5.0 | ECCP-5F | 10.0 | CCH-303 | 5.0 | CCH-303 | 10.00 |
| | CP-3F | 9.0 | ECCP-35 | 5.0 | CP-3F | 11.0 | BCH-32 | 9.0 | CBC-33 | 3.00 |
| | CP-5F | 9.0 | CP-3F | 10.0 | CP-5F | 11.0 | BCH-52 | 9.0 | CBC-33F | 5.00 |
| | CBC-33F | 2.0 | CP-5F | 7.0 | CPTP-303 | 2.0 | ECCP-31 | 5.0 | CBC-53F | 5.00 |
| | CBC-53F | 2.0 | CCPC-33 | 5.0 | | | ECCP-32 | 5.0 | CBC-55F | 5.00 |
| | CBC-55F | 2.0 | | | | | ECCP-33 | 5.0 | | |
| | | | | | | | ECCP-3F | 10.0 | | |

-continued

| Examples | 246 | 247 | 248 | 249 | 250 |
|---|---|---|---|---|---|
| S → N [° C.] | <−40 | <−30 | <−40 | <−40 | <−30 |
| Clearing point [° C.] | +79 | +81 | +80 | +91 | +90 |
| Viscosity [mm²s⁻¹] 20° C. | 20 | 23 | 20 | 20 | 23 |
| $\Delta n$ (20° C., 589 nm) | +0.1453 | +0.1328 | +0.1465 | +0.1554 | +0.1597 |
| $V_{(10,0,20)}$ | 1.86 | 1.95 | 1.93 | 2.10 | 1.87 |
| $V_{(50,0,20)}$ | 2.14 | 2.25 | 2.21 | 2.38 | 2.15 |
| $V_{(90,0,20)}$ | 2.56 | 2.72 | 2.69 | 2.81 | 2.60 |
| Composition [%]: | PCH-2 10.00 | PCH-2 9.00 | PCH-2 10.00 | PCH-3 22.00 | PCH-2 8.00 |
| | PCH-3 18.00 | PCH-3 22.00 | PCH-3 18.00 | PCH-4 18.00 | PCH-3 17.00 |
| | PCH-4 14.00 | PCH-4 16.00 | PCH-4 14.00 | PCH-302 4.00 | K6 6.00 |
| | PCH-5 14.00 | K6 7.00 | PCH-5 15.00 | PTP-102 5.00 | K9 5.00 |
| | BCH-32 8.00 | K9 7.00 | PTP-102 5.00 | PTP-201 6.00 | G9 7.00 |
| | BCH-52 8.00 | ECCP-3 11.00 | PTP-201 5.00 | CPTP-301 4.00 | ME2N 3.00 |
| | I32 7.00 | ECCP-31 7.00 | CPTP-301 5.00 | ECCP-31 6.00 | ME3N 3.00 |
| | ECCP-3F 5.00 | ECCP-32 7.00 | ECCP-3F 4.00 | ECCP-33 6.00 | ME2N.F 2.00 |
| | ECCP-5F 5.00 | ECCP-33 7.00 | ECCP-5F 4.00 | BCH-32 5.00 | ME3N.F 3.00 |
| | PTP-102 7.00 | ECCP-35 7.00 | ECCP-31 5.00 | BCH-52 9.00 | PCH-302 6.00 |
| | CPTP-301 4.00 | | ECCP-32 5.00 | BCH-52F 10.00 | PTP-102 3.00 |
| | | | ECCP-33 5.00 | | CPTP-301 4.00 |
| | | | CPTP-301 5.00 | | CPTP-302FF 4.00 |
| | | | CPTP-302 5.00 | | ECCP-31 6.00 |
| | | | | | ECCP-32 6.00 |
| | | | | | ECCP-33 7.00 |
| | | | | | CBC-33 5.00 |
| | | | | | CBC-53 5.00 |

| Examples | 251 | 252 | 253 | 254 | 255 |
|---|---|---|---|---|---|
| S → N [° C.] | <−40 | <−30 | <−30 | <−40 | <−30 |
| Clearing point [° C.] | +72 | +103 | +91 | +80 | +87 |
| Viscosity [mm²s⁻¹] 20° C. | 17 | 28 | 22 | 21 | 24 |
| $\Delta n$ (20° C., 589 nm) | +0.1135 | +0.1443 | +0.1510 | +0.1536 | +0.1107 |
| $V_{(10,0,20)}$ | 1.97 | 2.18 | 2.01 | 1.85 | 1.67(1st) |
| $V_{(50,0,20)}$ | 2.22 | 2.52 | 2.26 | 2.12 | 2.06 |
| $V_{(90,0,20)}$ | 2.65 | 3.09 | 2.73 | 2.53 | 2.62 |
| Composition [%]: | PCH-3 16.0 | PCH-2 6.00 | PCH-2 8.00 | PCH-3 10.00 | ME2N.F 2.00 |
| | PCH-4 16.0 | PCH-3 17.00 | PCH-3 16.00 | ME2N.F 2.00 | PCH-3 18.00 |
| | PCH-5 10.0 | PCH-4 11.00 | PCH-4 10.00 | ME3N.F 3.00 | PCH-4 17.00 |
| | PCH-302 14.0 | PCH-5 13.00 | PCH-5 12.00 | ME5N.F 7.00 | PCH-5 18.00 |
| | ECCP-3F 9.0 | D-302FF 5.00 | BCH-5 8.00 | ME7N.F 7.00 | CCH-303 7.00 |
| | ECCP-5F 9.0 | D-502FF 6.00 | BCH-32 9.00 | PCH-301 16.00 | CP-302FF 12.00 |
| | CP-3F 8.0 | CP-302FF 6.00 | BCH-52 8.00 | PCH-501 4.00 | ECCP-31 4.00 |
| | CP-5F 8.0 | CP-402FF 5.00 | I32 5.00 | ECCP-31 7.00 | ECCP-3F 8.00 |
| | PTP-35 5.0 | CPTP-302FF 2.00 | ECCP-31 3.00 | ECCP-32 5.00 | ECCP-5F 8.00 |
| | PTP-45 5.0 | CPTP-301 6.00 | ECCP-32 3.00 | ECCP-33 5.00 | ECCP-3 6.00 |
| | | CPTP-302 5.00 | ECCP-33 3.00 | ECCP-35 5.00 | |
| | | CPTP-303 7.00 | ECCP-3F 3.00 | CBC-53F 4.00 | |
| | | ECCP-31 6.00 | ECCP-5F 3.00 | CPTP-301 5.00 | |
| | | ECCP-33 5.00 | PTP-102 3.00 | CPTP-302 4.00 | |
| | | | PTP-201 6.00 | CPTP-303 4.00 | |

| Examples | 256 | 257 | 258 | 259 | 260 |
|---|---|---|---|---|---|
| S → N [° C.] | — | <−40 | <−40 | — | — |
| Clearing point [° C.] | — | +71 | +87 | +88 | 125.0 |
| Viscosity [mm²s⁻¹] 20° C. | — | 16 | 18 | 24 | — |
| $\Delta n$ (20° C., 589 nm) | — | +0.1142 | +0.1149 | +0.1073 | +0.1364 |
| $V_{(10,0,20)}$ | — | 1.94 | 2.27 | 1.54(1st) | — |
| $V_{(50,0,20)}$ | — | 2.26 | 2.60 | 1.96 | — |
| $V_{(90,0,20)}$ | — | 2.66 | 3.13 | 2.50 | — |
| Composition [%]: | PCH-3 20.0 | ME2N.F 2.0 | PCH-3 20.0 | PCH-3 18.0 | PCH-3 18.00 |
| | ME2N.F 3.0 | ME3N.F 3.0 | PCH-5 15.0 | PCH-4 16.0 | ME2N.F 2.00 |
| | ME3N.F 4.0 | PCH-3 20.0 | PCH-302 10.0 | PCH-5 18.0 | ME3N.F 3.00 |
| | ME5N.F 6.0 | PCH-5F 10.0 | ECCP-3F 12.0 | CCH-303 4.0 | ME5N.F 6.00 |
| | PCH-301 8.0 | PCH-7F 10.0 | ECCP-5F 12.0 | D-502FF 5.0 | ME7N.F 6.00 |
| | PCH-302 20.0 | ECCP-3F 10.0 | CP-3F 11.0 | CP-302FF 6.0 | HP-3N.F 6.00 |
| | ECCP-31 5.0 | ECCP-5F 10.0 | CP-5F 10.0 | ECCP-32 4.0 | PCH-302 8.00 |
| | ECCP-32 5.0 | CP-3F 10.0 | PTP-35 5.0 | ECCP-3F 8.0 | CCH-303 3.00 |
| | ECCP-33 5.0 | CP-5F 10.0 | PTP-45 5.0 | ECCP-5F 8.0 | ECCP-31 5.00 |
| | ECCP-35 5.0 | PTP-35 6.0 | | ECCP-3 7.0 | ECCP-32 5.00 |
| | CPTP-301 4.0 | PTP-45 6.0 | | CH-33 3.0 | ECCP-33 5.00 |
| | CPTP-302 3.0 | CPTP-303 3.0 | | CH-35 3.0 | ECCP-3F 7.00 |
| | CPTP-303 4.0 | | | | CBC-33 5.00 |

-continued

|  |  |  |  | CBC-53 | 5.00 |
|---|---|---|---|---|---|
| CCPC-33 | 4.0 |  |  | CBC-33F | 5.00 |
| CCPC-35 | 4.0 |  |  | CBC-53F | 6.00 |
|  |  |  |  | CBC-55F | 5.00 |

| Examples |  | 261 | 262 | 263 | 264 | 265 |
|---|---|---|---|---|---|---|
| S → N [° C.] |  | <−40 | — | <−40 | <0 | <−20 |
| Clearing point [° C.] |  | +82 | 89.0 | +85 | +122 | +119 |
| Viscosity [mm²s⁻¹] 20° C. |  | 19 | — | 20 | 30 | 31 |
| Δn (20° C., 589 nm) |  | 0.1178 | +0.1603 | +0.1574 | +0.1198 | 0.1156 |
| $V_{(10,0,20)}$ |  | 1.65 | 2.0 | 1.93 | 1.99 | 1.93 |
| $V_{(50,0,20)}$ |  | 2.06 | 2.4 | 2.20 | 2.29 | 2.21 |
| $V_{(90,0,20)}$ |  | 2.67 | 2.8 | 2.63 | 2.76 | 2.64 |
| Composition [%]: | PCH-3 | 22.00 | PCH-2 7.00 | PCH-2 8.00 | PCH-3 14.00 | PCH-3 14.00 |
|  | ME2N.F | 3.00 | PCH-3 17.00 | PCH-3 17.00 | ME2N.F 2.00 | ME2N.F 2.00 |
|  | ME3N.F | 3.00 | K6 7.00 | K6 6.00 | ME3N.F 3.00 | ME3N.F 3.00 |
|  | ME5N.F | 2.00 | K9 5.00 | K9 5.00 | ME4N.F 7.00 | ME4N.F 7.00 |
|  | PCH-53 | 9.00 | G9 6.00 | G9 7.00 | ME5N.F 7.00 | ME5N.F 7.00 |
|  | PCH-302 | 18.00 | ME2N.F 2.00 | ME2N.F 2.00 | CCH-301 8.00 | CCH-301 10.00 |
|  | BCH-52 | 12.00 | ME3N.F 2.00 | ME3N.F 3.00 | CCH-303 9.00 | CCH-303 6.00 |
|  | ECCP-31 | 6.00 | PCH-302 7.00 | PCH-302 6.00 | ECCP-31 4.00 | ECCP-31 4.00 |
|  | ECCP-32 | 6.00 | PTP-35 5.00 | PTP-35 5.00 | ECCP-32 3.00 | ECCP-32 4.00 |
|  | ECCP-33 | 6.00 | PTP-102 5.00 | PTP-102 5.00 | ECCP-33 3.00 | ECCP-33 4.00 |
|  | ECCP-3 | 13.00 | CPTP-301 4.00 | CPTP-301 4.00 | CP-33 5.00 | CH-33 4.00 |
|  |  |  | ECCP-31 8.00 | ECCP-31 8.00 | CP-35 5.00 | CH-35 4.00 |
|  |  |  | ECCP-32 8.00 | ECCP-32 7.00 | CH-33 3.00 | CH-43 4.00 |
|  |  |  | ECCP-33 7.00 | ECCP-33 8.00 | CH-35 3.00 | CH-45 3.00 |
|  |  |  | CBC-33 5.00 | CBC-33 5.00 | CBC-33 6.00 | CBC-53 6.00 |
|  |  |  | CBC-53 5.00 | CBC-53 4.00 | CBC-53 6.00 | CBC-33F 6.00 |
|  |  |  |  |  | CBC-53F 6.00 | CBC-53F 6.00 |
|  |  |  |  |  | CBC-55F 6.00 | CBC-55F 6.00 |

| Examples |  | 266 | 267 | 268 | 269 | 270 |
|---|---|---|---|---|---|---|
| S → N [° C.] |  | <−40 | — | <−40 | <−30 | — |
| Clearing point [° C.] |  | +90 | +115 | +89 | +116 | +85 |
| Viscosity [mm²s⁻¹] 20° C. |  | 20 | — | 22 | 30 | — |
| Δn (20° C., 589 nm) |  | +0.1498 | +0.1211 | 0.1155 | 0.1165 | +0.1073 |
| $V_{(10,0,20)}$ |  | 2.09 | 2.04 | 2.11 | 1.96 | 1.41(1st) |
| $V_{(50,0,20)}$ |  | 2.40 | 2.35 | 2.46 | 2.24 | 1.79 |
| $V_{(90,0,20)}$ |  | 2.90 | 2.85 | 3.03 | 2.71 | 2.32 |
| Composition [%]: | PCH-3 | 22.00 | PCH-3 18.00 | PCH-3 18.00 | PCH-3 14.00 | PDX-2 6.00 |
|  | PCH-4 | 23.00 | ME2N.F 2.00 | PDX-3 8.00 | ME2N.F 2.00 | PDX-3 11.00 |
|  | CCH-301 | 8.00 | ME3N.F 3.00 | PDX-4 7.00 | ME3N.F 3.00 | PDX-4 10.00 |
|  | PTP-102 | 4.00 | ME4N.F 5.00 | PCH-301 2.00 | ME4N.F 7.00 | PCH-3 12.00 |
|  | PTP-201 | 5.00 | ME5N.F 5.00 | D-301 10.00 | ME5N.F 7.00 | PCH-4 8.00 |
|  | CPTP-301 | 6.00 | PCH-301 8.00 | D-401 10.00 | CCH-301 9.00 | PCH-302 8.00 |
|  | CPTP-302 | 5.00 | CCH-301 9.00 | D-501 10.00 | CCH-303 8.00 | ECCP-31 6.00 |
|  | CPTP-303 | 5.00 | ECCP-31 4.00 | CP-33 6.00 | ECCP-31 4.00 | ECCP-32 6.00 |
|  | ECCP-31 | 7.00 | ECCP-32 4.00 | CP-35 6.00 | ECCP-32 6.00 | ECCP-33 6.00 |
|  | ECCP-33 | 7.00 | ECCP-33 4.00 | ECCP-31 5.00 | ECCP-33 4.00 | ECCP-3 6.00 |
|  | ECCP-35 | 8.00 | CP-33 5.00 | ECCP-32 5.00 | CH-33 4.00 | ECCP-3F 7.00 |
|  |  |  | CP-35 5.00 | ECCP-33 5.00 | CH-35 4.00 | CP-3F 7.00 |
|  |  |  | CH-33 4.00 | CPTP-301 4.00 | CH-43 4.00 | CP-5F 7.00 |
|  |  |  | CBC-53 6.00 | CPTP-302 4.00 | CBC-53 6.00 |  |
|  |  |  | CBC-33F 6.00 |  | CBC-33F 6.00 |  |
|  |  |  | CBC-53F 6.00 |  | CBC-53F 6.00 |  |
|  |  |  | CBC-55F 6.00 |  | CBC-55F 6.00 |  |

| Examples |  | 271 | 272 | 273 | 274 | 275 |
|---|---|---|---|---|---|---|
| S → N [° C.] |  | <20 | <−40 | — | <−30 | <−30 |
| Clearing point [° C.] |  | +112 | +91 | 117.0 | +81 | +118 |
| Viscosity [mm²s⁻¹] 20° C. |  | 26 | 20 | — | 20 | 33 |
| Δn (20° C., 589 nm) |  | +0.1499 | +0.1554 | +0.1256 | +0.1459 | +0.1241 |
| $V_{(10,0,20)}$ |  | 2.09 | 2.17 | 2.1 | 1.95 | 1.97 |
| $V_{(50,0,20)}$ |  | 2.31 | 2.47 | 2.4 | 2.21 | 2.27 |
| $V_{(90,0,20)}$ |  | 2.81 | 2.94 | 2.9 | 2.70 | 2.73 |
| Composition [%]: | ME2N.F | 2.00 | PCH-3 20.00 | PCH-3 20.00 | PCH-3 19.00 | PCH-3 20.00 |
|  | ME3N.F | 3.00 | PCH-4 11.00 | PYP-3N.F 5.00 | PCH-4 17.00 | PYP-3N.F 5.00 |
|  | PYP-5N.F | 6.00 | G9 15.00 | PYP-5N.F 6.00 | PCH-5 18.00 | PYP-5N.F 6.00 |
|  | PYP-6N.F | 8.00 | PTP-35 6.00 | PYP-7N.F 6.00 | BCH-32 12.00 | PYP-7N.F 6.00 |
|  | HP-3N.F | 5.00 | PTP-102 2.00 | CCH-301 12.00 | BCH-52 11.00 | CCH-301 12.00 |
|  | PCH-301 | 10.00 | PTP-201 5.00 | ECCP-31 4.00 | ECCP-31 4.00 | ECCP-31 3.00 |
|  | CCH-303 | 12.00 | CPTP-301 4.00 | ECCP-32 4.00 | ECCP-32 4.00 | CH-33 5.00 |
|  | ECCP-31 | 7.00 | CPTP-303 4.00 | ECCP-33 5.00 | ECCP-33 4.00 | CH-35 5.00 |
|  | ECCP-32 | 7.00 | ECCP-31 6.00 | CP-43 4.00 | PTP-35 6.00 | CH-43 5.00 |
|  | ECCP-33 | 8.00 | ECCP-33 6.00 | CH-33 4.00 | PTP-102 5.00 | CH-43 5.00 |

-continued

|  |  |  |  |  |  |  |  |  |
|---|---|---|---|---|---|---|---|---|
| ECCP-35 | 8.00 | CP-3F | 8.00 | CH-35 | 4.00 |  | CBC-33 | 4.00 |
| CPTP-301 | 6.00 | BCH-32 | 6.00 | CH-43 | 4.00 |  | CBC-53 | 4.00 |
| CPTP-302 | 5.00 | BCH-52 | 7.00 | CBC-33 | 6.00 |  | CBC-53F | 5.00 |
| CPTP-303 | 7.00 |  |  | CBC-53 | 5.00 |  | CBC-55F | 5.00 |
| CBC-33F | 4.00 |  |  | CBC-53F | 6.00 |  | ECCP-3 | 10.00 |
|  |  |  |  | CBC-55F | 5.00 |  |  |  |

| Examples |  | 276 |  | 277 |  | 278 |  | 279 |  | 280 |
|---|---|---|---|---|---|---|---|---|---|---|
| S → N [° C.] |  | <20 |  | <0 |  | <0 |  | <0 |  | <−40 |
| Clearing point [° C.] |  | +110 |  | +98 |  | +106 |  | 83 |  | +79 |
| Viscosity [mm²s⁻¹] 20° C. |  | 24 |  | 22 |  | 25 |  | 19 |  | 18 |
| Δn (20° C., 589 nm) |  | +0.1518 |  | +0.1235 |  | +0.1168 |  | +0.1527 |  | +0.1514 |
| $V_{(10,0,20)}$ |  | 2.09 |  | 2.33 |  | 2.15 |  | 2.17 |  | 2.07 |
| $V_{(50,0,20)}$ |  | 2.39 |  | 2.65 |  | 2.46 |  | 2.46 |  | 2.37 |
| $V_{(90,0,20)}$ |  | 2.84 |  | 3.16 |  | 2.95 |  | 2.89 |  | 2.85 |
| Composition [%]: | ME2N.F | 2.00 | ME2N.F | 2.00 | PCH-3 | 18.00 | ME2N.F | 2.00 | PCH-3 | 20.00 |
|  | ME3N.F | 3.00 | ME3N.F | 3.00 | PDX-3 | 8.00 | ME3N.F | 3.00 | PCH-4 | 15.00 |
|  | ME4N.F | 6.00 | ME5N.F | 7.00 | PDX-4 | 8.00 | K6 | 6.00 | PCH-5 | 8.00 |
|  | ME5N.F | 6.00 | ME7N.F | 6.00 | PDX-5 | 8.00 | K9 | 8.00 | PCH-302 | 14.00 |
|  | HP-3N.F | 4.00 | CCH-301 | 13.00 | PCH-301 | 13.00 | K15 | 8.00 | PTP-35 | 3.00 |
|  | PCH-301 | 15.00 | CCH-303 | 20.00 | ECCP-31 | 3.00 | PCH-301 | 7.00 | PTP-102 | 5.00 |
|  | PTP-35 | 8.00 | ECCP-31 | 8.00 | ECCP-32 | 8.00 | PYP-32 | 6.00 | PTP-201 | 5.00 |
|  | ECCP-31 | 6.00 | ECCP-32 | 6.00 | ECCP-33 | 8.00 | PYP-33 | 6.00 | ECCP-31 | 5.00 |
|  | ECCP-32 | 6.00 | ECCP-33 | 7.00 | ECCP-35 | 4.00 | PTP-201 | 6.00 | ECCP-32 | 5.00 |
|  | ECCP-33 | 6.00 | ECCP-35 | 7.00 | CH-33 | 4.00 | ECCP-31 | 8.00 | ECCP-33 | 5.00 |
|  | ECCP-35 | 6.00 | CPTP-301 | 3.00 | CH-35 | 4.00 | ECCP-32 | 8.00 | ECCP-35 | 3.00 |
|  | ECCP-3F | 7.00 | CPTP-302FF | 8.00 | CH-43 | 3.00 | ECCP-33 | 8.00 | CPTP-301 | 5.00 |
|  | CP-3F | 9.00 | CPTP-502FF | 8.00 | CBC-33 | 5.00 | ECCP-35 | 8.00 | CPTP-302 | 3.00 |
|  | CPTP-301 | 5.00 |  |  | CBC-44 | 3.00 | ECCP-3F | 8.00 | CPTP-303 | 4.00 |
|  | CPTP-302 | 5.00 |  |  | CBC-53 | 5.00 | ECCP-3 | 8.00 |  |  |
|  | CPTP-303 | 6.00 |  |  | CBC-55 | 4.00 |  |  |  |  |
|  |  |  |  |  | ECCP-3 | 4.00 |  |  |  |  |

| Examples |  | 281 |  | 282 |  | 283 |  | 284 |  | 285 |
|---|---|---|---|---|---|---|---|---|---|---|
| S → N [° C.] |  | — |  | — |  | <−40 |  | — |  | <−40 |
| Clearing point [° C.] |  | 99.4 |  | 91.0 |  | +85 |  | +86 |  | +87 |
| Viscosity [mm²s⁻¹] 20° C. |  | — |  | — |  | 23 |  | 21.5 |  | 23 |
| Δn (20° C., 589 nm) |  | — |  | — |  | +0.1072 |  | +0.1069 |  | +0.1074 |
| $V_{(10,0,20)}$ |  | — |  | — |  | 1.44(1st) |  | 1.40(1st) |  | 1.49(1st) |
| $V_{(50,0,20)}$ |  | — |  | — |  | 1.79 |  | 1.80 |  | 1.88 |
| $V_{(90,0,20)}$ |  | — |  | — |  | 2.25 |  | 2.34 |  | 2.38 |
| Composition [%]: | PCH-3 | 18.80 | PDX-2 | 6.50 | PCH-3 | 19.00 | PDX-2 | 5.00 | PCH-3 | 19.00 |
|  | PCH-4 | 12.90 | PDX-3 | 9.80 | PCH-4 | 11.00 | PCH-3 | 20.00 | PCH-4 | 11.00 |
|  | ME2N.F | 2.40 | PCH-3 | 17.40 | PCH-5 | 6.00 | PCH-4 | 10.00 | PCH-5 | 8.00 |
|  | ME3N.F | 3.50 | PCH-4 | 12.00 | ME2N.F | 2.00 | ME2N.F | 2.00 | ME2N.F | 2.00 |
|  | CCH-303 | 9.40 | ME2N.F | 2.20 | ME3N.F | 4.00 | ME3N.F | 2.00 | ME3N.F | 3.00 |
|  | ECCP-31 | 7.10 | ME3N.F | 3.30 | ME5N.F | 5.00 | ME5N.F | 6.00 | ME5N.F | 4.00 |
|  | ECCP-32 | 7.10 | ECCP-31 | 6.50 | CCH-303 | 12.00 | CCH-303 | 11.00 | CCH-303 | 11.00 |
|  | ECCP-33 | 7.10 | ECCP-32 | 6.50 | ECCP-31 | 5.00 | ECCP-31 | 6.00 | ECCP-31 | 3.00 |
|  | ECCP-3 | 7.10 | ECCP-33 | 6.50 | ECCP-32 | 5.00 | ECCP-32 | 6.00 | ECCP-32 | 3.00 |
|  | ECCP-3F | 8.20 | ECCP-3 | 6.50 | ECCP-33 | 4.00 | ECCP-33 | 5.00 | ECCP-33 | 3.00 |
|  | CP-3F | 8.20 | ECCP-3F | 7.60 | ECCP-3 | 5.00 | ECCP-3 | 5.00 | ECCP-3 | 7.00 |
|  | CP-5F | 8.20 | CP-3F | 7.60 | ECCP-3F | 7.00 | ECCP-3F | 7.00 | ECCP-3F | 6.00 |
|  |  |  | CP-5F | 7.60 | CP-3F | 8.00 | CP-3F | 7.00 | CP-3F | 7.00 |
|  |  |  |  |  | CP-5F | 7.00 | CP-5F | 7.00 | CP-5F | 7.00 |

| Examples |  | 286 |  | 287 |  | 288 |  | 289 |  | 290 |
|---|---|---|---|---|---|---|---|---|---|---|
| S → N [° C.] |  | <−40 |  | — |  | <−40 |  | — |  | <−30 |
| Clearing point [° C.] |  | +85 |  | +80 |  | +91 |  | +77 |  | +123 |
| Viscosity [mm²s⁻¹] 20° C. |  | 20 |  | — |  | 23 |  | Cry. |  | 34 |
| Δn (20° C., 589 nm) |  | +0.1570 |  | +0.1647 |  | +0.1155 |  | +0.1503 |  | +0.1337 |
| $V_{(10,0,20)}$ |  | 1.97 |  | 2.12 |  | 1.94 |  | 2.50 |  | 2.09 |
| $V_{(50,0,20)}$ |  | 2.26 |  | 2.38 |  | 2.24 |  | 2.82 |  | 2.40 |
| $V_{(90,0,20)}$ |  | 2.73 |  | 2.80 |  | 2.72 |  | 3.35 |  | 2.85 |
| Composition [%]: | PCH-2 | 8.00 | PCH-3 | 15.0 | PCH-3 | 22.00 | PCH-3 | 10.00 | PCH-3 | 20.00 |
|  | PCH-3 | 17.00 | PDX-3 | 8.0 | PCH-4 | 20.00 | PCH-5F | 15.00 | PCH-4 | 13.00 |
|  | K6 | 6.00 | PDX-5 | 8.0 | PCH-5 | 13.00 | PTP-35 | 6.00 | PCH-5 | 15.00 |
|  | K9 | 6.00 | PCH-301 | 8.0 | HP-3N.F | 4.00 | PTP-45 | 6.00 | HP-3N.F | 5.00 |
|  | G9 | 6.00 | PTP-35 | 5.0 | ECCP-31 | 6.00 | PTP-201 | 9.00 | HP-4N.F | 5.00 |
|  | ME2N.F | 2.00 | PTP-45 | 5.0 | ECCP-32 | 6.00 | PTP-102 | 9.00 | ECCP-3F | 5.00 |
|  | ME3N.F | 2.00 | PTP-102 | 7.0 | ECCP-33 | 6.00 | BCH-5OCF3 | 10.00 | ECCP-5F | 5.00 |
|  | PCH-302 | 6.00 | PTP-201 | 7.0 | ECCP-35 | 6.00 | ECCP-3OCF3 | 9.00 | CCH-303 | 5.00 |
|  | PTP-35 | 5.00 | ECCP-31 | 7.0 | CP-3F | 8.00 | ECCP-5OCF3 | 9.00 | CBC-33 | 4.00 |
|  | PTP-102 | 5.00 | ECCP-33 | 6.0 | CP-5F | 5.00 | ECCP-3F | 9.00 | CBC-53 | 5.00 |
|  | CPTP-301 | 4.00 | BCH-32 | 12.0 | BCH-32 | 4.00 | ECCP-5F | 8.00 | CBC-33F | 6.00 |

-continued

|   |   |   |   |   |   |   |   |
|---|---|---|---|---|---|---|---|
| | ECCP-31 | 8.00 | BCH-52 | 12.0 | | CBC-53F | 6.00 |
| | ECCP-32 | 8.00 | | | | CBC-55F | 6.00 |
| | ECCP-33 | 7.00 | | | | | |
| | CBC-33F | 5.00 | | | | | |
| | CBC-53F | 5.00 | | | | | |

| Examples | | 291 | 292 | 293 | 294 | 295 | |
|---|---|---|---|---|---|---|---|
| S → N [° C.] | | — | — | — | <−40 | <−20 | |
| Clearing point [° C.] | | +80 | 87.0 | +92 | +87 | +124 | |
| Viscosity [mm²s⁻¹] 20° C. | | 23 | 21 | — | 20 | 32 | |
| Δn (20° C., 589 nm) | | +0.1096 | +0.1322 | +0.1182 | +0.1294 | +0.1385 | |
| V$_{(10,0,20)}$ | | 1.45(1st) | 2.1 | 2.09 | 2.38 | 1.98 | |
| V$_{(50,0,20)}$ | | 1.86 | 2.4 | 2.41 | 2.72 | 2.26 | |
| V$_{(90,0,20)}$ | | 2.40 | 2.8 | 2.94 | 3.29 | 2.74 | |
| Composition [%]: | PCH-2 | 7.0 | PCH-2 | 10.0 | PCH-3 | 22.0 PCH-3 | 13.00 PCH-3 | 18.00 |
| | PCH-3 | 18.0 | PCH-3 | 20.0 | PCH-4 | 23.0 PDX-3 | 8.00 ME2N.F | 2.00 |
| | PCH-4 | 16.0 | PCH-5 | 10.0 | PCH-5 | 9.0 PDX-4 | 7.00 ME3N.F | 3.00 |
| | PCH-5 | 15.0 | G9 | 10.0 | BCH-5 | 5.0 PCH-301 | 13.00 ME5N.F | 6.00 |
| | CCH-303 | 5.0 | ME2N | 5.0 | PCH-302 | 2.0 PCH-501 | 7.00 ME7N.F | 6.00 |
| | D-502FF | 4.0 | CCH-303 | 4.0 | ECCP-31 | 5.0 CP-33 | 6.00 HP-3N.F | 6.00 |
| | CP-302FF | 6.0 | ECCP-3F | 6.0 | ECCP-32 | 5.0 CP-35 | 5.00 PCH-302 | 11.00 |
| | ECCP-31 | 5.0 | ECCP-5F | 6.0 | ECCP-33 | 5.0 CP-43 | 4.00 ECCP-31 | 5.00 |
| | ECCP-3F | 8.0 | ECCP-31 | 6.0 | ECCP-35 | 4.0 CP-45 | 4.00 ECCP-32 | 5.00 |
| | ECCP-5F | 8.0 | ECCP-32 | 6.0 | CP-3F | 10.0 ECCP-31 | 5.00 ECCP-33 | 5.00 |
| | ECCP-3 | 8.0 | ECCP-33 | 6.0 | CP-5F | 7.0 ECCP-32 | 5.00 ECCP-3F | 7.00 |
| | | | CPTP-301 | 4.0 | BCH-32 | 3.0 ECCP-33 | 5.00 CBC-33 | 5.00 |
| | | | CPTP-302 | 4.0 | | PTP-302FF | 5.00 CBC-53 | 5.00 |
| | | | CPTP-303 | 4.0 | | PTP-502FF | 5.00 CBC-33F | 5.00 |
| | | | | | | CPTP-502FF | 5.00 CBC-53F | 6.00 |
| | | | | | | CPTP-301 | 3.00 CBC-55F | 5.00 |

| Examples | | 296 | 297 | 298 | 299 | 300 | |
|---|---|---|---|---|---|---|---|
| S → N [° C.] | | <0 | <−40 | <−20 | <−40 | <−20 | |
| Clearing point [° C.] | | +90 | +87 | +88 | +82 | +85 | |
| Viscosity [mm²s⁻¹] 20° C. | | 36 | 22 | 20 | 17 | 18 | |
| Δn (20° C., 589 nm) | | +0.1528 | +0.1355 | +0.1496 | +0.1425 | +0.1579 | |
| V$_{(10,0,20)}$ | | 1.35 | 1.85 | 2.02 | 2.21 | 2.26 | |
| V$_{(50,0,20)}$ | | 1.57 | 2.14 | 2.32 | 2.52 | 2.55 | |
| V$_{(90,0,20)}$ | | 1.91 | 2.60 | 2.81 | 3.01 | 3.05 | |
| Composition [%]: | ME2N.F | 4.00 | PCH-2 | 7.00 | PCH-2 | 8.00 PCH-3 | 20.00 PYP-3N.F | 4.00 |
| | ME3N.F | 6.00 | PCH-3 | 17.00 | PCH-3 | 18.00 PCH-4 | 9.00 PYP-5N.F | 4.00 |
| | ME4N.F | 10.00 | G9 | 10.00 | PCH-4 | 6.00 ME5N.F | 4.00 PYP-7N.F | 5.00 |
| | ME5N.F | 10.00 | ME2N | 5.00 | K6 | 6.00 PCH-301 | 15.00 PTP-35 | 8.00 |
| | HP-3N.F | 5.00 | ME2N.F | 2.00 | G9 | 6.00 PCH-302 | 4.00 PTP-45 | 8.00 |
| | HP-4N.F | 5.00 | ME3N.F | 3.00 | ME2N.F | 2.00 ECCP-31 | 7.00 PCH-301 | 16.00 |
| | HP-5N.F | 4.00 | HP-3N.F | 5.00 | ME3N.F | 2.00 ECCP-32 | 7.00 ECCP-31 | 7.00 |
| | PCH-302 | 18.00 | PCH-302 | 10.00 | PCH-302 | 6.00 ECCP-33 | 7.00 ECCP-32 | 7.00 |
| | ECCP-31 | 5.00 | CCH-303 | 4.00 | PTP-35 | 3.00 ECCP-35 | 7.00 ECCP-33 | 8.00 |
| | ECCP-32 | 5.00 | ECCP-31 | 6.00 | PTP-102 | 3.00 PTP-102 | 5.00 ECCP-35 | 8.00 |
| | ECCP-33 | 6.00 | ECCP-32 | 7.00 | CPTP-302FF | 4.00 PTP-201 | 5.00 ECCP-3 | 15.00 |
| | ECCP-35 | 6.00 | ECCP-33 | 7.00 | ECCP-31 | 7.00 CPTP-301 | 5.00 PTP-102 | 5.00 |
| | CP-3F | 4.00 | ECCP-35 | 5.00 | ECCP-32 | 7.00 CPTP-302 | 5.00 PTP-201 | 5.00 |
| | PTP-201 | 6.00 | CPTP-301 | 6.00 | ECCP-33 | 7.00 | | |
| | CPTP-301 | 6.00 | CPTP-302 | 7.00 | ECCP-35 | 6.00 | | |
| | | | CPTP-303 | 4.00 | CBC-33 | 5.00 | | |
| | | | | | CBC-53 | 4.00 | | |

| Examples | | 301 | 302 | 303 | 304 | 305 | |
|---|---|---|---|---|---|---|---|
| S → N [° C.] | | <−30 | — | <−20 | <−40 | <−30 | |
| Clearing point [° C.] | | +77 | 83.0 | +85 | +79 | +81 | |
| Viscosity [mm²s⁻¹] 20° C. | | 21 | — | 23 | 19 | 20 | |
| Δn (20° C., 589 nm) | | +0.1467 | +0.1421 | +0.1303 | +0.1576 | +0.1449 | |
| V$_{(10,0,20)}$ | | 1.84 | 1.9 | 1.94 | 2.16(2nd) | 1.86 | |
| V$_{(50,0,20)}$ | | 2.10 | 2.2 | 2.24 | 2.46 | 2.14 | |
| V$_{(90,0,20)}$ | | 2.50 | 2.7 | 2.72 | 2.92 | 2.55 | |
| Composition [%]: | PCH-2 | 8.00 | PCH-3 | 18.00 | PCH-2 | 12.00 PCH-2 | 5.00 PCH-2 | 10.00 |
| | PCH-3 | 18.00 | PCH-4 | 10.00 | PCH-3 | 20.00 PCH-3 | 15.00 PCH-3 | 18.00 |
| | K6 | 6.00 | PCH-5 | 8.00 | PCH-4 | 12.00 PCH-4 | 10.00 PCH-4 | 14.00 |
| | K9 | 5.00 | K6 | 8.00 | K6 | 12.00 PCH-5 | 10.00 PCH-5 | 15.00 |
| | G9 | 9.00 | K12 | 6.00 | HP-3N.F | 2.00 PTP-502FF | 10.00 PTP-102 | 5.00 |
| | ME2N | 3.00 | D-302 | 7.00 | ECCP-3 | 11.00 CPTP-302FF | 10.00 PTP-502FF | 5.00 |
| | ME2N.F | 2.00 | D-402 | 6.00 | ECCP-31 | 8.00 PTP-35 | 14.00 ECCP-3F | 4.00 |
| | ME3N.F | 3.00 | D-501 | 6.00 | ECCP-32 | 8.00 ECCP-31 | 6.00 ECCP-5F | 4.00 |
| | PCH-302 | 6.00 | ECCP-31 | 7.00 | ECCP-33 | 8.00 ECCP-33 | 6.00 ECCP-31 | 5.00 |
| | PTP-35 | 3.00 | ECCP-33 | 7.00 | ECCP-35 | 7.00 ECCP-35 | 6.00 ECCP-32 | 5.00 |
| | PTP-102 | 4.00 | ECCP-35 | 6.00 | | ECCP-3F | 8.00 ECCP-33 | .00 |

-continued

|  |  |  |  |  |  |  |  |  |
|---|---|---|---|---|---|---|---|---|
|  | ECCP-31 | 6.00 | CPTP-301 | 4.00 |  |  | CPTP-301 | 5.00 |
|  | ECCP-32 | 6.00 | CPTP-302 | 4.00 |  |  | CPTP-302 | 5.00 |
|  | ECCP-33 | 5.00 | CPTP-303 | 3.00 |  |  |  |  |
|  | ECCP-35 | 5.00 |  |  |  |  |  |  |
|  | CBC-33F | 5.00 |  |  |  |  |  |  |
|  | CBC-53F | 6.00 |  |  |  |  |  |  |

| Examples | | 306 | 307 | 308 | 309 | 310 | |
|---|---|---|---|---|---|---|---|
| S → N [° C.] | | <−40 | — | — | <−30 | <−20 | |
| Clearing point [° C.] | | +74 | 112.0 | +117 | +90 | +93 | |
| Viscosity [mm²s⁻¹]   20° C. | | 17 | — | 32 | 42 | 21 | |
| Δn   (20° C., 589 nm) | | +0.1137 | +0.1345 | +0.1329 | +0.1507 | 0.1079 | |
| $V_{(10,0,20)}$ | | 1.52(1st) | 2.0 | 2.23 | 1.24 | 2.21 | |
| $V_{(50,0,20)}$ | | 1.93 | 2.3 | 2.55 | 1.44 | 2.52 | |
| $V_{(90,0,20)}$ | | 2.55 | 2.7 | 3.07 | 1.95 | 3.04 | |
| Composition [%]: | PCH-3 | 20.00 | PCH-3 | 13.00 PCH-3 | 20.00 ME2N.F | 4.00 PCH-3 | 17.00 |
| | PCH-4 | 8.00 | ME2N.F | 2.00 PCH-4 | 10.00 ME3N.F | 6.00 PDX-3 | 8.00 |
| | PCH-5 | 9.00 | ME3N.F | 3.00 PCH-5 | 12.00 ME4N.F | 10.00 PDX-4 | 8.00 |
| | PCH-5F | 8.00 | ME5N.F | 6.00 PDX-3 | 8.00 ME5N.F | 10.00 PCH-301 | 8.00 |
| | PCH-6F | 9.00 | ME7N.F | 6.00 PDX-5 | 7.00 HP-3N.F | 6.00 D-301 | 8.00 |
| | ECCP-3F | 9.00 | HP-3N.F | 6.00 ECCP-3F | 7.00 HP-4N.F | 6.00 D-401 | 7.00 |
| | ECCP-5F | 8.00 | PCH-302 | 15.00 ECCP-5F | 6.00 HP-5N.F | 4.00 D-501 | 7.00 |
| | CP-3F | 7.00 | ECCP-31 | 5.00 CBC-33 | 4.00 PCH-302 | 19.00 CP-33 | 7.00 |
| | CP-5F | 6.00 | ECCP-32 | 5.00 CBC-53 | 4.00 ECCP-33 | 6.00 ECCP-31 | 5.00 |
| | ECCP-3 | 8.00 | ECCP-33 | 6.00 CBC-55 | 4.00 ECCP-35 | 6.00 ECCP-32 | 5.00 |
| | PTP-102 | 4.00 | ECCP-3F | 5.00 CBC-33F | 6.00 BCH-32 | 10.00 ECCP-33 | 5.00 |
| | PTP-201 | 4.00 | I32 | 7.00 CBC-53F | 6.00 BCH-52F | 10.00 ECCP-35 | 5.00 |
| |  |  | CBC-53 | 6.00 CBC-55F | 6.00 CPTP-301 | 3.00 CBC-33 | 5.00 |
| |  |  | CBC-33F | 5.00 |  |  | CBC-53 | 5.00 |
| |  |  | CBC-53F | 5.00 |  |  |  |  |
| |  |  | CBC-55F | 5.00 |  |  |  |  |

| Examples | | 311 | 312 | 313 | 314 | 315 | |
|---|---|---|---|---|---|---|---|
| S → N [° C.] | | <−30 | — | <−40 | <−40 | <0 | |
| Clearing point [° C.] | | +125 | 92.0 | +85 | +91 | +90 | |
| Viscosity [mm²s⁻¹]   20° C. | | 33 | 21 | 19 | 23 | 21 | |
| Δn   (20° C., 589 nm) | | +0.1302 | +0.1278cal | +0.1360 | +0.1153 | +0.1035 | |
| $V_{(10,0,20)}$ | | 2.11 | 2.0 | 1.92 | 1.94 | 2.24 | |
| $V_{(50,0,20)}$ | | 2.42 | 2.4 | 2.38 | 2.24 | 2.54 | |
| $V_{(90,0,20)}$ | | 2.90 | 2.9 | 2.61 | 2.72 | 3.06 | |
| Composition [%]: | PCH-3 | 20.00 | PCH-2 | 7.00 PCH-2 | 6.0 PCH-3 | 22.00 PCH-3 | 18.00 |
| | ME2N | 3.00 | PCH-3 | 17.00 PCH-3 | 18.0 PCH-4 | 20.00 PCH-4 | 17.00 |
| | ME2N.F | 2.00 | G9 | 10.00 ME2N.F | 2.0 PCH-5 | 5.00 PCH-5 | 17.00 |
| | ME3N.F | 3.00 | ME2N | 3.00 ME3N.F | 3.0 ME3N.F | 3.00 ECCP-31 | 8.00 |
| | HP-3N.F | 4.00 | ME2N.F | 2.00 ME5N.F | 6.0 ME5N.F | 3.00 ECCP-32 | 8.00 |
| | HP-4N.F | 3.00 | ME3N.F | 3.00 PCH-302 | 16.0 ECCP-31 | 6.00 ECCP-33 | 8.00 |
| | PCH-302 | 6.00 | HP-3N.F | 3.00 PCH-501 | 11.0 ECCP-32 | 6.00 ECCP-35 | 8.00 |
| | D-302FF | 6.00 | CCH-303 | 12.00 ECCP-31 | 6.0 ECCP-33 | 6.00 ECCP-3F | 8.00 |
| | ECCP-31 | 4.00 | ECCP-3F | 6.00 ECCP-32 | 6.0 ECCP-35 | 6.00 ECCP-5F | 8.00 |
| | ECCP-32 | 5.00 | ECCP-31 | 6.00 BCH-32 | 6.0 CP-3F | 9.00 | |
| | ECCP-33 | 5.00 | ECCP-32 | 7.00 BCH-52 | 5.0 CP-5F | 7.00 | |
| | CP-33F | 5.00 | ECCP-33 | 7.00 CPTP-301 | 3.0 BCH-32 | 7.00 | |
| | CP-55F | 5.00 | ECCP-35 | 5.00 CPTP-302 | 4.0 | | |
| | CH-33 | 4.00 | CPTP-301 | 4.00 CPTP-303 | 4.0 | | |
| | CH-35 | 4.00 | CPTP-302 | 4.00 CCPC-35 | 4.0 | | |
| | CH-43 | 4.00 | CPTP-303 | 4.00 | | | |
| | CH-45 | 3.00 | | | | | |
| | CPTP-301 | 5.00 | | | | | |
| | CPTP-302 | 4.00 | | | | | |
| | CBC-53F | 5.00 | | | | | |

| Examples | | 316 | 317 | 318 | 319 | 320 | |
|---|---|---|---|---|---|---|---|
| S → N [° C.] | | <−20 | <−20 | <−30 | <−20 | <0 | |
| Clearing point [° C.] | | +88 | +121 | +84 | +90 | +82 | |
| Viscosity [mm²s⁻¹]   20° C. | | 20 | 31 | 20 | 22 | 22 | |
| Δn   (20° C., 589 nm) | | +0.1495 | +0.1306 | +0.1398 | +0.1488 | +0.1582 | |
| $V_{(10,0,20)}$ | | 2.02 | 1.96 | 2.09 | 2.18 | 2.36 | |
| $V_{(50,0,20)}$ | | 2.31 | 2.23 | 2.42 | 2.50 | 2.67 | |
| $V_{(90,0,20)}$ | | 2.80 | 2.67 | 2.94 | 3.02 | 3.18 | |
| Composition [%]: | PCH-2 | 8.00 | ME2N.F | 3.00 PCH-2 | 6.00 ME2N.F | 2.00 PCH-3 | 15.00 |
| | PCH-3 | 17.00 | ME3N.F | 4.00 PCH-3 | 20.00 ME3N.F | 3.00 PCH-5OCF2 | 13.00 |
| | K6 | 6.00 | ME5N.F | 7.00 PCH-4 | 11.00 ME5N.F | 8.00 PTP-35 | 7.00 |
| | K9 | 6.00 | ME7N.F | 8.00 PCH-5 | 11.00 ME7N.F | 7.00 PTP-45 | 7.00 |
| | G9 | 6.00 | HP-3N.F | 6.00 PTP-102 | 7.00 PCH-301 | 15.00 PTP-102 | 7.00 |
| | ME2N.F | 2.00 | PCH-302 | 12.00 PTP-201 | 7.00 PCH-302 | 10.00 PTP-201 | 8.00 |
| | ME3N.F | 2.00 | PCH-501 | 8.00 ECCP-31 | 8.00 ECCP-31 | 8.00 BCH-5OCF3 | 10.00 |

-continued

|  |  |  |  |  |  |  |  |  |  |
|---|---|---|---|---|---|---|---|---|---|
| | PCH-302 | 7.00 | CCH-303 | 5.00 | ECCP-33 | 8.00 | ECCP-32 | 8.00 | ECCP-3OCF3 | 9.00 |
| | PTP-35 | 3.00 | ECCP-31 | 4.00 | ECCP-35 | 8.00 | ECCP-33 | 8.00 | ECCP-5OCF3 | 8.00 |
| | PTP-102 | 3.00 | ECCP-32 | 4.00 | ECCP-3 | 7.00 | ECCP-35 | 7.00 | ECCP-3F | 7.00 |
| | CPTP-302FF | 4.00 | ECCP-33 | 4.00 | ECCP-3F | 7.00 | PTP-302FF | 8.00 | ECCP-3 | 9.00 |
| | ECCP-31 | 7.00 | ECCP-3F | 4.00 | | | CPTP-302FF | 8.00 | | |
| | ECCP-32 | 7.00 | ECCP-5F | 5.00 | | | CPTP-502FF | 8.00 | | |
| | ECCP-33 | 7.00 | CBC-33 | 4.00 | | | | | | |
| | ECCP-35 | 6.00 | CBC-53 | 4.00 | | | | | | |
| | CBC-33 | 5.00 | CBC-33F | 6.00 | | | | | | |
| | CBC-53 | 4.00 | CBC-53F | 6.00 | | | | | | |
| | | | CBC-55F | 6.00 | | | | | | |

| Examples | 321 | 322 | 323 | 324 | 325 |
|---|---|---|---|---|---|
| S → N [° C.] | — | <−40 | <−30 | — | <−30 |
| Clearing point [° C.] | +61 | +85 | +88 | 81.0 | +83 |
| Viscosity [mm²s⁻¹] 20° C. | 48.1 | 21 | 23 | — | 21 |
| Δn (20° C., 589 nm) | +0.2349 | +0.1212 | +0.1169 | +0.1408 | +0.1291 |
| $V_{(10,0,20)}$ | 1.40(2nd) | 2.14 | 1.98 | 1.9 | 1.88 |
| $V_{(50,0,20)}$ | 1.65 | 2.44 | 2.28 | 2.3 | 2.16 |
| $V_{(90,0,20)}$ | 2.06 | 2.92 | 2.76 | 2.7 | 2.60 |
| Composition [%]: K6 | 10.00 | PCH-3 18.00 | PCH-3 22.00 | PCH-2 10.00 | PCH-2 10.00 |
| K12 | 14.00 | PCH-4 16.00 | PCH-4 20.00 | PCH-3 18.00 | PCH-3 19.00 |
| K18 | 45.00 | PCH-5 16.00 | G9 13.00 | PCH-4 14.00 | PCH-4 17.00 |
| M3 | 5.00 | PCH-7 10.00 | HP-3N.F 4.00 | PCH-5 14.00 | BCH-52 8.00 |
| M9 | 8.00 | BCH-32 7.00 | ECCP-31 6.00 | PTP-102 6.00 | PTP-35 7.00 |
| T15 | 8.00 | BCH-52 7.00 | ECCP-32 6.00 | PTP-201 3.00 | ME2N.F 2.00 |
| T-3FN | 10.00 | ECCP-31 7.00 | ECCP-33 6.00 | ECCP-3F 5.00 | ME3N.F 3.00 |
| | | ECCP-32 7.00 | ECCP-35 5.00 | ECCP-5F 5.00 | ECCP-3 8.00 |
| | | ECCP-33 6.00 | CP-3F 8.00 | ECCP-31 6.00 | ECCP-31 7.00 |
| | | ECCP-35 6.00 | CP-5F 5.00 | ECCP-32 6.00 | ECCP-32 7.00 |
| | | | BCH-32 5.00 | ECCP-33 5.00 | ECCP-33 6.00 |
| | | | | CPTP-301 4.00 | ECCP-35 6.00 |
| | | | | CPTP-302 4.00 | |

| Examples | 326 | 327 | 328 | 329 | 330 |
|---|---|---|---|---|---|
| S → N [° C.] | <−40 | <−20 | — | <−20 | <−30 |
| Clearing point [° C.] | +82 | +121 | +72 | +121 | +80 |
| Viscosity [mm²s⁻¹] 20° C. | 21 | 30 | 35.9 | 31 | 22 |
| Δn (20° C., 589 nm) | +0.1463 | +0.1185 | +0.1147 | +0.1119 | +0.1462 |
| $V_{(10,0,20)}$ | 1.87 | 2.07 | 0.81 | 2.09 | 1.94 |
| $V_{(50,0,20)}$ | 2.16 | 2.37 | 1.09 | 2.37 | 2.23 |
| $V_{(90,0,20)}$ | 2.60 | 2.86 | 1.46 | 2.86 | 2.71 |
| Composition [%]: PCH-3 | 18.00 | PCH-2 9.00 | ME2N.F 6.00 | PCH-2 9.00 | PCH-3 18.00 |
| PCH-4 | 10.00 | PCH-3 19.00 | ME3N.F 8.00 | PCH-3 19.00 | PCH-4 11.00 |
| PCH-5 | 7.00 | ME2N.F 2.00 | ME4N.F 17.00 | ME2N.F 2.00 | K6 8.00 |
| K6 | 8.00 | ME3N.F 3.00 | HP-3N.F 8.00 | ME3N.F 3.00 | K9 7.00 |
| K12 | 8.00 | ME5N.F 8.00 | HP-4N.F 10.00 | ME5N.F 8.00 | K12 6.00 |
| D-302 | 7.00 | CCH-303 7.00 | CCH-303 18.00 | CCH-303 7.00 | D-302 7.00 |
| D-402 | 6.00 | ECCP-31 5.00 | CCH-501 13.00 | ECCP-31 5.00 | D-402 6.00 |
| D-501 | 6.00 | ECCP-32 6.00 | CCH-502 9.00 | ECCP-32 6.00 | D-502FF 6.00 |
| ECCP-31 | 6.00 | ECCP-33 4.00 | ECCP-3 11.00 | ECCP-33 4.00 | PTP-102 4.00 |
| ECCP-33 | 6.00 | CH-33 5.00 | | CH-33 5.00 | ECCP-31 6.00 |
| ECCP-35 | 6.00 | CP-33 5.00 | | CH-35 4.00 | ECCP-33 6.00 |
| CPTP-301 | 4.00 | CP-35 4.00 | | CH-43 4.00 | ECCP-35 6.00 |
| CPTP-302 | 4.00 | CCPC-33 5.00 | | CCPC-33 5.00 | CBC-33 4.00 |
| CPTP-303 | 4.00 | CCPC-34 4.00 | | CCPC-34 5.00 | CBC-53 5.00 |
| | | CBC-33F 5.00 | | CBC-33F 5.00 | |
| | | CBC-53F 5.00 | | CBC-53F 5.00 | |
| | | CBC-55F 4.00 | | CBC-55F 4.00 | |

| Examples | 331 | 332 | 333 | 334 | 335 |
|---|---|---|---|---|---|
| S → N [° C.] | <−40 | <−40 | — | — | <−40 |
| Clearing point [° C.] | +78 | +85 | +106 | +90 | +87 |
| Viscosity [mm²s⁻¹] 20° C. | 21 | 22 | — | 21.8 | 22 |
| Δn (20° C., 589 nm) | +0.1398 | +0.1340 | +0.1322 | +0.1303 | +0.1355 |
| $V_{(10,0,20)}$ | 1.80 | 2.02 | 2.51 | 2.02 | 1.85 |
| $V_{(50,0,20)}$ | 2.07 | 2.35 | 2.83 | 2.32 | 2.14 |
| $V_{(90,0,20)}$ | 2.47 | 2.89 | 3.40 | 2.80 | 2.60 |
| Composition [%]: PCH-2 | 8.00 | PCH-2 10.00 | PCH-3 18.00 | PCH-2 8.00 | PCH-2 7.00 |
| PCH-3 | 18.00 | PCH-3 18.00 | PCH-301 8.00 | PCH-3 18.00 | PCH-3 17.00 |
| K6 | 6.00 | PCH-4 14.00 | CCP-3OCF3 9.00 | PCH-4 18.00 | G9 10.00 |
| K9 | 5.00 | PCH-5 13.00 | CCP-5OCF3 8.00 | PCH-5 14.00 | ME2N 5.00 |
| G9 | 9.00 | G9 8.00 | ECCP-3OCF3 8.00 | PYP-53 5.00 | ME2N.F 2.00 |
| ME2N | 3.00 | ECCP-31 6.00 | ECCP-5OCF3 7.00 | ECCP-31 5.00 | ME3N.F 3.00 |
| ME2N.F | 2.00 | ECCP-32 6.00 | ECCP-3F.F 7.00 | ECCP-32 5.00 | HP-3N.F 5.00 |
| ME3N.F | 3.00 | ECCP-33 6.00 | ECCP-3F 6.00 | ECCP-33 5.00 | PCH-302 10.00 |

-continued

|  |  |  |  |  |  |  |  |  |  |
|---|---|---|---|---|---|---|---|---|---|
|  | PCH-302 | 8.00 | ECCP-35 | 6.00 | ECCP-3CF3 | 7.00 | ECCP-35 | 6.00 | CCH-303 | 4.00 |
|  | PTP-102 | 3.00 | CPTP-301 | 5.00 | BCH-3OCF3 | 7.00 | CBC-53 | 4.00 | ECCP-31 | 6.00 |
|  | ECCP-31 | 6.00 | CPTP-302 | 4.00 | PTP-102 | 4.00 | CBC-33F | 4.00 | ECCP-32 | 7.00 |
|  | ECCP-32 | 7.00 | CPTP-303 | 4.00 | PTP-201 | 4.00 | CBC-53F | 3.00 | ECCP-33 | 7.00 |
|  | ECCP-33 | 7.00 |  |  | CPTP-301 | 2.00 | CPTP-301 | 2.00 | ECCP-35 | 5.00 |
|  | ECCP-35 | 5.00 |  |  | CPTP-302 | 2.00 | CPTP-303 | 3.00 | CPTP-301 | 4.00 |
|  | CBC-33F | 5.00 |  |  | CPTP-303 | 3.00 |  |  | CPTP-302 | 4.00 |
|  | CBC-53F | 5.00 |  |  |  |  |  |  | CPTP-303 | 4.00 |

| Examples | 336 | 337 | 338 | 339 | 340 |
|---|---|---|---|---|---|
| S → N [° C.] | <−40 | — | — | <−30 | — |
| Clearing point [° C.] | +84 | 121.0 | +77 | +93 | +71 |
| Viscosity [mm²s⁻¹] 20° C. | 20 | — | 16 | 21 | 23 |
| Δn (20° C., 589 nm) | +0.0997 | +0.1127 | +0.1303 | +0.1492 | +0.1091 |
| $V_{(10,0,20)}$ | 2.03 | 2.0 | 2.11 | 2.12 | 1.33(1st) |
| $V_{(50,0,20)}$ | 2.32 | 2.3 | 2.40 | 2.42 | 1.68 |
| $V_{(90,0,20)}$ | 2.82 | 2.7 | 2.84 | 2.86 | 2.14 |
| Composition [%]: | PCH-2 5.00 | PCH-2 9.00 | PCH-3 6.00 | PCH-2 8.00 | ME2N.F 2.00 |
|  | PCH-3 18.00 | PCH-3 18.00 | K9 10.00 | PCH-3 20.00 | ME3N.F 3.00 |
|  | PCH-4 14.00 | ME2N.F 2.00 | K15 10.00 | PDX-3 8.00 | PCH-3 18.00 |
|  | PCH-5 9.00 | ME3N.F 3.00 | PCH-5F 11.00 | PCH-301 4.00 | PCH-4 17.00 |
|  | ME2N.F 2.00 | ME5N.F 9.00 | PCH-7F 10.00 | D-401 5.00 | PCH-5 17.00 |
|  | ME3N.F 3.00 | CCH-303 7.00 | ECCP-3F 11.00 | D-501 5.00 | CCH-303 5.00 |
|  | CCH-303 7.00 | ECCP-31 4.00 | ECCP-5F 11.00 | PTP-35 5.00 | D-302FF 5.00 |
|  | CCH-502 10.00 | ECCP-32 6.00 | CP-3F 9.00 | PTP-45 4.00 | D-502FF 6.00 |
|  | ECCP-31 5.00 | ECCP-33 4.00 | CP-5F 9.00 | CPTP-301 6.00 | ECCP-3F 8.00 |
|  | ECCP-32 6.00 | CH-33 5.00 | PTP-35 7.00 | CPTP-302 6.00 | ECCP-5F 8.00 |
|  | ECCP-33 5.00 | CH-35 4.00 | CPTP-303 6.00 | CPTP-303 5.00 | ECCP-3 8.00 |
|  | ECCP-35 6.00 | CH-43 5.00 |  | ECCP-31 5.00 | CP-33 3.00 |
|  | CCPC-33 5.00 | CCPC-33 6.00 |  | ECCP-32 5.00 |  |
|  | CCPC-34 5.00 | CCPC-34 5.00 |  | ECCP-33 4.00 |  |
|  |  | CBC-33F 4.00 |  | ECCP-35 5.00 |  |
|  |  | CBC-53F 5.00 |  | ECCP-3 5.00 |  |
|  |  | CBC-55F 4.00 |  |  |  |

| Examples | 341 | 342 | 343 | 344 | 345 |
|---|---|---|---|---|---|
| S → N [° C.] | <−40 | — | — | — | — |
| Clearing point [° C.] | +82 | +70 | +84 | +96 | +90 |
| Viscosity [mm²s⁻¹] 20° C. | 19 | 26 | — | 44 | — |
| Δn (20° C., 589 nm) | +0.1416 | +0.1116 | +0.1090 | +0.1512 | +0.1234 |
| $V_{(10,0,20)}$ | 1.91 | 1.20(2nd) | 1.57 | 1.30(2nd) | 2.36(2nd) |
| $V_{(50,0,20)}$ | 2.16 | 1.54 | 1.98 | 1.48 | 2.69 |
| $V_{(90,0,20)}$ | 2.54 | 1.98 | 2.54 | 1.78 | 3.19 |
| Composition [%]: | PCH-2 10.00 | ME2N.F 2.00 | PCH-2 2.0 | ME2N.F 8.0 | PCH-2 8.0 |
|  | PCH-3 22.00 | ME3N.F 3.00 | PCH-3 18.0 | ME3N.F 10.0 | PCH-3 17.0 |
|  | PCH-4 8.00 | ME5N.F 5.00 | PCH-4 16.0 | ME5N.F 11.0 | PCH-5 14.0 |
|  | PCH-5 15.00 | ME7N.F 5.00 | PCH-5 18.0 | HP-3N.F 6.0 | PCH-302 7.0 |
|  | PTP-102 6.00 | PCH-2 10.00 | CCH-303 5.0 | HP-4N.F 6.0 | I32 8.0 |
|  | PTP-201 6.00 | PCH-3 13.00 | D-502FF 5.0 | HP-5N.F 4.0 | I35 8.0 |
|  | ECCP-3F 3.00 | PCH-4 12.00 | CP-302FF 7.0 | PCH-302 15.0 | I52 8.0 |
|  | ECCP-31 6.00 | CCH-303 9.00 | ECCP-31 5.0 | ECCP-31 4.0 | ECCP-31 6.0 |
|  | ECCP-32 6.00 | D-302FF 5.00 | ECCP-3F 8.0 | ECCP-33 4.0 | ECCP-32 6.0 |
|  | ECCP-33 5.00 | D-502FF 6.00 | ECCP-5F 6.0 | ECCP-35 4.0 | ECCP-3 6.0 |
|  | ECCP-35 5.00 | ECCP-3F 8.00 | ECCP-3 8.0 | BCH-32 9.0 | ECCP-3F 8.0 |
|  | CPTP-302 4.00 | ECCP-5F 8.00 |  | BCH-52 9.0 | CBC-33F 4.0 |
|  | CCPC-33 4.00 | ECCP-3 8.00 |  | BCH-52F 10.0 |  |
|  |  | CBC-33F 3.00 |  |  |  |
|  |  | CBC-53F 3.00 |  |  |  |

| Examples | 346 | 347 | 348 | 349 | 350 |
|---|---|---|---|---|---|
| S → N [° C.] | <−30 | <−30 | — | <−30 | <−30 |
| Clearing point [° C.] | +83 | +88 | +99 | +84 | +115 |
| Viscosity [mm²s⁻¹] 20° C. | 21 | 22 | 20.0 | 24 | 30 |
| Δn (20° C., 589 nm) | +0.1348 | +0.1389 | +0.1190 | +0.1485 | +0.1391 |
| $V_{(10,0,20)}$ | 1.85 | 1.95 | 2.56(2nd) | 1.90 | 2.00 |
| $V_{(50,0,20)}$ | 2.12 | 2.24 | 2.93 | 2.19 | 2.29 |
| $V_{(90,0,20)}$ | 2.52 | 2.70 | 3.52 | 2.66 | 2.75 |
| Composition [%]: | PCH-2 10.00 | PCH-2 10.00 | PCH-2 5.00 | PCH-3 10.00 | PCH-3 10.00 |
|  | PCH-3 19.00 | PCH-3 20.00 | PCH-3 15.00 | ME2N.F 2.00 | ME2N.F 2.00 |
|  | PCH-4 13.00 | PCH-4 13.00 | PCH-5 14.00 | ME3N.F 3.00 | ME3N.F 3.00 |
|  | K9 4.00 | PCH-5 15.00 | I32 8.00 | ME5N.F 7.00 | ME5N.F 6.00 |
|  | BCH-52 8.00 | ME2N 4.00 | I35 8.00 | ME7N.F 7.00 | ME7N.F 6.00 |
|  | PTP-35 7.00 | ECCP-3F 7.00 | I52 8.00 | PCH-301 14.00 | HP-3N.F 6.00 |
|  | ME2N.F 2.00 | ECCP-31 6.00 | D-302FF 5.00 | CCH-301 6.00 | PCH-302 16.00 |
|  | ME3N.F 3.00 | ECCP-32 6.00 | ECCP-31 7.00 | PTP-302FF 5.00 | ECCP-31 5.00 |
|  | ECCP-3 8.00 | ECCP-33 6.00 | ECCP-32 7.00 | PTP-502FF 5.00 | ECCP-32 5.00 |

-continued

|  |  |  |  |  |  |  |  |
|---|---|---|---|---|---|---|---|
| ECCP-31 | 7.00 | CPTP-301 | 5.00 | ECCP-33 | 7.00 | ECCP-31 | 6.00 | ECCP-33 | 5.00 |
| ECCP-32 | 7.00 | CPTP-302 | 4.00 | ECCP-3F | 8.00 | ECCP-32 | 5.00 | I32 | 7.00 |
| ECCP-33 | 6.00 | CPTP-303 | 4.00 | ECCP-3 | 8.00 | ECCP-33 | 6.00 | I52 | 8.00 |
| ECCP-35 | 6.00 | | | | | ECCP-35 | 5.00 | CBC-53 | 6.00 |
| | | | | | | CP-302FF | 5.00 | CBC-33F | 5.00 |
| | | | | | | CPTP-301 | 5.00 | CBC-53F | 5.00 |
| | | | | | | CPTP-302FF | 4.00 | CBC-55F | 5.00 |
| | | | | | | CPTP-502FF | 5.00 | | |

| Examples | 351 | 352 | 353 | 354 | 355 |
|---|---|---|---|---|---|
| S → N [° C.] | <−30 | <−30 | <−40 | <−40 | <−40 |
| Clearing point [° C.] | +86 | +89 | +94 | +73 | +77 |
| Viscosity [mm²s⁻¹]  20° C. | 24 | 23 | 20 | 17 | 18 |
| Δn  (20° C., 589 nm) | +0.1073 | +0.1147 | +0.1517 | +0.1356 | +0.1461 |
| $V_{(10,0,20)}$ | 1.48 | 1.92 | 2.29 | 1.82 | 1.91 |
| $V_{(50,0,20)}$ | 1.86 | 2.21 | 2.63 | 2.08 | 2.19 |
| $V_{(90,0,20)}$ | 2.40 | 2.68 | 3.17 | 2.49 | 2.62 |
| Composition [%]: | PDX-2 6.00 | PCH-3 22.00 | PCH-3 20.0 | K6 6.0 | K6 6.0 |
| | PDX-3 9.00 | PCH-4 23.00 | PCH-4 10.0 | K9 10.0 | K9 10.0 |
| | PCH-3 16.00 | PCH-5 9.00 | PCH-5 15.0 | K15 6.0 | K15 10.0 |
| | PCH-4 11.00 | HP-3N.F 3.00 | CCH-303 8.0 | PCH-2 10.0 | PCH-3 12.0 |
| | ME2N.F 2.00 | PCH-302 2.00 | PTP-102 4.0 | PCH-5F 10.0 | CCH-303 10.0 |
| | ME3N.F 3.00 | ECCP-31 5.00 | PTP-201 5.0 | PCH-7F 6.0 | ECCP-3F 11.0 |
| | CCH-303 8.00 | ECCP-32 5.00 | CPTP-301 6.0 | ECCP-3F 10.0 | ECCP-5F 10.0 |
| | ECCP-31 6.00 | ECCP-33 5.00 | CPTP-302 5.0 | ECCP-5F 10.0 | CP-3F 9.0 |
| | ECCP-32 6.00 | ECCP-35 4.00 | CPTP-303 5.0 | CP-3F 9.0 | CP-5F 9.0 |
| | ECCP-33 6.00 | CP-3F 6.00 | ECCP-31 10.0 | CP-5F 9.0 | PTP-35 4.0 |
| | ECCP-3 6.00 | CP-5F 7.00 | ECCP-33 7.0 | PTP-35 4.0 | PTP-45 4.0 |
| | ECCP-3F 7.00 | BCH-32 5.00 | ECCP-35 8.0 | PTP-45 4.0 | PTP-201 5.0 |
| | CP-3F 7.00 | | | CPTP-303 6.0 | |
| | CP-5F 7.00 | | | | |

| Examples | 356 | 357 | 358 | 359 | 360 |
|---|---|---|---|---|---|
| S → N [° C.] | — | — | — | — | <−30 |
| Clearing point [° C.] | +87 | +87 | +88 | +85 | +81 |
| Viscosity [mm²s⁻¹]  20° C. | 22.2 | | 21.5 | — | 19 |
| Δn  (20° C., 589 nm) | +0.1033 | +0.1078 | +0.1090 | +0.1074 | +0.0997 |
| $V_{(10,0,20)}$ | 1.47(1st) | 1.43(1st) | 1.51(1st) | 1.37(1st) | 1.71(1st) |
| $V_{(50,0,20)}$ | 1.85 | 1.82 | 1.91 | 1.76 | 2.13 |
| $V_{(90,0,20)}$ | 2.36 | 2.36 | 2.44 | 2.30 | 2.72 |
| Composition [%]: | PDX-2 6.00 | PDX-3 9.00 | PCH-3 20.00 | PDX-2 5.00 | PCH-3 14.60 |
| | PDX-3 11.00 | PDX-4 8.00 | PCH-4 11.00 | PCH-3 20.00 | PCH-4 13.80 |
| | PDX-4 10.00 | PDX-5 6.00 | PCH-5 6.00 | PCH-4 9.00 | PCH-5 15.60 |
| | PCH-3 12.00 | PCH-3 20.00 | ME2N.F 2.00 | ME2N.F 2.00 | PCH-302 9.60 |
| | PCH-4 8.00 | PCH-4 9.00 | ME3N.F 3.00 | ME3N.F 3.00 | C-33 5.60 |
| | CCH-303 8.00 | CCH-303 4.00 | ME5N.F 5.00 | ME5N.F 6.00 | C-35 5.60 |
| | ECCP-31 6.00 | ECCP-31 5.00 | CCH-303 10.00 | CCH-303 11.00 | CP-3F 6.40 |
| | ECCP-32 6.00 | ECCP-32 4.00 | ECCP-31 6.00 | ECCP-31 6.00 | CP-5F 6.40 |
| | ECCP-33 6.00 | ECCP-33 5.00 | ECCP-32 5.00 | ECCP-32 5.00 | ECCP-3F 5.60 |
| | ECCP-3 6.00 | ECCP-35 4.00 | ECCP-33 5.00 | ECCP-33 6.00 | ECCP-31 5.60 |
| | ECCP-3F 7.00 | ECCP-3 5.00 | ECCP-3 6.00 | ECCP-3 5.00 | ECCP-33 5.60 |
| | CP-3F 7.00 | ECCP-3F 7.00 | ECCP-3F 7.00 | ECCP-3F 8.00 | CP-33 5.60 |
| | CP-5F 7.00 | CP-3F 7.00 | CP-3F 7.00 | CP-3F 7.00 | |
| | | CP-5F 7.00 | CP-5F 7.00 | CP-5F 7.00 | |

| Examples | 361 | 362 | 363 | 364 |
|---|---|---|---|---|
| S → N [° C.] | <−20 | <−30 | <−40 | <−20 |
| Clearing point [° C.] | +129 | +95 | +85 | +78 |
| Viscosity [mm²s⁻¹]  20° C. | 34 | 21 | 22 | 19 |
| Δn  (20° C., 589 nm) | +0.1381 | +0.1373 | +0.1165 | 0.1031 |
| $V_{(10,0,20)}$ | 2.04 | 2.35 | 2.08 | 2.26 |
| $V_{(50,0,20)}$ | 2.33 | 2.69 | 2.36 | 2.57 |
| $V_{(90,0,20)}$ | 2.84 | 3.22 | 2.85 | 3.15 |
| Composition [%]: | PCH-3 18.00 | PCH-2 8.00 | PCH-3 18.00 | PCH-3 17.00 |
| | ME2N.F 2.00 | PCH-3 17.00 | PCH-4 15.00 | PDX-3 8.00 |
| | ME3N.F 3.00 | PCH-5 8.00 | PCH-5 16.00 | PDX-4 7.00 |
| | ME5N.F 6.00 | G9 8.00 | PCH-7 8.00 | PCH-301 3.00 |
| | ME7N.F 6.00 | ME2N.F 2.00 | BCH-32 5.00 | D-301 10.00 |
| | HP-3N.F 6.00 | PCH-302 6.00 | BCH-52F 5.00 | D-401 10.00 |
| | PCH-302 6.00 | PTP-35 4.00 | ECCP-31 6.00 | D-501 10.00 |
| | CCH-303 5.00 | PTP-102 3.00 | ECCP-32 6.00 | BCH-32 6.00 |
| | ECCP-31 4.00 | CPTP-301 5.00 | ECCP-33 6.00 | ECCP-31 8.00 |
| | ECCP-32 4.00 | ECCP-3F 6.00 | ECCP-3F 8.00 | ECCP-32 7.00 |
| | ECCP-3F 10.00 | ECCP-31 7.00 | ECCP-5F 7.00 | ECCP-33 7.00 |
| | CBC-33 4.00 | ECCP-32 8.00 | | ECCP-35 7.00 |
| | CBC-53 4.00 | ECCP-33 8.00 | | |

-continued

|  |  |  |  |  |
|---|---|---|---|---|
| CBC-55 | 4.00 | CBC-33F | 5.00 |  |
| CBC-33F | 6.00 | CBC-53F | 5.00 |  |
| CBC-53F | 6.00 |  |  |  |
| CBC-55F | 6.00 |  |  |  |

| Examples | 365 | 366 | 367 | 368 | 369 |
|---|---|---|---|---|---|
| S → N [° C.] | <20 | <−40 | <−30 | <0 | <−30 |
| Clearing point [° C.] | +112 | +89 | +76 | +94 | +96 |
| Viscosity [mm²s⁻¹]  20° C. | 26 | 23 | 19 | 21 | 20 |
| Δn (20° C., 589 nm) | +0.1499 | +0.1090 | 0.1093 | +0.1201 | +0.1303 |
| $V_{(10,0,20)}$ | 2.09 | 1.60(1st) | 2.06 | 2.31 | 2.34 |
| $V_{(50,0,20)}$ | 2.31 | 2.07 | 2.37 | 2.60 | 2.66 |
| $V_{(90,0,20)}$ | 2.81 | 2.73 | 2.92 | 3.08 | 3.21 |
| Composition [%]: | ME2N.F 2.00 | PCH-3 18.00 | PCH-3 17.00 | ME2N.F 2.00 | ME2N.F 2.00 |
|  | ME3N.F 3.00 | PCH-4 16.00 | PDX-3 8.00 | ME3N.F 3.00 | ME3N.F 3.00 |
|  | PYP-5N.F 8.00 | PCH-5 18.00 | PDX-4 7.00 | ME5N.F 7.00 | ME5N.F 7.00 |
|  | PYP-6N.F 8.00 | CCH-303 7.00 | PCH-301 3.00 | ME7N.F 6.00 | ME7N.F 6.00 |
|  | HP-3N.F 5.00 | CP-302FF 7.00 | D-301 12.00 | PCH-301 16.00 | PCH-301 15.00 |
|  | PCH-301 10.00 | ECCP-31 6.00 | D-401 12.00 | CCH-303 20.00 | CCH-303 18.00 |
|  | CCH-303 12.00 | ECCP-33 6.00 | D-501 12.00 | ECCP-31 8.00 | ECCP-31 8.00 |
|  | ECCP-31 7.00 | ECCP-3F 8.00 | BCH-52 3.00 | ECCP-32 7.00 | ECCP-32 7.00 |
|  | ECCP-32 7.00 | ECCP-5F 8.00 | ECCP-31 6.00 | ECCP-33 7.00 | ECCP-33 7.00 |
|  | ECCP-33 8.00 | ECCP-3 6.00 | ECCP-32 5.00 | ECCP-35 7.00 | ECCP-35 7.00 |
|  | ECCP-35 8.00 |  | ECCP-33 5.00 | CPTP-301 6.00 | CPTP-301 4.00 |
|  | CPTP-301 6.00 |  | ECCP-35 5.00 | CPTP-302 5.00 | CPTP-302FF 8.00 |
|  | CPTP-302 5.00 |  | CPTP-301 5.00 | CPTP-303 6.00 | CPTP-502FF 8.00 |
|  | CPTP-303 7.00 |  |  |  |  |
|  | CBC-33F 4.00 |  |  |  |  |

| Examples | 370 | 371 | 372 | 373 | 374 |
|---|---|---|---|---|---|
| S → N [° C.] | — | <−30 | — | <0 | <−30 |
| Clearing point [° C.] | +77 | +84 | +75 | +98 | +84 |
| Viscosity [mm²s⁻¹]  20° C. | 14.7 | 24 | 16 | 22 | 24 |
| Δn (20° C., 589 nm) | +0.1042 | +0.1088 | +0.1382 | +0.1011 | +0.1072 |
| $V_{(10,0,20)}$ | 1.77 | 1.46(1st) | 1.98(9.0) | 2.23 | 1.50(1st) |
| $V_{(50,0,20)}$ | 2.20 | 1.88 | 2.26 | 2.49 | 1.89 |
| $V_{(90,0,20)}$ | 2.75 | 2.44 | 2.70 | 2.90 | 2.40 |
| Composition [%]: | PCH-3 20.00 | ME2N.F 2.00 | K6 6.0 | PCH-2 8.00 | ME2N.F 2.00 |
|  | PCH-5F 10.00 | PCH-3 18.00 | K9 10.0 | PCH-3 18.00 | PCH-3 18.00 |
|  | PCH-7F 10.00 | PCH-4 16.00 | K15 10.0 | PCH-4 10.00 | PCH-4 14.00 |
|  | ECCP-3F 13.00 | PCH-5 18.00 | PCH-5F 11.0 | PDX-3 8.00 | PCH-5 18.00 |
|  | ECCP-5F 13.00 | CCH-303 5.00 | PCH-7F 10.0 | CCH-303 7.00 | CCH-303 9.00 |
|  | CP-3F 11.00 | D-502FF 5.00 | ECCP-3F 11.0 | D-501 5.00 | D-502FF 4.00 |
|  | CP-5F 11.00 | CP-302FF 7.00 | ECCP-5F 10.0 | CP-33 5.00 | CP-302FF 7.00 |
|  | PTP-35 6.00 | ECCP-31 5.00 | CP-3F 9.0 | CP-35 5.00 | CP-402FF 4.00 |
|  | PTP-45 6.00 | ECCP-3F 8.00 | CP-5F 9.0 | ECCP-31 6.00 | ECCP-3F 8.00 |
|  |  | ECCP-5F 8.00 | PTP-35 4.0 | ECCP-32 6.00 | ECCP-5F 8.00 |
|  |  | ECCP-3 8.00 | PTP-45 4.0 | ECCP-33 6.00 | ECCP-3 8.00 |
|  |  |  | CPTP-303 6.0 | ECCP-35 6.00 |  |
|  |  |  |  | CCPC-33 5.00 |  |
|  |  |  |  | CCPC-34 5.00 |  |

| Examples | 375 | 376 | 377 | 378 | 379 |
|---|---|---|---|---|---|
| S → N [° C.] | <−40 | — | — | — | — |
| Clearing point [° C.] | +93 | +86 | +88 | +93 | +75 |
| Viscosity [mm²s⁻¹]  20° C. | 21 | 19.9 | 23.8 | 23 | — |
| Δn (20° C., 589 nm) | +0.1475 | +0.1279 | +0.1275 | +0.1243 | +0.1009 |
| $V_{(10,0,20)}$ | 2.12 | 1.91 | — | 2.34(2nd) | — |
| $V_{(50,0,20)}$ | 2.43 | 2.19 | — | 2.68 | — |
| $V_{(90,0,20)}$ | 2.94 | 2.78 | — | 3.23 | — |
| Composition [%]: | PCH-3 15.00 | PCH-2 13.00 | PCH-2 10.00 | PCH-2 8.00 | PCH-3 20.00 |
|  | PDX-3 8.00 | PCH-3 7.00 | PCH-3 20.00 | PCH-3 19.00 | PCH-4 8.00 |
|  | PDX-4 7.00 | G9 10.00 | PCH-4 10.00 | PCH-5 18.00 | PCH-5 8.00 |
|  | PCH-301 4.00 | K9 2.00 | PYP-3N.F 5.00 | I32 8.00 | PCH-5F 10.00 |
|  | D-301 7.00 | PYP-3N.F 5.00 | PYP-5N.F 5.00 | I35 8.00 | PCH-6F 10.00 |
|  | D-401 7.00 | PYP-5N.F 5.00 | D-302FF 4.00 | I52 8.00 | ECCP-3F 10.00 |
|  | D-501 7.00 | PCH-301 10.00 | D-402FF 4.00 | ECCP-31 7.00 | ECCP-5F 10.00 |
|  | PTP-35 5.00 | PCH-501 10.00 | D-502FF 4.00 | ECCP-32 7.00 | CP-3F 6.00 |
|  | PTP-45 4.00 | ECCP-31 6.00 | ECCP-31 6.00 | ECCP-3 6.00 | CP-5F 6.00 |
|  | CPTP-301 6.00 | ECCP-32 6.00 | ECCP-32 6.00 | ECCP-3F 8.00 | ECCP-33 6.00 |
|  | CPTP-302 6.00 | ECCP-33 6.00 | ECCP-33 6.00 | CBC-33F 2.00 | CPTP-303 6.00 |
|  | CPTP-303 5.00 | CBC-33 5.00 | ECCP-35 5.00 |  |  |
|  | ECCP-31 5.00 | CBC-53 5.00 | CBC-53 5.00 |  |  |

-continued

|  |  |  |  |  |  |  |  |
|---|---|---|---|---|---|---|---|
|  | ECCP-32 | 5.00 | CBC-33F | 5.00 | CBC-33F | 4.00 |  |
|  | ECCP-33 | 4.00 | CBC-55F | 5.00 | CBC-55F | 4.00 |  |
|  | ECCP-3 | 5.00 |  |  | CPTP-302FF | 3.00 |  |

| Examples | 380 | 381 | 382 | 383 | 384 |
|---|---|---|---|---|---|
| S → N [° C.] | <−40 | <−40 | — | <−30 | <−40 |
| Clearing point [° C.] | +72 | +74 | +93 | +87 | +94 |
| Viscosity [mm²s⁻¹] 20° C. | 16 | 15 | 21 | 23 | 20 |
| Δn (20° C., 589 nm) | +0.1160 | +0.1082 | +0.1228 | +0.1359 | +0.1510 |
| $V_{(10,0,20)}$ | 1.95 | 2.25 | 2.44(2nd) | 1.88 | 2.26 |
| $V_{(50,0,20)}$ | 2.21 | 2.56 | 2.76 | 2.17 | 2.58 |
| $V_{(90,0,20)}$ | 2.59 | 3.04 | 3.28 | 2.60 | 3.10 |
| Composition [%]: | PCH-3 20.00 | PCH-3 20.00 | PCH-2 6.0 | PCH-2 10.00 | PCH-3 22.0 |
|  | PCH-4 7.00 | PCH-5F 10.00 | PCH-3 16.0 | PCH-3 20.0 | PCH-4 20.0 |
|  | PCH-5 8.00 | PCH-7F 10.00 | PCH-5 13.0 | PCH-5 17.0 | PCH-5 3.0 |
|  | PCH-5F 10.00 | ECCP-3F 12.00 | PCH-302 8.0 | ME2N 5.0 | CCH-303 8.0 |
|  | PCH-6F 10.00 | ECCP-5F 12.00 | I32 8.0 | ME3N 5.0 | PTP-102 4.0 |
|  | ECCP-3F 10.00 | CP-3F 11.00 | I35 9.0 | CCH-303 4.0 | PTP-201 4.0 |
|  | ECCP-5F 10.00 | CP-5F 10.00 | I52 9.0 | ECCP-3F 5.0 | CPTP-301 6.0 |
|  | CP-3F 6.00 | PTP-35 6.00 | ECCP-31 7.0 | ECCP-5F 5.0 | CPTP-302 5.0 |
|  | CP-5F 6.00 | PTP-45 6.00 | ECCP-32 7.0 | ECCP-31 6.0 | CPTP-303 6.0 |
|  | PTP-35 5.00 | PTP-201 3.00 | ECCP-3 5.0 | ECCP-32 6.0 | ECCP-31 7.0 |
|  | CPTP-301 4.00 |  | ECCP-3F 8.0 | ECCP-33 5.0 | ECCP-33 7.0 |
|  | CPTP-303 4.00 |  | CBC-33F 4.0 | CPTP-301 4.0 | ECCP-35 8.0 |
|  |  |  |  | CPTP-302 4.0 |  |
|  |  |  |  | CPTP-303 4.0 |  |

| Examples | 385 | 386 | 387 | 388 | 389 |
|---|---|---|---|---|---|
| S → N [° C.] | — | <−40 | <0 | <−20 | <−30 |
| Clearing point [° C.] | +85 | +71 | +94 | +124 | +91 |
| Viscosity [mm²s⁻¹] 20° C. | — | 17 | 43 | 33 | 22 |
| Δn (20° C., 589 nm) | +0.1157 | +0.1145 | +0.1532 | +0.1274 | +0.1512 |
| $V_{(10,0,20)}$ | 2.28(2nd) | 1.86 | 1.27 | 1.99 | 2.02 |
| $V_{(50,0,20)}$ | 2.60 | 2.14 | 1.47 | 2.25 | 2.30 |
| $V_{(90,0,20)}$ | 3.15 | 2.59 | 1.80 | 2.64 | 2.82 |
| Composition [%]: | PCH-3 15.0 | ME2N.F 2.0 | ME2N.F 4.00 | PCH-3 10.00 | PCH-2 8.00 |
|  | PCH-4 15.0 | ME3N.F 3.0 | ME3N.F 6.00 | ME2N.F 2.00 | PCH-3 16.00 |
|  | PCH-5 14.0 | PCH-3 10.0 | ME4N.F 10.00 | ME3N.F 3.00 | PCH-4 10.00 |
|  | PCH-302 8.0 | PYP-3F 9.0 | ME5N.F 10.00 | ME5N.F 6.00 | PCH-5 12.00 |
|  | CCH-303 5.0 | PYP-5F 9.0 | HP-3N.F 10.00 | ME7N.F 6.00 | BCH-5 8.00 |
|  | BCH-32 9.0 | PCH-5F 9.0 | HP-4N.F 6.00 | HP-3N.F 6.00 | BCH-32 9.00 |
|  | BCH-52 9.0 | PCH-7F 9.0 | HP-5N.F 5.00 | PCH-302 12.00 | BCH-52 8.00 |
|  | ECCP-31 5.0 | ECCP-3F 10.0 | PCH-302 20.00 | BCH-32 8.00 | I32 5.00 |
|  | ECCP-32 5.0 | ECCP-5F 10.0 | ECCP-33 5.00 | ECCP-31 5.00 | ECCP-31 3.00 |
|  | ECCP-33 5.0 | CP-3F 9.0 | ECCP-35 5.00 | ECCP-32 6.00 | ECCP-32 3.00 |
|  | ECCP-3F 10.0 | CP-5F 9.0 | BCH-32 10.00 | ECCP-33 6.00 | ECCP-33 3.00 |
|  |  | CPTP-301 5.0 | BCH-52 10.00 | CH-33 4.00 | ECCP-3F 3.00 |
|  |  | CPTP-303 5.0 | CPTP-301 3.00 | CH-35 4.00 | ECCP-5F 3.00 |
|  |  |  |  | CH-43 3.00 | PTP-35 3.00 |
|  |  |  |  | CH-45 4.00 | PTP-102 6.00 |
|  |  |  |  | CBC-33F 5.00 |  |
|  |  |  |  | CBC-53F 5.00 |  |

| Examples | 390 | 391 | 392 | 393 | 394 |
|---|---|---|---|---|---|
| S → N [° C.] | <20 | <−30 | — | <−20 | — |
| Clearing point [° C.] | +88 | +85 | +92 | +84 | +91 |
| Viscosity [mm²s⁻¹] 20° C. | 22 | 22 | — | 21 | — |
| Δn (20° C., 589 nm) | 0.1553 | +0.1290 | +0.1235 | 0.1029 | +0.1156 |
| $V_{(10,0,20)}$ | 1.86 | 1.88 | 2.38(2nd) | 1.86 | 2.06 |
| $V_{(50,0,20)}$ | 2.12 | 2.15 | 2.70 | 2.12 | 2.36 |
| $V_{(90,0,20)}$ | 2.51 | 2.62 | 3.20 | 2.57 | 2.85 |
| Composition [%]: | PCH-3 14.00 | PCH-2 10.0 | PCH-2 7.0 | PCH-3 14.00 | PCH-3 22.0 |
|  | ME2N.F 2.00 | PCH-3 20.0 | PCH-3 17.0 | ME2N.F 2.00 | PCH-4 23.0 |
|  | ME3N.F 3.00 | PCH-4 10.0 | PCH-5 16.0 | ME3N.F 3.00 | PCH-5 9.0 |
|  | ME4N.F 7.00 | PYP-3N.F 4.0 | PCH-302 5.0 | ME4N.F 7.00 | ECCP-3 5.0 |
|  | ME5N.F 7.00 | PYP-5N.F 5.0 | I32 8.0 | ME5N.F 7.00 | PCH-53 2.0 |
|  | PCH-301 8.00 | PCH-301 11.0 | I35 8.0 | PCH-301 8.00 | ECCP-31 4.0 |
|  | PTP-35 7.00 | ECCP-31 6.0 | I52 6.0 | CCH-301 8.00 | ECCP-32 5.0 |
|  | PTP-45 7.00 | ECCP-32 6.0 | ECCP-31 5.0 | CCH-303 9.00 | ECCP-33 5.0 |
|  | ECCP-31 8.00 | ECCP-33 8.0 | ECCP-32 5.0 | ECCP-31 6.00 | ECCP-35 2.0 |
|  | ECCP-32 8.00 | ECCP-35 8.0 | ECCP-3 5.0 | ECCP-32 6.00 | CP-3F 10.0 |
|  | ECCP-33 8.00 | CBC-33F 5.0 | ECCP-3F 8.0 | ECCP-33 6.00 | CP-5F 7.0 |
|  | ECCP-35 8.00 | CBC-53F 5.0 | CBC-33F 5.0 | ECCP-35 4.00 | BCH-32 6.0 |

-continued

|  |  |  |  |  |  |  |  |  |
|---|---|---|---|---|---|---|---|---|
| CPTP-301 | 5.00 | CBC-55F | 4.0 |  |  | CP-33 | 5.00 |  |
| CPTP-302 | 4.00 | CPTP-302 | 3.0 |  |  | CP-35 | 5.00 |  |
| CPTP-303 | 4.00 |  |  |  |  | CP-43 | 5.00 |  |
|  |  |  |  |  |  | CBC-33 | 3.00 |  |

| Examples | 395 | 396 | 397 | 398 | 399 |
|---|---|---|---|---|---|
| S → N [° C.] | — | <−40 | <0 | <−30 | <−30 |
| Clearing point [° C.] | +90 | +87 | +96 | 76 | +90 |
| Viscosity [mm²s⁻¹] 20° C. | 21.0 | 16 | 21 | 15 | 21 |
| Δn (20° C., 589 nm) | +0.1284 | +0.1222 | +0.1104 | +0.1115 | +0.1074 |
| $V_{(10,0,20)}$ | — | 2.12 | 2.14 | 2.15 | 2.21 |
| $V_{(50,0,20)}$ | — | 2.42 | 2.42 | 2.41 | 2.52 |
| $V_{(90,0,20)}$ | — | 2.89 | 2.89 | 2.82 | 3.04 |
| Composition [%]: | PCH-2 10.00 | PCH-3 18.00 | PCH-2 8.00 | PCH-3 10.00 | PCH-2 8.00 |
|  | PCH-3 20.00 | PCH-301 8.00 | PCH-3 21.00 | PYP-3F 10.00 | PCH-3 20.00 |
|  | PCH-4 10.00 | PYP-3F 5.00 | ME2N.F 2.00 | PYP-5F 9.00 | PCH-4 10.00 |
|  | PYP-3N.F 4.00 | PYP-5OCF3 5.00 | ME3N.F 4.00 | PCH-5F 9.00 | PDX-3 8.00 |
|  | PYP-5N.F 5.00 | PYP-7OCF3 5.00 | CCH-303 5.00 | PCH-7F 9.00 | CCH-303 7.00 |
|  | PCH-501 11.00 | CCP-3OCF3 9.00 | PCH-501 6.00 | ECCP-3F 13.00 | CCH-502 7.00 |
|  | ECCP-31 6.00 | CCP-5OCF3 8.00 | D-401 6.00 | ECCP-5F 12.00 | CP-33 4.00 |
|  | ECCP-32 6.00 | ECCP-3OCF3 8.00 | D-501 6.00 | CP-3F 9.00 | CP-35 3.00 |
|  | ECCP-33 6.00 | ECCP-5OCF3 7.00 | CP-33 8.00 | CP-5F 9.00 | ECCP-31 5.00 |
|  | ECCP-35 6.00 | ECCP-3F.F 5.00 | ECCP-31 6.00 | CPTP-301 5.00 | ECCP-32 6.00 |
|  | CBC-33 4.00 | ECCP-3F 5.00 | ECCP-32 6.00 | CPTP-303 5.00 | ECCP-33 6.00 |
|  | CBC-53 4.00 | BCH-3OCF3 7.00 | ECCP-33 6.00 |  | ECCP-35 6.00 |
|  | CBC-53F 5.00 | CPTP-302FF 5.00 | ECCP-35 6.00 |  | CCPC-33 5.00 |
|  | CPTP-302 3.00 | CPTP-502FF 5.00 | CBC-33 5.00 |  | CBC-53F 5.00 |
|  |  |  | CBC-53 5.00 |  |  |

| Examples | 400 | 401 | 402 | 403 | 404 |
|---|---|---|---|---|---|
| S → N [° C.] | <0 | <−30 | <−40 | — | <−30 |
| Clearing point [° C.] | +87 | +77 | +81 | 67.0 | +81 |
| Viscosity [mm²s⁻¹] 20° C. | 21 | 21 | 21 | — | 22 |
| Δn (20° C., 589 nm) | +0.1513 | +0.1464 | +0.1471 | +0.1688 | +0.1463 |
| $V_{(10,0,20)}$ | 1.96 | 1.82 | 1.87 | 1.4 | 1.85 |
| $V_{(50,0,20)}$ | 2.23 | 2.10 | 2.16 | 1.6 | 2.13 |
| $V_{(90,0,20)}$ | 2.65 | 2.54 | 2.62 | 1.9 | 2.55 |
| Composition [%]: | PCH-2 8.00 | PCH-2 7.00 | PCH-3 18.00 | ME2N.F 2.00 | PCH-2 7.00 |
|  | PCH-3 19.00 | PCH-3 12.00 | PCH-4 10.00 | ME3N.F 3.00 | PCH-3 13.00 |
|  | K6 6.00 | K6 7.00 | K6 8.00 | ME5N.F 8.00 | K6 7.00 |
|  | K9 6.00 | K9 7.00 | K9 7.00 | ME7N.F 10.00 | K9 7.00 |
|  | G9 6.00 | K15 4.00 | K12 7.00 | K6 6.00 | K15 3.00 |
|  | ME2N.F 2.00 | G9 9.00 | D-302 7.00 | K9 8.00 | G9 9.00 |
|  | ME3N.F 3.00 | ME2N 3.00 | D-402 6.00 | K15 14.00 | ME2N 3.00 |
|  | PCH-302 4.00 | ME2N.F 2.00 | D-501 6.00 | BCH-5 7.00 | ME2N.F 2.00 |
|  | PTP-35 3.00 | ME3N.F 3.00 | PTP-102 4.00 | T15 5.00 | ME3N.F 3.00 |
|  | PTP-102 3.00 | PCH-302 8.00 | ECCP-31 6.00 | DR-31 9.00 | PCH-302 5.00 |
|  | CPTP-302FF 4.00 | PTP-102 3.00 | ECCP-33 6.00 | DR-41 9.00 | PTP-502FF 4.00 |
|  | ECCP-31 7.00 | ECCP-31 6.00 | ECCP-35 6.00 | DR-51 9.00 | ECCP-31 6.00 |
|  | ECCP-32 7.00 | ECCP-32 7.00 | CBC-33 4.00 | CBC-33F 5.00 | ECCP-32 7.00 |
|  | ECCP-33 7.00 | ECCP-33 7.00 | CBC-53 5.00 | CBC-53F 5.00 | ECCP-33 7.00 |
|  | ECCP-35 6.00 | ECCP-35 5.00 |  |  | ECCP-35 5.00 |
|  | CBC-33 5.00 | CBC-33F 5.00 |  |  | CBC-33F 6.00 |
|  | CBC-53 4.00 | CBC-53F 5.00 |  |  | CBC-53F 6.00 |

| Examples | 405 | 406 | 407 | 408 | 409 |
|---|---|---|---|---|---|
| S → N [° C.] | <−40 | <−20 | — | <0 | <−20 |
| Clearing point [° C.] | +90 | +88 | +73 | +87 | +91 |
| Viscosity [mm²s⁻¹] 20° C. | 22 | 25 | 21 | 22 | 16 |
| Δn (20° C., 589 nm) | +0.1329 | +0.0996 | +0.1082 | +0.1347 | +0.1254 |
| $V_{(10,0,20)}$ | 1.99 | 1.92 | 1.44(1st) | 1.91 | 2.12 |
| $V_{(50,0,20)}$ | 2.28 | 2.16 | 1.81 | 2.19 | 2.42 |
| $V_{(90,0,20)}$ | 2.78 | 2.60 | 2.32 | 2.62 | 2.89 |
| Composition [%]: | PCH-3 18.00 | PCH-3 10.00 | ME2N.F 2.00 | PCH-2 10.00 | PCH-3 18.00 |
|  | PCH-4 10.00 | ME2N.F 2.00 | PCH-3 16.00 | PCH-3 20.00 | PCH-301 8.00 |
|  | PCH-5 8.00 | ME3N.F 3.00 | PCH-4 15.00 | PCH-4 10.00 | PYP-3F 5.00 |
|  | K6 8.00 | ME5N.F 4.00 | PCH-5 16.00 | K6 10.00 | PYP-5OCF3 5.00 |
|  | K12 6.00 | ME7N.F 7.00 | PCH-302 10.00 | K9 5.00 | PYP-7OCF3 5.00 |
|  | D-302 7.00 | D-302FF 6.00 | D-302FF 6.00 | HP-3N.F 2.00 | CCP-3OCF3 9.00 |
|  | D-402 6.00 | D-402FF 6.00 | D-502FF 6.00 | ECCP-3 11.00 | CCP-5OCF3 8.00 |
|  | D-501 6.00 | CCH-301 9.00 | ECCP-31 5.00 | ECCP-31 8.00 | ECCP-3OCF3 8.00 |
|  | ECCP-31 6.00 | CCH-303 9.00 | ECCP-3F 8.00 | ECCP-32 8.00 | ECCP-5OCF3 7.00 |
|  | ECCP-33 6.00 | ECCP-31 6.00 | ECCP-5F 8.00 | ECCP-33 8.00 | ECCP-3F.F 5.00 |
|  | ECCP-35 6.00 | ECCP-32 6.00 | ECCP-3 8.00 | ECCP-35 8.00 | ECCP-3F 5.00 |
|  | CBC-33 4.00 | ECCP-33 6.00 | 5.00 |  | BCH-3OCF3 7.00 |
|  | CBC-53 5.00 | ECCP-35 6.00 | 6.00 |  | CPTP-301 3.00 |

-continued

|  |  | CBC-55 | 4.00 | CP-33F | 5.00 |  |  | CPTP-302 | 3.00 |
|--|--|--------|------|--------|------|--|--|----------|------|
|  |  |        |      | CP-35F | 4.00 |  |  | CPTP-303 | 4.00 |
|  |  |        |      | CP-302FF | 6.00 |  |  |        |      |
|  |  |        |      | CCPC-33 | 3.00 |  |  |         |      |

| Examples |  | 410 |  | 411 |  | 410 |  | 412 |  | 413 |  |
|----------|--|-----|--|-----|--|-----|--|-----|--|-----|--|
| S → N [° C.] |  | <−40 |  | — |  | <−40 |  | <−40 |  | — |  |
| Clearing point [° C.] |  | +83 |  | +90 |  | +88 |  | +82 |  | +82 |  |
| Viscosity [mm²s⁻¹] 20° C. |  | 20 |  | 21 |  | 21 |  | 21 |  | 20.1 |  |
| Δn (20° C., 589 nm) |  | +0.1561 |  | +0.1168 |  | +0.1468 |  | +0.1003 |  | +0.1241 |  |
| $V_{(10,0,20)}$ |  | 1.94 |  | 2.18 |  | 1.98 |  | 1.88 |  | 1.85 |  |
| $V_{(50,0,20)}$ |  | 2.23 |  | 2.49 |  | 2.23 |  | 2.12 |  | 2.12 |  |
| $V_{(90,0,20)}$ |  | 2.69 |  | 2.99 |  | 2.70 |  | 2.55 |  | 2.56 |  |
| Composition [%]: | PCH-2 | 8.00 | PCH-3 | 20.00 | PCH-2 | 9.00 | PCH-3 | 11.00 | PCH-2 | 17.00 |
|  | PCH-3 | 17.00 | PCH-4 | 16.00 | PCH-3 | 16.00 | ME2N.F | 2.00 | PCH-3 | 15.00 |
|  | K6 | 6.00 | PCH-5 | 15.00 | PCH-4 | 11.00 | ME3N.F | 3.00 | PYP-3N.F | 5.00 |
|  | K9 | 6.00 | PTP-201 | 4.00 | PCH-5 | 12.00 | ME5N.F | 7.00 | PYP-5N.F | 5.00 |
|  | G9 | 6.00 | ECCP-31 | 7.00 | BCH-5 | 8.00 | ME7N.F | 7.00 | PCH-304 | 10.00 |
|  | ME2N.F | 2.00 | ECCP-32 | 7.00 | BCH-32 | 8.00 | PCH-301 | 10.00 | PCH-501 | 12.00 |
|  | ME3N.F | 2.00 | ECCP-33 | 7.00 | BCH-52 | 8.00 | CCH-301 | 9.00 | ECCP-31 | 6.00 |
|  | PCH-302 | 6.00 | ECCP-35 | 7.00 | ECCP-3F | 6.00 | CCH-303 | 9.00 | ECCP-32 | 6.00 |
|  | PTP-35 | 5.00 | ECCP-3F | 7.00 | ECCP-5F | 6.00 | ECCP-31 | 6.00 | ECCP-33 | 6.00 |
|  | PTP-102 | 5.00 | CP-3F | 8.00 | ECCP-33 | 6.00 | ECCP-32 | 6.00 | CBC-33 | 5.00 |
|  | CPTP-302FF | 4.00 | CPTP-301 | 2.00 | PTP-35 | 6.00 | ECCP-33 | 5.00 | CBC-53 | 5.00 |
|  | ECCP-31 | 8.00 |  |  | PTP-102 | 4.00 | ECCP-35 | 5.00 | CBC-33F | 4.00 |
|  | ECCP-32 | 8.00 |  |  |  |  | CP-33F | 6.00 | CBC-55F | 4.00 |
|  | ECCP-33 | 7.00 |  |  |  |  | CP-35F | 6.00 |  |  |
|  | CBC-33F | 5.00 |  |  |  |  | CP-55F | 5.00 |  |  |
|  | CBC-53F | 5.00 |  |  |  |  | CBC-53F | 3.00 |  |  |

| Examples |  | 414 |  | 415 |  | 416 |  | 417 |  | 418 |  |
|----------|--|-----|--|-----|--|-----|--|-----|--|-----|--|
| S → N [° C.] |  | <−40 |  | <−30 |  | <−40 |  | — |  | <−40 |  |
| Clearing point [° C.] |  | +83 |  | +70 |  | +91 |  | +79 |  | +90 |  |
| Viscosity [mm²s⁻¹] 20° C. |  | 19 |  | 42 |  | 22 |  | 16.2 |  | 22 |  |
| Δn (20° C., 589 nm) |  | +0.1258 |  | +0.1153 |  | +0.1150 |  | +0.1523 |  | +0.1150 |  |
| $V_{(10,0,20)}$ |  | 2.23 |  | 0.83 |  | 2.06 |  | 2.44 |  | 2.01 |  |
| $V_{(50,0,20)}$ |  | 2.54 |  | 1.12 |  | 2.35 |  | 2.77 |  | 2.31 |  |
| $V_{(90,0,20)}$ |  | 3.06 |  | 1.50 |  | 2.81 |  | 3.29 |  | 2.79 |  |
| Composition [%]: | PCH-3 | 13.00 | ME2N.F | 6.00 | PCH-3 | 22.00 | PCH-3 | 10.00 | PCH-3 | 22.00 |
|  | PDX-3 | 8.00 | ME3N.F | 8.00 | PCH-4 | 20.00 | PCH-5OCF2 | 15.00 | PCH-4 | 20.00 |
|  | PDX-4 | 7.00 | ME4N.F | 17.00 | PCH-5 | 7.00 | PTP-35 | 10.00 | PCH-5 | 5.00 |
|  | PCH-301 | 10.00 | HP-2N.F | 10.00 | EHP-3F.F | 6.00 | PTP-45 | 10.00 | EHP-3F.F | 11.00 |
|  | D-301 | 8.00 | HP-3N.F | 8.00 | BCH-32 | 8.00 | PTP-201 | 10.00 | BCH-32 | 8.00 |
|  | D-401 | 7.00 | CCH-303 | 18.00 | ECCP-31 | 6.00 | BCH-5OCF3 | 10.00 | ECCP-31 | 6.00 |
|  | D-501 | 8.00 | CCH-501 | 13.00 | ECCP-32 | 6.00 | ECCP-3OCF3 | 9.00 | ECCP-32 | 6.00 |
|  | CP-33 | 5.00 | CCH-502 | 9.00 | ECCP-33 | 5.00 | ECCP-5OCF3 | 9.00 | ECCP-33 | 6.00 |
|  | CP-35 | 5.00 | ECCP-3 | 11.00 | ECCP-35 | 5.00 | ECCP-3F | 8.00 | ECCP-35 | 5.00 |
|  | PTP-35 | 3.00 |  |  | ECCP-3F | 10.00 | ECCP-3 | 9.00 | ECCP-3F | 8.00 |
|  | PTP-45 | 3.00 |  |  | CP-3F | 5.00 |  |  | CP-3F | 3.00 |
|  | CPTP-301 | 5.00 |  |  |  |  |  |  |  |  |
|  | CPTP-302 | 5.00 |  |  |  |  |  |  |  |  |
|  | ECCP-31 | 5.00 |  |  |  |  |  |  |  |  |
|  | ECCP-32 | 4.00 |  |  |  |  |  |  |  |  |
|  | ECCP-33 | 4.00 |  |  |  |  |  |  |  |  |

| Examples |  | 419 |  | 420 |  | 421 |  | 422 |  | 423 |  |
|----------|--|-----|--|-----|--|-----|--|-----|--|-----|--|
| S → N [° C.] |  | <−40 |  | <−20 |  | <−20 |  | <0 |  | — |  |
| Clearing point [° C.] |  | +82 |  | +87 |  | +96 |  | +86 |  | +120 |  |
| Viscosity [mm²s⁻¹] 20° C. |  | 19 |  | 20 |  | 20 |  | 18 |  | 32 |  |
| Δn (20° C., 589 nm) |  | +0.1098 |  | +0.1496 |  | +0.1572 |  | +0.1564 |  | +0.1330 |  |
| $V_{(10,0,20)}$ |  | 1.68(1st) |  | 2.03 |  | 2.23 |  | 2.33 |  | 2.34 |  |
| $V_{(50,0,20)}$ |  | 2.13 |  | 2.32 |  | 2.64 |  | 2.66 |  | 2.68 |  |
| $V_{(90,0,20)}$ |  | 2.78 |  | 2.78 |  | 3.05 |  | 3.18 |  | 3.27 |  |
| Composition [%]: | PCH-2 | 6.00 | PCH-2 | 8.00 | ME2N.F | 2.00 | ME2N.F | 2.00 | PCH-3 | 20.00 |
|  | PCH-3 | 20.00 | PCH-3 | 17.00 | ME3N.F | 3.00 | ME3N.F | 3.00 | PCH-4 | 13.00 |
|  | PCH-4 | 11.00 | K6 | 6.00 | ME5N.F | 8.00 | ME5N.F | 7.00 | PCH-5 | 16.00 |
|  | PCH-5 | 11.00 | K9 | 6.00 | ME7N.F | 7.00 | PTP-35 | 8.00 | PCH-7 | 8.00 |
|  | PCH-301 | 10.00 | G9 | 7.00 | PCH-301 | 15.00 | PTP-45 | 8.00 | ECCP-3 | 7.00 |
|  | ECCP-31 | 7.00 | ME2N.F | 2.00 | PCH-302 | 10.00 | PCH-301 | 15.00 | ECCP-3F | 9.00 |
|  | ECCP-32 | 7.00 | ME3N.F | 2.00 | ECCP-31 | 8.00 | ECCP-31 | 7.00 | CBC-33 | 5.00 |
|  | ECCP-33 | 7.00 | PCH-302 | 6.00 | ECCP-32 | 8.00 | ECCP-32 | 7.00 | CBC-55 | 4.00 |
|  | ECCP-35 | 7.00 | PTP-35 | 3.00 | ECCP-33 | 8.00 | ECCP-33 | 8.00 | CBC-33F | 6.00 |
|  | ECCP-3 | 7.00 | PTP-102 | 3.00 | ECCP-35 | 7.00 | ECCP-35 | 8.00 | CBC-53F | 6.00 |
|  | ECCP-3F | 7.00 | CPTP-302FF | 4.00 | PTP-102 | 4.00 | ECCP-3 | 15.00 | CBC-55F | 6.00 |

-continued

|  |  |  |  |  |  |
|---|---|---|---|---|---|
| ECCP-31 | 7.00 | CPTP-301 | 8.00 | PTP-102 | 6.00 |
| ECCP-32 | 7.00 | CPTP-302 | 8.00 | PTP-201 | 6.00 |
| ECCP-33 | 7.00 |  |  |  |  |
| ECCP-35 | 6.00 |  |  |  |  |
| CBC-33 | 5.00 |  |  |  |  |
| CBC-53 | 4.00 |  |  |  |  |

| Examples |  | 424 | 425 |  | 426 |  | 427 |  | 428 |  |
|---|---|---|---|---|---|---|---|---|---|---|
| S → N [° C.] |  | <0 | <-20 |  | <-40 |  | <-40 |  | <-30 |  |
| Clearing point [° C.] |  | 78 | 82 |  | +92 |  | +85 |  | +87 |  |
| Viscosity [mm²s⁻¹] 20° C. |  | 19 | 21 |  | 22 |  | 20 |  | 23 |  |
| $\Delta n$ (20° C., 589 nm) |  | +0.1616 | +0.1609 |  | +0.1046 |  | +0.1272 |  | +0.1090 |  |
| $V_{(10,0,20)}$ |  | 2.15 | 2.06 |  | 1.63(1st) |  | 2.03 |  | 1.59(1st) |  |
| $V_{(50,0,20)}$ |  | 2.44 | 2.33 |  | 2.02 |  | 2.29 |  | 1.98 |  |
| $V_{(90,0,20)}$ |  | 2.87 | 2.71 |  | 2.55 |  | 2.75 |  | 2.57 |  |
| Composition [%]: | K6 | 8.00 | PYP-3N.F | 4.00 | PCH-3 | 20.00 | PCH-3 | 15.00 | ME2N.F | 2.00 |
|  | K9 | 10.00 | PYP-5N.F | 4.00 | PCH-4 | 18.00 | PCH-4 | 15.00 | PCH-3 | 18.00 |
|  | K12 | 6.00 | PYP-6N.F | 4.00 | ME2N.F | 2.00 | PCH-5 | 14.00 | PCH-4 | 16.00 |
|  | K15 | 10.00 | PYP-7N.F | 5.00 | ME3N.F | 3.00 | K15 | 8.00 | PCH-5 | 18.00 |
|  | PCH-301 | 8.00 | PYP-32 | 5.00 | CCH-303 | 12.00 | CCH-303 | 5.00 | CCH-303 | 7.00 |
|  | ECCP-31 | 8.00 | PYP-33 | 5.00 | ECCP-31 | 5.00 | BCH-32 | 9.00 | CP-302FF | 7.00 |
|  | ECCP-32 | 8.00 | PTP-34 | 4.00 | ECCP-32 | 5.00 | BCH-52 | 9.00 | ECCP-31 | 4.00 |
|  | ECCP-33 | 8.00 | PTP-35 | 4.00 | ECCP-33 | 5.00 | ECCP-31 | 5.00 | ECCP-33 | 4.00 |
|  | ECCP-35 | 8.00 | PTP-45 | 4.00 | ECCP-3 | 7.00 | ECCP-32 | 5.00 | ECCP-3F | 8.00 |
|  | ECCP-3 | 10.00 | PCH-301 | 10.00 | ECCP-3F | 7.00 | ECCP-33 | 5.00 | ECCP-5F | 8.00 |
|  | PYP-32 | 5.00 | ECCP-31 | 7.00 | CP-3F | 8.00 | ECCP-3F | 10.00 | ECCP-3 | 8.00 |
|  | PYP-33 | 5.00 | ECCP-32 | 8.00 | CP-5F | 8.00 |  |  |  |  |
|  | PTP-35 | 6.00 | ECCP-33 | 8.00 |  |  |  |  |  |  |
|  |  |  | ECCP-35 | 8.00 |  |  |  |  |  |  |
|  |  |  | ECCP-3 | 10.00 |  |  |  |  |  |  |
|  |  |  | PTP-201 | 5.00 |  |  |  |  |  |  |
|  |  |  | CPTP-301 | 5.00 |  |  |  |  |  |  |

What is claimed is:

1. A supertwist liquid crystal display having two plane-parallel carrier plates which, with an edging, form a cell, a nematic liquid crystal mixture of positive dielectric anisotropy in the cell, electrode layers with superimposed orientation layers on the insides of the carrier plates, an angle of incidence between the longitudinal axis of the molecules on the surface of the carrier plates and the carrier plates of about 1 degree to 30 degrees and a twisting angle of the liquid crystal mixture in the cell from orientation layer to orientation layer, according to the amount, of between 180 and 360°, wherein the nematic liquid crystal mixture comprises a) at least one component of group A, compounds of formula AIII to AVI:

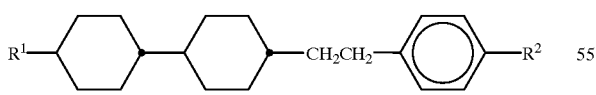

AIII

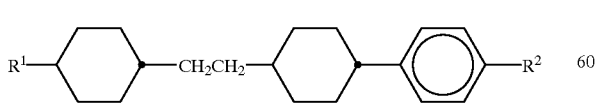

AIV

AV

AVI wherein $R^1$ and $R^2$ each independently of one another are each R and R is alkyl having 1–12 C atoms, wherein one or two non-adjacent $CH_2$ groups can also be replaced by —O—, —CH=CH—, —CO—, —O—CO— or —CO—O—, b) at least one component of group B1, compounds of the formula BI to BIV:

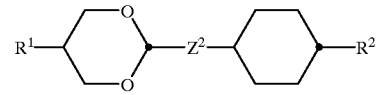

BI

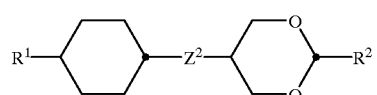

BII

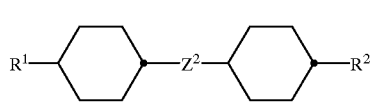

BIII

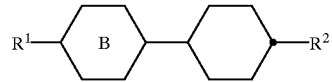

BIV wherein $R^1$ and $R^2$ each independently of one another have the meaning given for R, $Z^2$ is —CH$_2$CH$_2$—, —CO—O—, —O—CO— or a single bond and

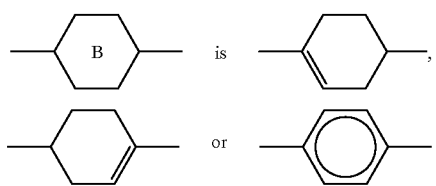

optionally at least one component of group B2, compounds of formula BV to BVII:

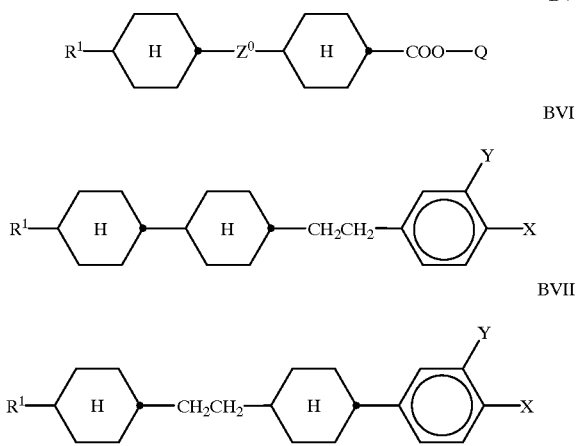

wherein $R^1$ has the meaning given for R, $Z^0$ is —CH$_2$CH$_2$— or a single bond, and Q is

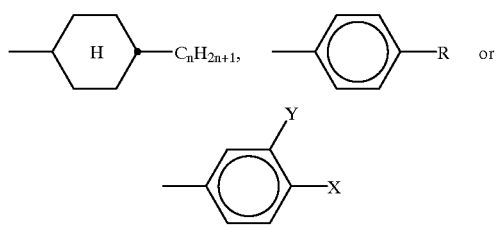

wherein n is 1 to 9, X is CN or P and Y is H or F, optionally at least one component of group B3, compounds of the formulae BVIII and BIX:

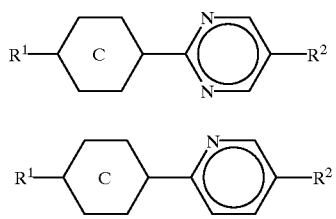

wherein $R^1$ and $R^2$ each independently of one another have the meaning given for R and

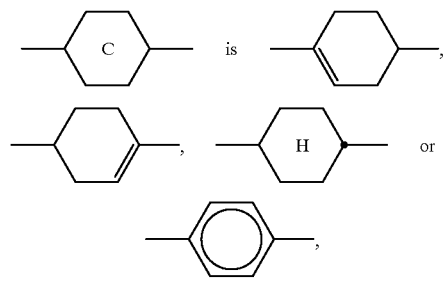

c) 10–80% by weight of a liquid crystal component C, one or more compounds having a dielectric anisotropy of more than +1.5, and d) an optically active component E, in an amount such that the ratio between the layer thickness (separation of the plane-parallel carrier plates) and the natural pitch of the chiral nematic liquid crystal mixture is about 0.2 to 1.3, the nematic liquid crystal mixture having a nematic phase range of at least 60° C., a viscosity of not more than 30 mPa.s and a dielectric anisotropy of at least +5, the dielectric anisotropies of the compounds and the parameters relating to the nematic liquid crystal mixture being based on a temperature of 20° C.

2. A display according to claim 1, wherein component C contains compounds of group C, compounds of formulae CI to CIII:

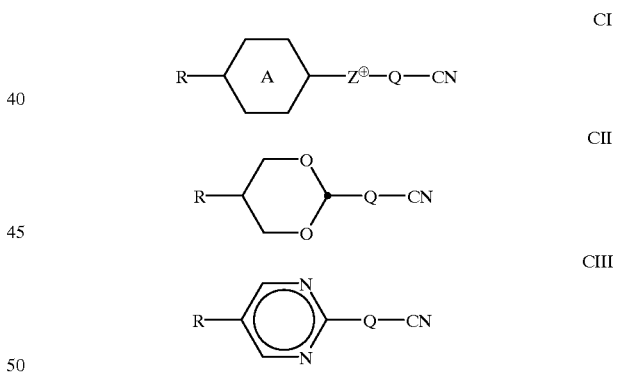

wherein

Q has the formula

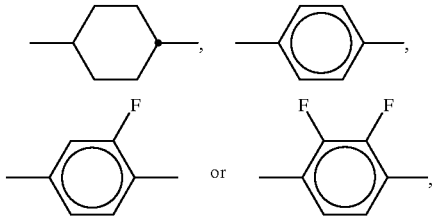

$Z^1$ is

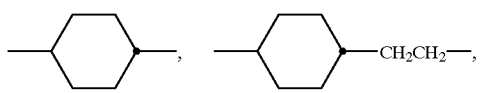

a single bond, —CH$_2$CH$_2$—, —CO—O— or —O—CO— and

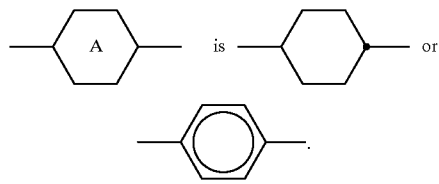

3. A display according to claim 1, wherein the nematic liquid crystal mixture is composed of 30–60% by weight of component C, 20–70% by weight of compounds from groups A and B and an amount of component E which adds up to 100% by weight.

4. A display according to claim 1, wherein the nematic liquid crystal mixture contains at least two compounds of the formula AIII or AV.

5. A display according to claim 4, wherein the nematic liquid crystal mixture contains compounds of the formula AIII and AV.

6. A display according to claim 1, wherein the nematic liquid crystal mixture contains compounds of the formula BIII.

7. A display according to claim 6, wherein the liquid crystal mixture contains compounds of the formula

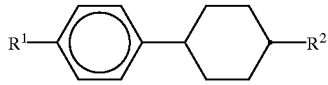

wherein $R^1$ is CH$_3$—(CH$_2$)$_n$—O— or trans-H-(CH$_2$)$_r$—CH=CH—(CH$_2$CH$_2$)$_s$—CH$_2$—O— or $R^2$ is CH$_3$—(CH$_2$)$_r$—, wherein n is 1, 2, 3 or 4,
r is 0, 1, 2 or 3,
s is 0 or 1 and
t is 1, 2, 3 or 4.

8. A display according to claim 5, wherein the liquid crystal mixture contains compounds of the formulae

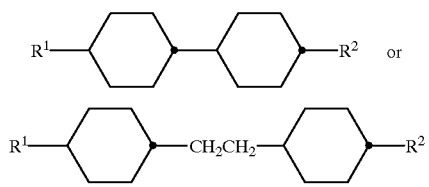

where
$R^1$ is CH$_2$—(CH$_2$)$_n$—O—, CH$_3$(CH$_2$)$_r$—, trans-H-(CH$_2$)$_r$—CH=CH—(CH$_2$CH$_2$)$_s$—CH$_2$O— or trans-H-(CH$_2$)$_r$—CH=CH—(CH$_2$CH$_2$)$_s$— and
$R^2$ is CH$_3$—(CH$_2$)$_r$— wherein
n is 1, 2, 3 or 4,
r is 0, 1, 2 or 3,
s is 0 or 1 and
t is 1, 2, 3 or 4.

9. A display according to claim 1, wherein component C contains one or more compounds with a 4-fluorophenyl group or a 3,4-difluorophenyl group.

10. A display according to claim 9, wherein the liquid crystal mixture contains at least one compound of the formula

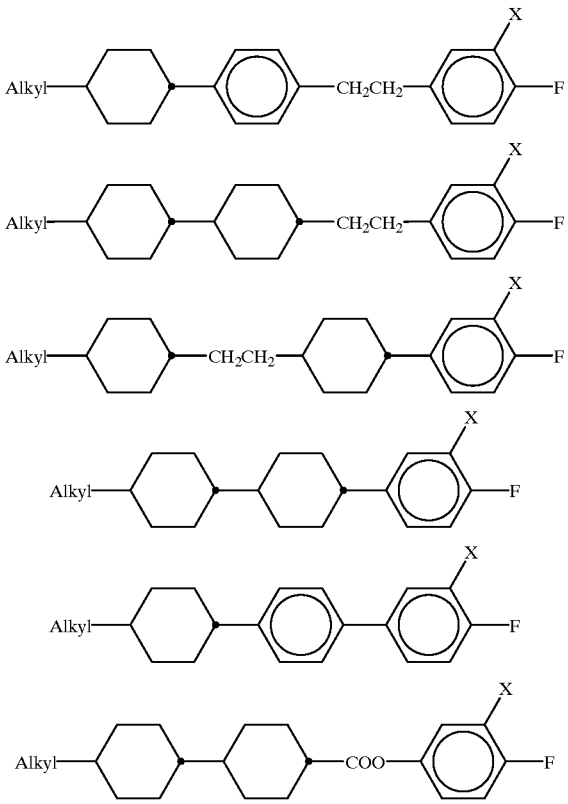

wherein alkyl is a straight-chain -alkyl group having 2–7 C atoms and X is H or F.

11. A display according to claim 1, wherein the liquid crystal mixture contains one or more compounds wherein R is a trans-alkenyl group or a trans-alkenyloxy group.

12. A nematic liquid crystal mixture containing a composition comprising:

a) at least one component of group A, compounds of formula AIII to AVI:

AIII

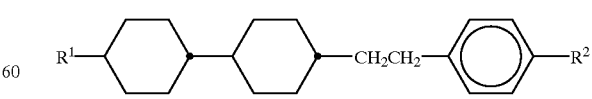

AIV

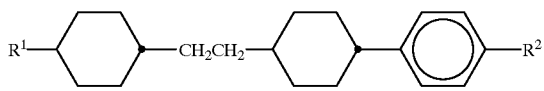

-continued

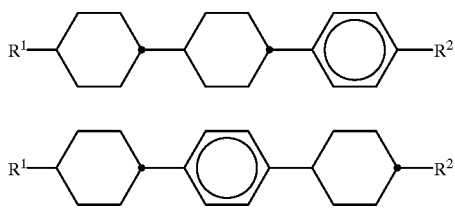

wherein R¹ and R² each independently of one another are each R and R is alkyl having 1–12 C atoms, wherein one or two non-adjacent CH₂ groups can also be replaced by —O—, —CH=CH—, —CO—, —O—CO— or —CO—O—, b) at least one component of group B1, compounds of the formula BI to BIV:

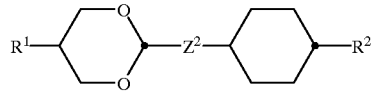

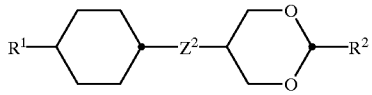

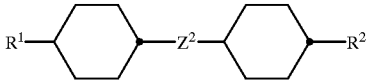

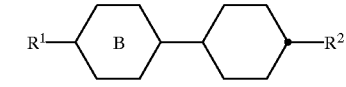

wherein R¹ and R² each independently of one another have the meaning given for R, Z² is —CH₂CH₂—, —CO—O—, —O—CO— or a single bond and

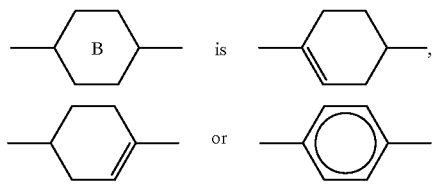

optionally at least one component of group B2, compounds of formula BV to BVII:

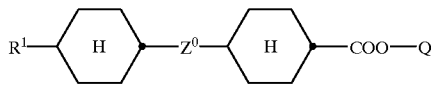

-continued

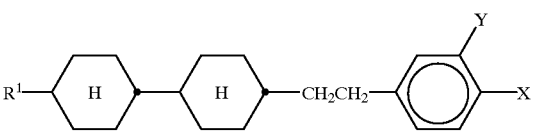

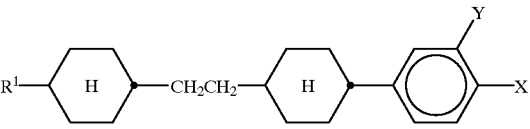

wherein
R¹ has the meaning given for R,
Z⁰ is —CH₂CH₂— or a single bond, and

Q is

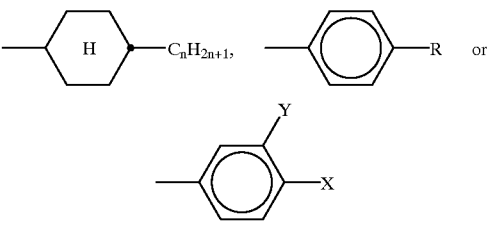

wherein n is 1 to 9, X is CN or F and Y is H or F, optionally at least one component of group B3, compounds of the formulae BVII and BIX:

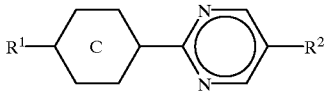

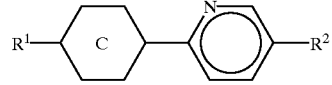

wherein R¹ and R² each independently of one another have the meaning given for R and

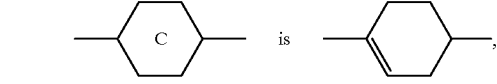

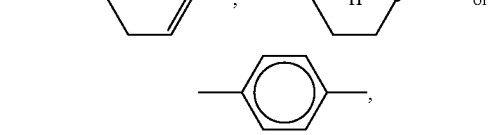

c) 10–80% by weight of a liquid crystal component C, one or more compounds having a dielectric anisotropy of more than +1.5, and d) an optically active component E, in an amount such that the ratio between the layer thickness (separation of the plane-parallel carrier plates) and the natural pitch of the chiral nematic liquid crystal mixture is about 0.2 to 1.3,
the nematic liquid crystal mixture having a nematic phase range of at least 60° C., a viscosity of not more than 30 mPa.s and a dielectric anisotropy of at least +5, the dielectric anisotropies of the compounds and the parameters relating to the nematic liquid crystal mixture being based on a temperature of 20° C.

* * * * *

UNITED STATES PATENT AND TRADEMARK OFFICE
CERTIFICATE OF CORRECTION

PATENT NO.      : 6,210,760 B1
APPLICATION NO. : 09/207031
DATED           : April 3, 2001
INVENTOR(S)     : Georg Weber et al.

It is certified that error appears in the above-identified patent and that said Letters Patent is hereby corrected as shown below:

Column 105, line 14, reads "optionally" should read -- and/or --
Column 105, line 52, reads "or P and" should read -- or F and --
Column 105, line 52, reads "X is CN or P" should read -- X is CN or F --

Column 106, lines 36-40, reads " 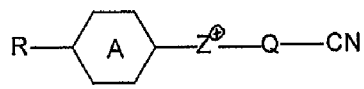 " should read

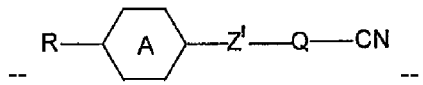 --

Column 107, lines 37-40 reads " 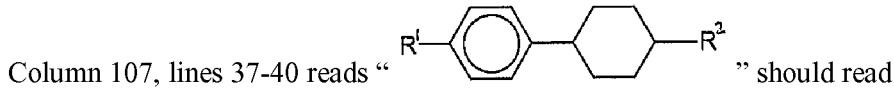 " should read

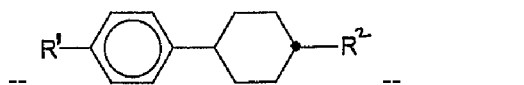 --

Column 109, line 59 reads "optionally" should read -- and/or --
Column 110, line 33 reads "optionally" should read -- and/or --
Column 110, line 35 reads "BVII" should read -- BVIII --

Signed and Sealed this

Twenty-fifth Day of September, 2007

JON W. DUDAS
*Director of the United States Patent and Trademark Office*